United States Patent [19]
Fujita et al.

[11] Patent Number: 5,370,819
[45] Date of Patent: Dec. 6, 1994

[54] CONJUGATED ENYNE DERIVATIVE AND LIQUID CRYSTAL COMPOSITION

[75] Inventors: Atsuko Fujita; Yuichi Onji; Shuichi Matsui; Tomoyuki Kondo; Yasuyuki Goto; Naoko Ota; Etsuo Nakagawa; Shinichi Sawada, all of Chiba, Japan

[73] Assignee: Chisso Corporation, Ohsaka, Japan

[21] Appl. No.: 149,942

[22] Filed: Nov. 10, 1993

[30] Foreign Application Priority Data

Nov. 10, 1992 [JP] Japan .................................. 4-299756
Mar. 4, 1993 [JP] Japan .................................. 5-044008

[51] Int. Cl.$^5$ ...................... C09K 19/52; C09K 19/34; C07C 69/76; C07C 43/02
[52] U.S. Cl. ........................... 252/299.01; 282/299.61; 282/299.63; 282/299.64; 282/299.65; 282/299.66; 282/299.67; 544/298; 544/335; 546/250; 549/369; 568/626; 560/8
[58] Field of Search ............... 252/299.01, 299.61, 252/299.63, 299.64, 299.65, 299.66, 299.67; 544/242, 298, 335; 546/250; 549/369; 560/8; 568/626

[56] References Cited

FOREIGN PATENT DOCUMENTS 0137679  4/1985  European Pat. Off. .
3901266A1  7/1990  Germany .

OTHER PUBLICATIONS

CA 86(1):5031w.
CA 106(21):175799b.
CA 111(1):7000u.

Primary Examiner—Shean Wu
Attorney, Agent, or Firm—Wenderoth, Lind & Ponack

[57] ABSTRACT

A novel, conjugated enyne compound expressed by the following formula (I), which has superior characteristics as an L.C. material and is stable under a usually used environment, and a L.C. composition containing the same are provided:

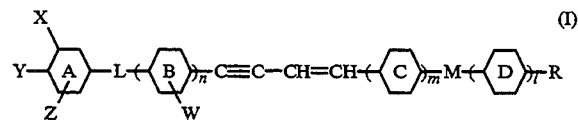

wherein A is 1,4-phenylene or 1,4-cyclohexylene; B, C and D are 1,4-phenylene, 1,4-cyclohexylene, 1,3-dioxane-2,5-diyl, pyridine-2,5-diyl or 1,3-pyrimidine-2,5-diyl; L and M are covalent bond, 1,2-ethylene, oxycarbonyl, carbonyloxy, 1,2-ethenylene, 1,2-ethynylene, oxymethylene or methyleneoxy; n, m and l are 0 or 1; X and Z are H or F; R is fluoroalkyl, alkyl, alkoxy, alkoxyalkyl or alkenyl; Y is alkyl, alkoxy, cyano, halogen, cyanate, alkyl or alkoxy having at least one H replaced by halogen; when n is 0, L is covalent bond; when m or n is 0, M is covalent bond; and m, n and l are not simultaneously 0, the compound having a broad L.C. range, a low viscosity and a suitable Δn, and being applied to various uses, and reducing the viscosity of L.C. composition containing the same and enlarging the L.C. operation range.

20 Claims, No Drawings

CONJUGATED ENYNE DERIVATIVE AND LIQUID CRYSTAL COMPOSITION

BACKGROUND OF THE INVENTION

1. Field of the Invention

This invention relates to a conjugated enyne derivative and a liquid crystal composition. More particularly, it relates to a liquid crystalline compound having a conjugated enyne group in its molecule and a liquid crystal composition.

2. Description of the Related Art

Display elements utilizing liquid crystals have been broadly utilized for watches, electronic calculators, etc. These liquid crystal display elements utilize optical anisotropy and dielectric anisotropy of liquid crystal substances. Liquid crystal phases include nematic liquid crystal phase, smectic liquid crystal phase and cholesteric liquid crystal phase, and display elements utilizing nematic liquid crystal among them have been most broadly applied to practical uses. Further, display modes applied to liquid crystal display include TN (twisted nematic) mode, DS (dynamic scattering) mode, guest.host mode, DAP mode, etc. as regards electrooptical effect. A number of liquid crystalline compounds including those which have been under a research step up to date have been known. However, no single substance which is filled in display elements and used has been found at present. That is, as liquid crystal substances expected as display element materials, those which exhibit liquid crystal phases within a temperature range as broad as possible, in the nature, around room temperature at which the substances are most often used particularly for display elements, are preferred, and also those which are sufficiently stable to the environmental factors and further are provided with physical properties enough to drive display elements, are required; whereas such a single substance satisfying these conditions has not yet been found. Thus, at present, several kinds of liquid crystal substances are blended or they are further blended with non-liquid crystal substances, whereby compositions provided with such characteristics have been prepared and applied to practical uses as the materials. Further, these liquid crystal compositions are required to be stable to moisture, light, heat, air, etc. under environment where they are used. Further, they are required to be stable to electric fields and electromagnetic irradiation. Further, it is required that the blended liquid crystal compounds are chemically stable to each other under the used environment. Further, the liquid crystal compositions are required to have suitable values of physical properties such as optical anisotropy value, dielectric anisotropy value, conductance value, etc. depending upon display modes and the shape of elements. Recently, in particular, the importance of substances having low optical anisotropy for materials of liquid crystal display elements of thin film transistor (TFT) mode has been increasing, as well as the importance of compounds having a high ratio of elastic constants ($K_{33}/K_{11}$) for super-twisted nematic (STN) mode is increasing. Thus, in order to meet with such requirements, liquid crystal compounds as a single substance provided with various characteristics has been developed, but only inventions having improved some of these physical properties have been disclosed and no single material having solved all of the above-mentioned problems has yet been found. One of these disclosed inventions is that of Japanese patent publication No. Hei 1-502823 wherein compounds mentioned below containing cyclohexenylacetylene structure in the molecule thereof are claimed. However, concrete physical values of the cyclohexenylacetylene derivatives have not been disclosed, and it has been necessary to successively continue development of such new materials.

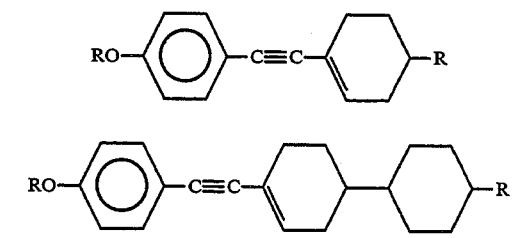

SUMMARY OF THE INVENTION

The object of the present invention is to provide a liquid crystal compound which has solved the above-mentioned problems and is provided with superior characteristics as a single liquid crystal material and also is stable under an environment usually employed, and a composition containing the above liquid crystal compound.

The present inventors have made extensive research in order to solve the above problems, and as a result have found a compound having a novel structure expressed by the formula (I) mentioned below and provided with improved characteristics as compared with generally-known liquid crystal compounds, and have completed the present invention.

The compound of the present invention is a conjugated enyne derivative expressed by the formula (I):

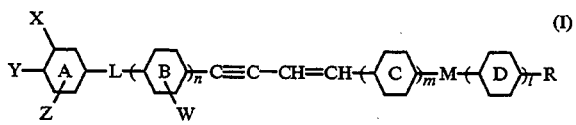

wherein A represents 1,4-phenylene group or 1,4-cyclohexylene group; B, C and D each represent 1,4-phenylene group, 1,4-cyclohexylene group, 1,3-dioxane-2,5-diyl group, pyridine-2,5-diyl group or 1,3-pyrimidine-2,5-diyl group; L and M each represent a covalent bond, 1,2-ethylene group, oxycarbonyl group, carbonyloxy group, 1,2-ethylene group, 1,2-ethynylene group, oxymethylene group or methyleneoxy group; n, m and l each represent 0 or 1; X and Z each independently represent hydrogen atom or fluorine atom; R represents fluoroalkyl group, alkyl group, alkoxy group, alkoxyalkyl group or alkenyl group; Y represents alkyl group, alkoxy group, cyano group, halogen atom, cyanate group, alkyl group having at least one hydrogen atom replaced by halogen atom(s) or alkoxy group having at least one hydrogen atom replaced by halogen atom(s); when B represents 1,4-phenylene group, W represents fluorine atom or hydrogen atom; when B represents another group than 1,4-phenylene group, W represents hydrogen atom; when n represents 0, L represents a covalent bond; when m or n represents 0, M represents a covalent bond; and m, n and l, each are not simultaneously 0.

The compound of the present invention is characterized by containing a linear conjugated enyne structure inside its molecule.

The compound of the present invention has a low viscosity, a broad liquid crystal range and a superior compatibility. Further, the compound of the present invention provides a material having a broad application range different in the object, by varying substituents on the core containing an enyne chain and the terminal ring structure thereof. Further, the compound of the present invention is effective for providing a material exhibiting a Δn value of an intermediate to a relatively high range, best accorded with a required Δn value, by choosing the substituents on the core structure part and the terminal ring parts thereof. Further, the compound of the present invention is sufficiently stable under the environment of its use as liquid crystal elements and causes no deterioration even under the conditions of electromagnetic irradiation, voltage impression, etc. Further, when the compound of the present invention is used as a component of liquid crystal compositions, it has a superior compatibility with other liquid crystal materials and can compose a new liquid crystal display element provided with useful characteristics.

DETAILED DESCRIPTION OF PREFERRED EMBODIMENTS

The compound of the present invention can vary its liquid crystal characteristics by varying the substituents on the core structure part containing an enyne chain and the terminal ring structure thereof.

Examples of representative structures among the compounds of the present invention are as follows:

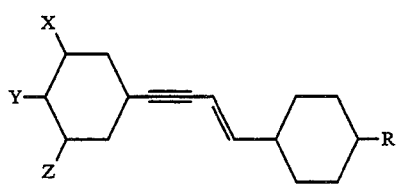

[1]

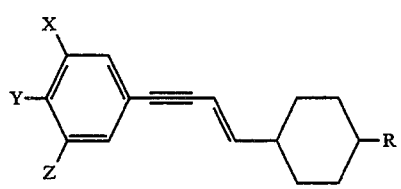

[2]

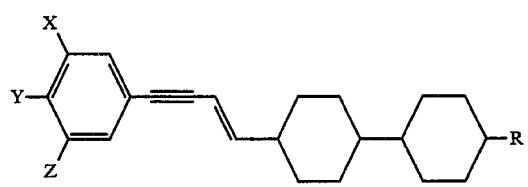

[3]

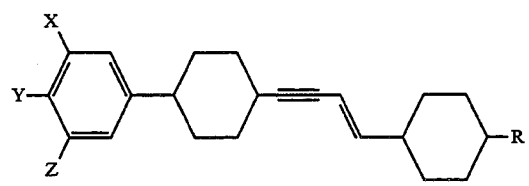

[4]

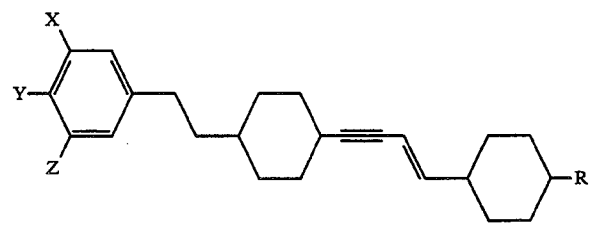

[5]

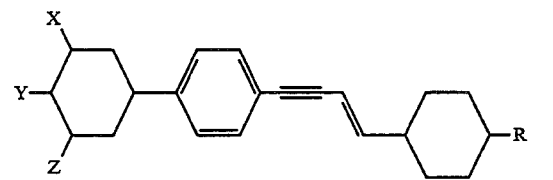

[6]

-continued
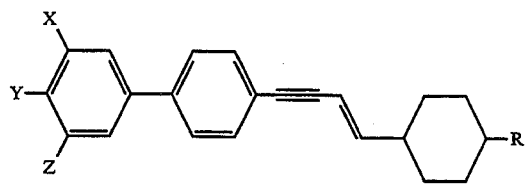
[7]
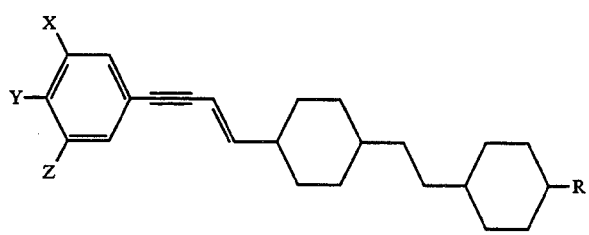
[8]
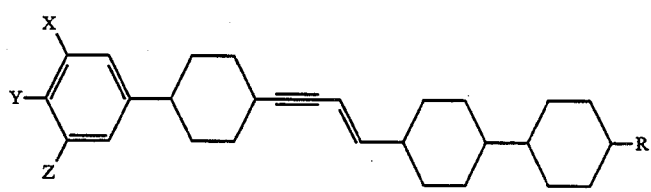
[9]
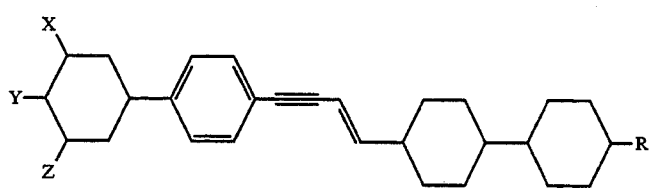
[10]
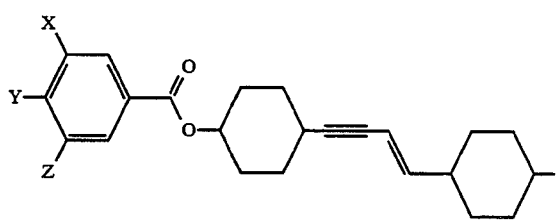
[11]
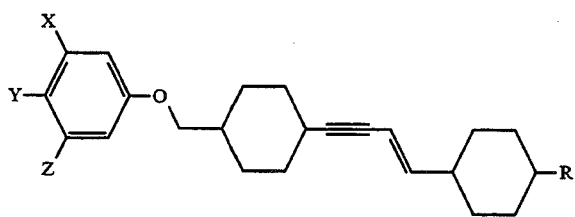
[12]
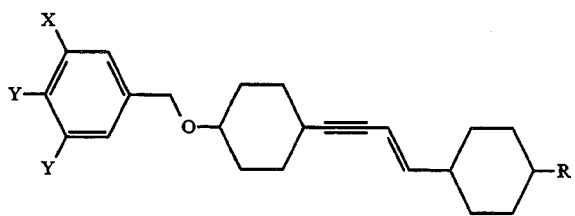
[13]
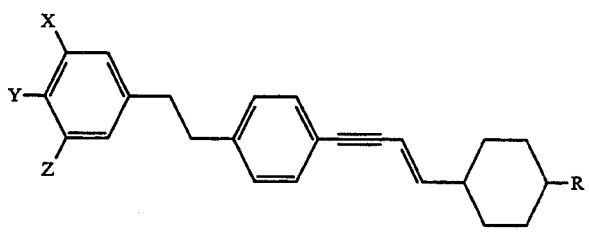
[14]

-continued
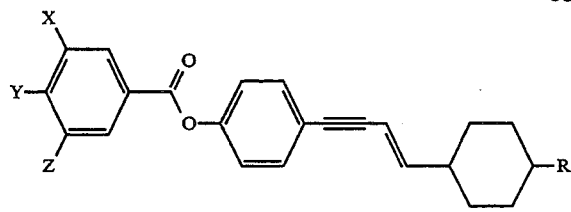 [15]
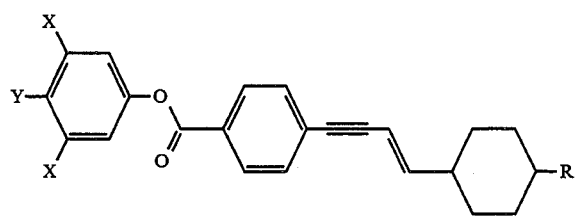 [16]
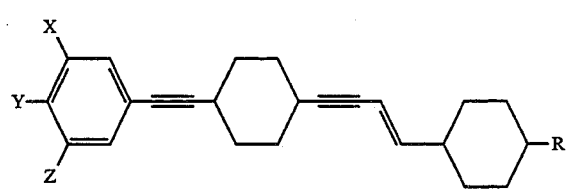 [17]
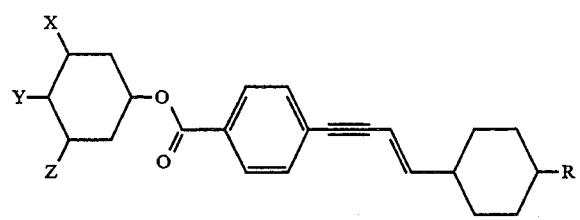 [18]
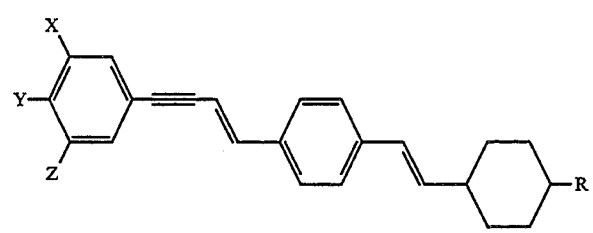 [19]
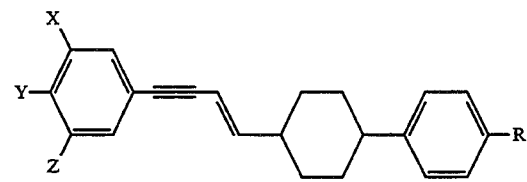 [20]
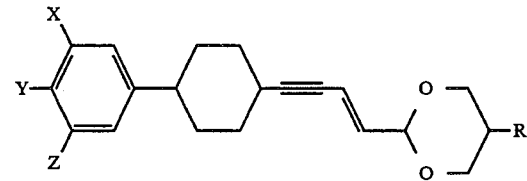 [21]
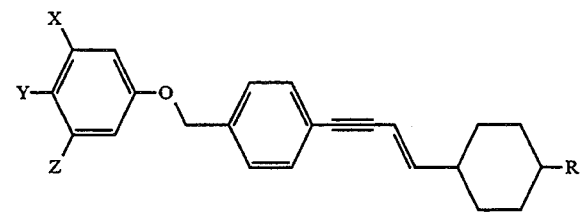 [22]

-continued
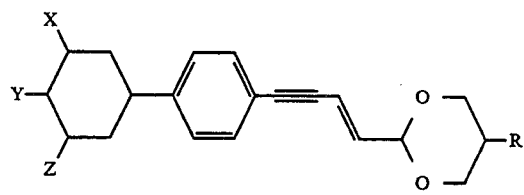 [23]
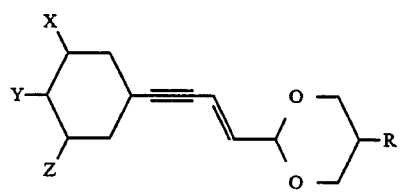 [24]
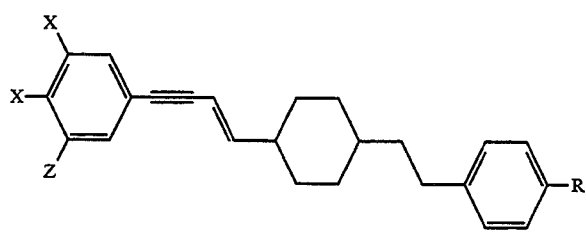 [25]
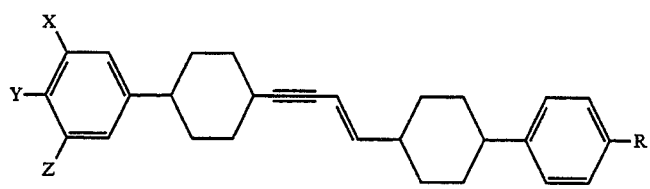 [26]
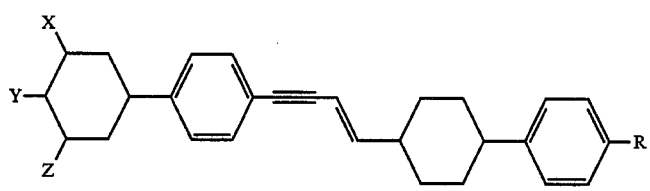 [27]
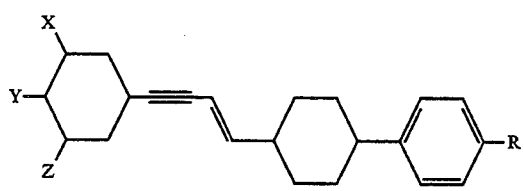 [28]
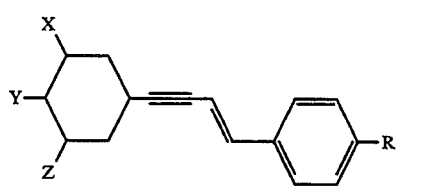 [29]
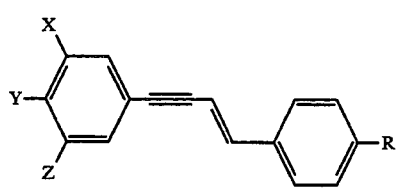 [30]

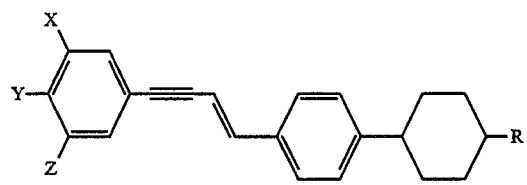
[31]
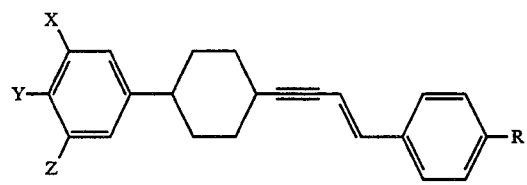
[32]
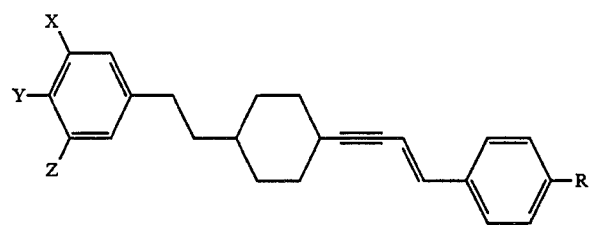
[33]
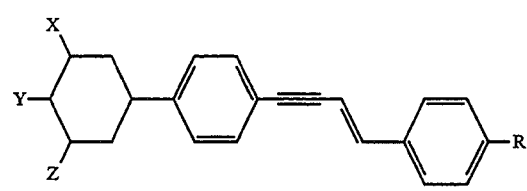
[34]
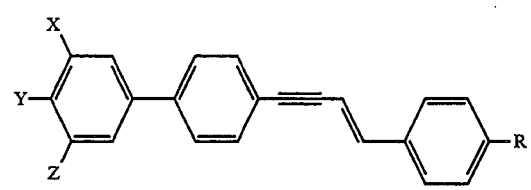
[35]
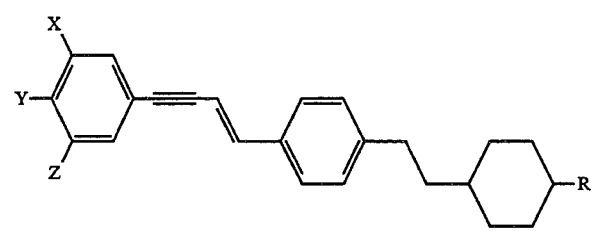
[36]
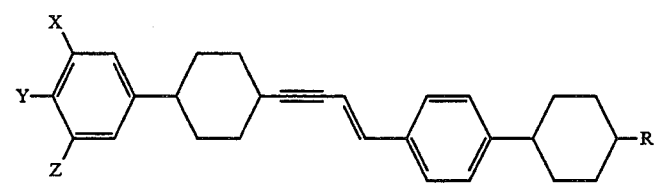
[37]
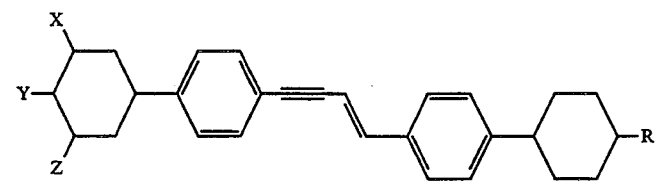
[38]

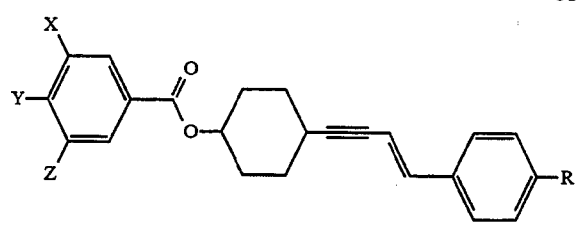 [39]
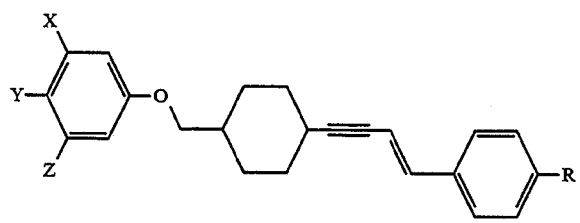 [40]
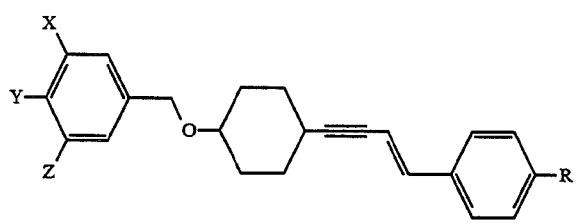 [41]
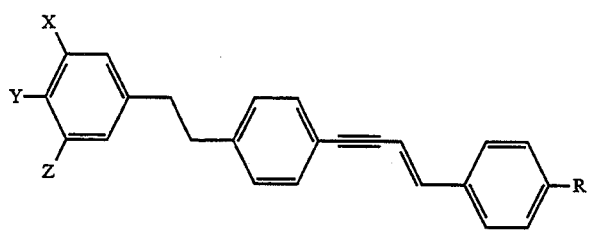 [42]
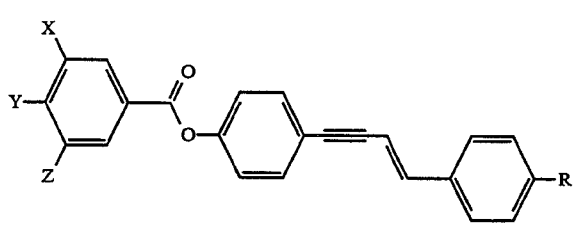 [43]
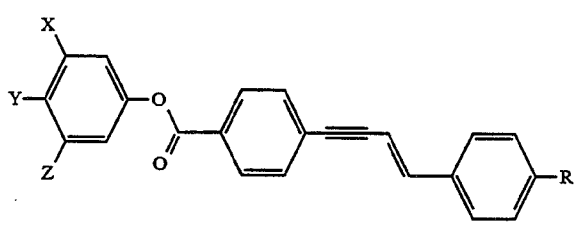 [44]
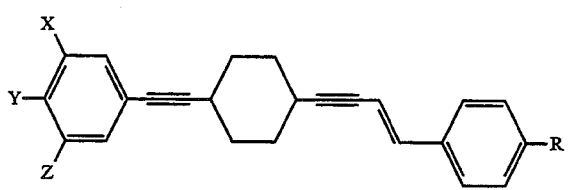 [45]

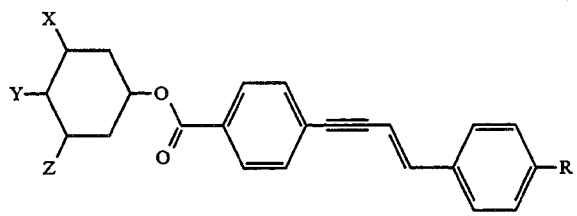 [46]
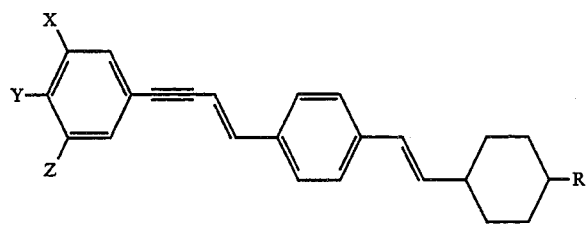 [47]
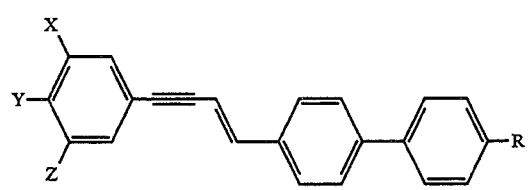 [48]
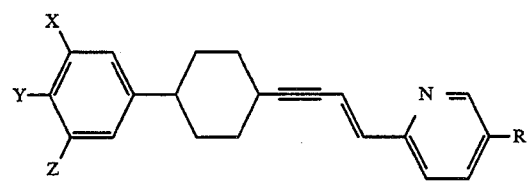 [49]
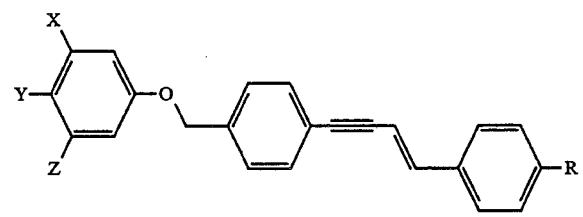 [50]
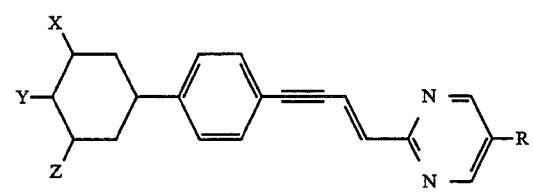 [51]
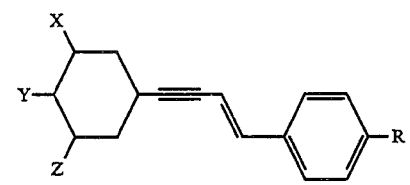 [52]
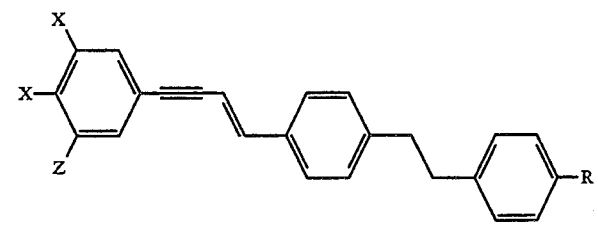 [53]

-continued
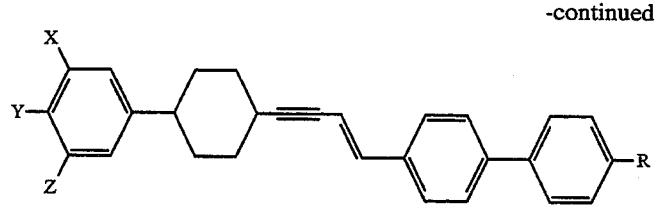 [54]
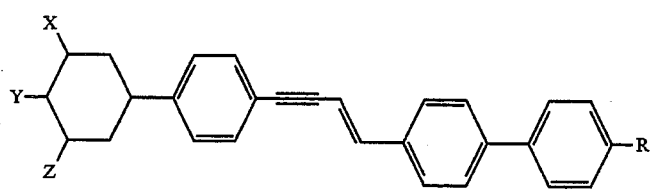 [55]
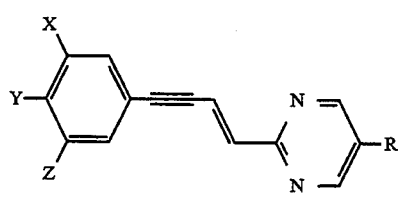 [56]
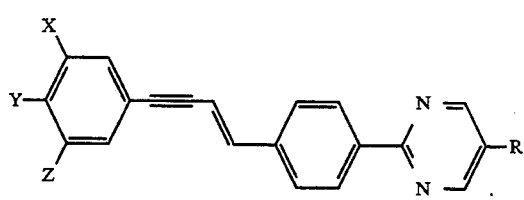 [57]
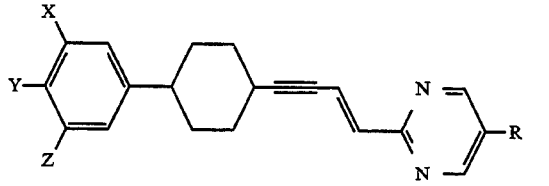 [58]
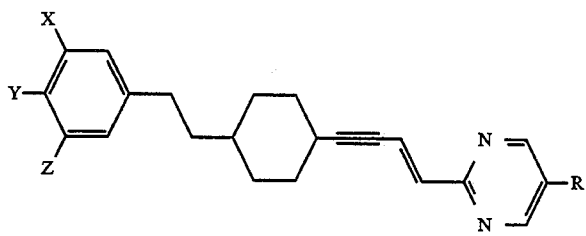 [59]
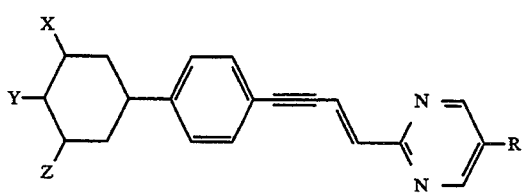 [60]
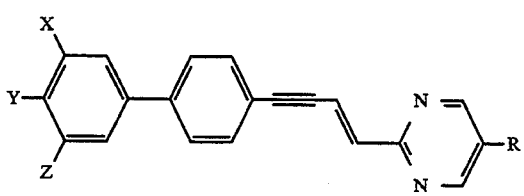 [61]

-continued
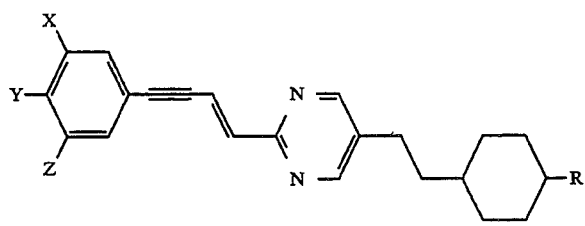 [62]
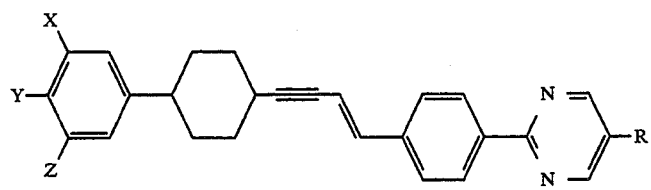 [63]
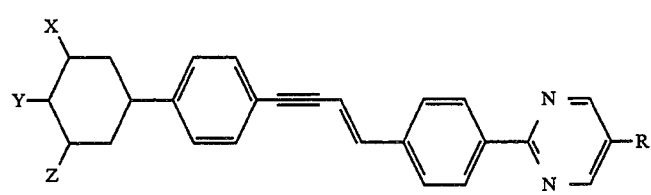 [64]
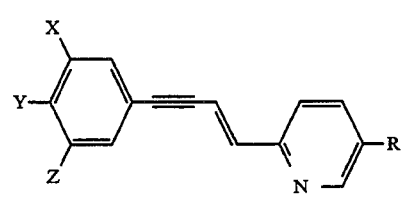 [65]
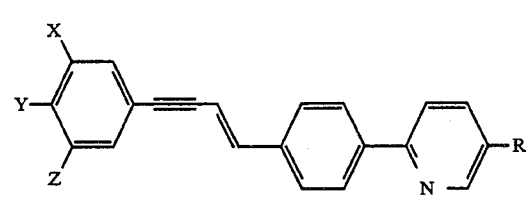 [66]
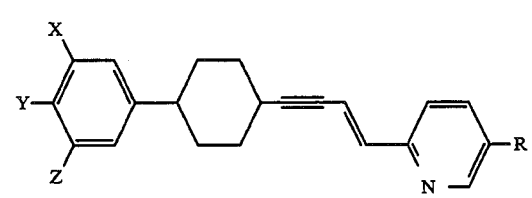 [67]
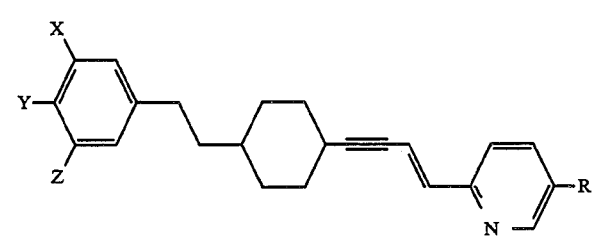 [68]
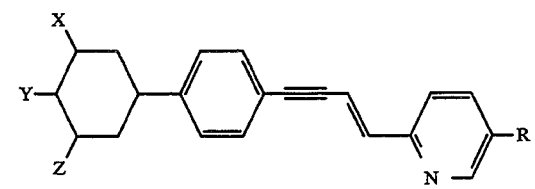 [69]

-continued

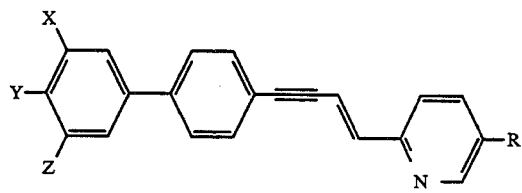
[70]

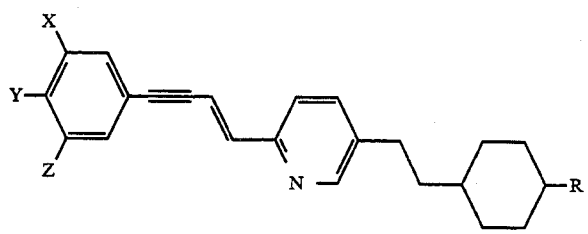
[71]

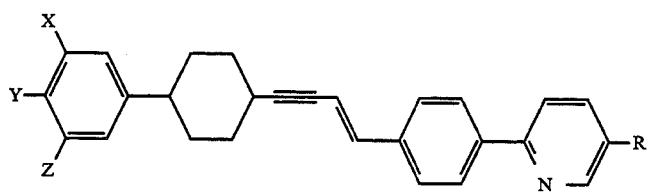
[72]

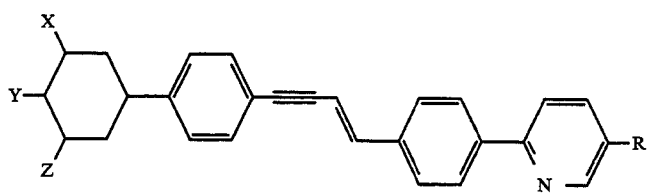
[73]

X, Y, Z and R in the above formulas are as defined before.

Any of the compounds of the present invention represented by these structures are characterized by having a very broad liquid crystal range as compared with other liquid crystalline compounds having similar molecular weights. Particularly, the compounds of the present invention having structures expressed by the formulas [1] and [2] are useful liquid crystal materials capable of setting their liquid crystal ranges around room temperature and having a low viscosity. Further, compounds expressed by the formulas of [3] to [10], [14] to [20], [25], [28], [29] to [38], [42], [45], [47], [48] and [52] each have a broad liquid crystal range and a low viscosity and are practical. Further, compounds expressed by the formulas of [3] to [10], [14] to [20], [25], [28] each have particularly a low viscosity, a broad nematic range and a suitable Δn value and are superior as substances composing display elements. Further, compounds expressed by the formulas [30], [31], [34] to [36], [42], [46], [48], [54] to [57], [60] to [66] and [69] to [73] each have a relatively large optical anisotropy value and hence are preferred. Further, compounds having a core as expressed by the formulas of [1] to [13], [17], [20], [25], [27], [28], [32] and [33], each have an intermediate optical anisotropy value are important as an element constituting compositions. Further, compounds having a core of the so-called four rings as expressed by the formulas [9], [10], [26], [27], [37], [38], [54], [55], [63], [64] [72] and [73] each are usable in order to set the clearing point of liquid crystal compositions on a higher temperature side, and hence useful. Next, examples of the compounds of the present invention having a preferable substitution form at the left, terminal ring part are as follows:

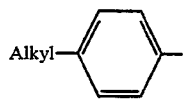
[a]

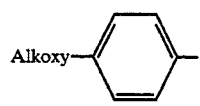
[b]

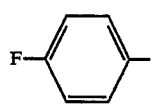
[c]

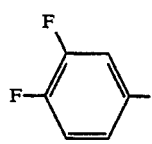
[d]

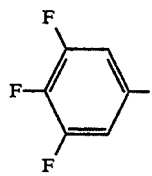
[e]

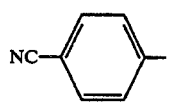
[f]

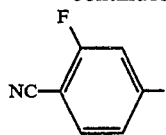 [g]
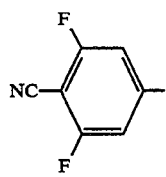 [h]
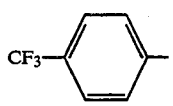 [i]
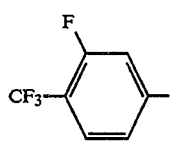 [j]
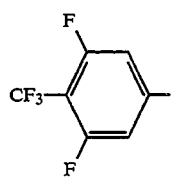 [k]
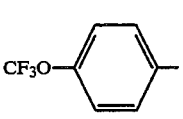 [l]
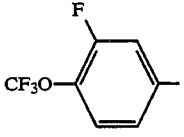 [m]
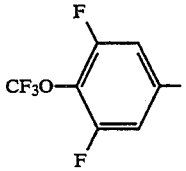 [n]
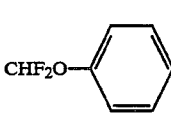 [o]
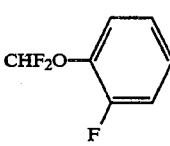 [p]
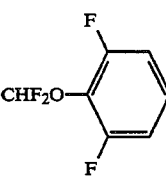 [q]
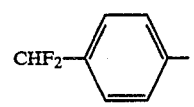 [r]
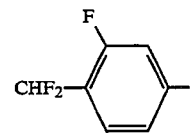 [s]
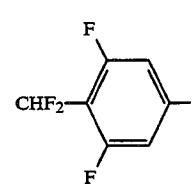 [t]
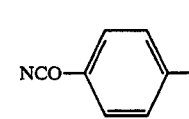 [u]
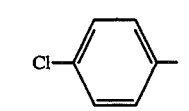 [v]
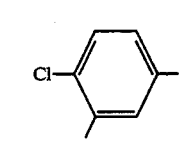 [w]
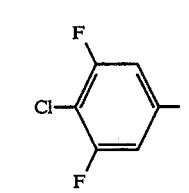 [x]
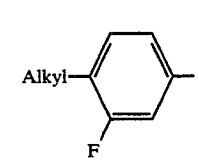 [y]
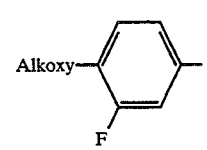 [z]
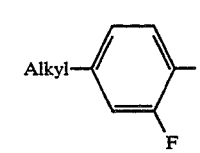 [aa]
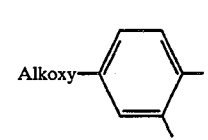 [bb]

-continued

[cc] 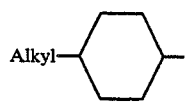

[dd] 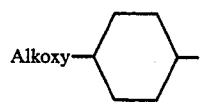

[ee] 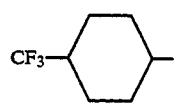

[ff] 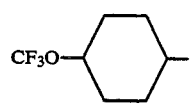

[gg] 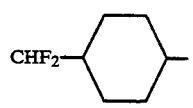

The main physical properties of the compound of the present invention are determined also depending upon the kinds of substituents on the ring structures positioned at the terminals of the compounds. Namely, compounds of [c] to [x] having as Y, a substituent of a large electronegativity, such as cyano group, fluorine atom, chlorine atom, trifluoromethyl group, trifluoromethoxy group, difluoromethyl group, etc. are the so-called P-form materials capable of setting its dielectric anisotropy value to a large one and hence the compounds are important as an element constituting liquid crystal compositions. Among these P-form materials, particularly by combining fluorine atom in the substituents of X and/or Z, compounds having a large dielectric anisotropy value such as those having [d], [e], [g], [h], [i], [k], [m], [n], [p], [q], [s], [t], [w] or [x] are obtained. These compounds having a large dielectric anisotropy can be blended with liquid crystal compositions in order to lower the drive voltage of displays and hence they are noted. Further, compounds of [a], [b], [y], [z], [aa], [bb], [cc] and [dd] having as Y, a substituent such as alkyl group, alkoxy group, etc. exhibit a small positive dielectric anisotropy value and hence are expected as the so-called n-form materials. Further, compounds of n type having fluorine atom at the lateral position as in the cases of [y], [z], [aa] and [bb] have a small negative Δn value and hence they are noted as peculiar materials. Further, in any cases of the compounds, it is preferred in the aspect of broadening the liquid crystal range that R is a linear alkyl chain group composed of 10 carbon atoms or less. Further, the two isomers originated from the double bond are present as regards the carbon chain containing an enyne structure specific of the compounds of the present invention, and in this case, compounds wherein the steric configuration of the double bond is E-form can be used more preferably as liquid crystal materials. The compounds of the present invention can be provided with various characteristics by combining the cores shown in [1] to [73] with the forms of the terminal structure shown in [a] to [gg]. Certain, concrete examples thereof are illustrated below.

Namely, compounds of [2-a] expressed by the core [2] and the terinal structure [a] have an intermediate Δn value, a small Δε value, a low viscosity and a good compatibility and hence are practical liquid crystal materials. Compounds of [2-b], [3-a], [3-b], [4-a], [4-b], [6-a] and [6-b] each have a broad liquid crystal range and a relatively high Δn value and hence are useful. Further, compounds of [2-c], [2-d], [2-i], [2-l], [2-o], [2-r] and [2-s] each exhibit a particularly low viscosity (Δε), a good compatibility and a broad liquid crystal range and hence are preferred. Further, compounds of [2-f] and [3-f] have a high ratio of elastic constants ($k_{33}/K_{11}$), a large Δε value and a broad liquid crystal range and hence are expected. Further, compounds of [2-e], [2-f], [2-g], [2-h], [2-i], [2-j], [2-k], [2-n], [2-q], [3-e], [3-f], [3-g], [3-h], [3-i], [3-j], [3-k], [3-n], [3-q], [4-e], [4-f], [4-g], [4-h], [4-i], [4-j], [4-k], [4-n] and [4-q] each are peculiar as liquid crystal materials for low voltage drive.

The liquid crystal composition provided by the present invention is a liquid crystal dielectric comprising of a component (A) containing at least one compound expressed by the formula (I), a component (B) containing at least one compound having a high dielectric anisotropy of preferably $|\Delta\epsilon|>5$, a component (C) containing at least one compound having a low dielectric anisotropy of $|\Delta\epsilon|\leq 5$, a component (D) containing at least one compound having a clearing point exceeding 80° C. and if required, another component (E).

Compounds preferred as component (B) of the liquid crystal composition of the present invention are illustrated below.

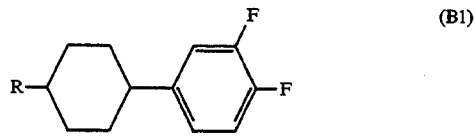 (B1)

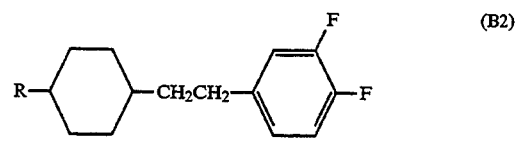 (B2)

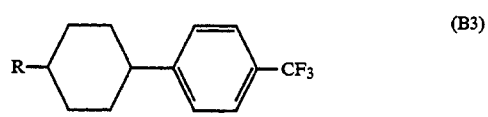 (B3)

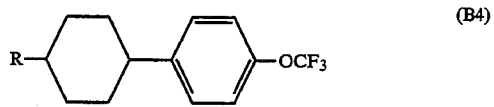 (B4)

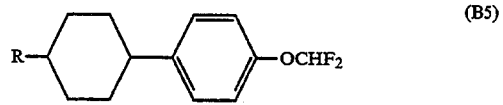 (B5)

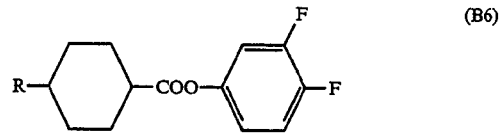 (B6)

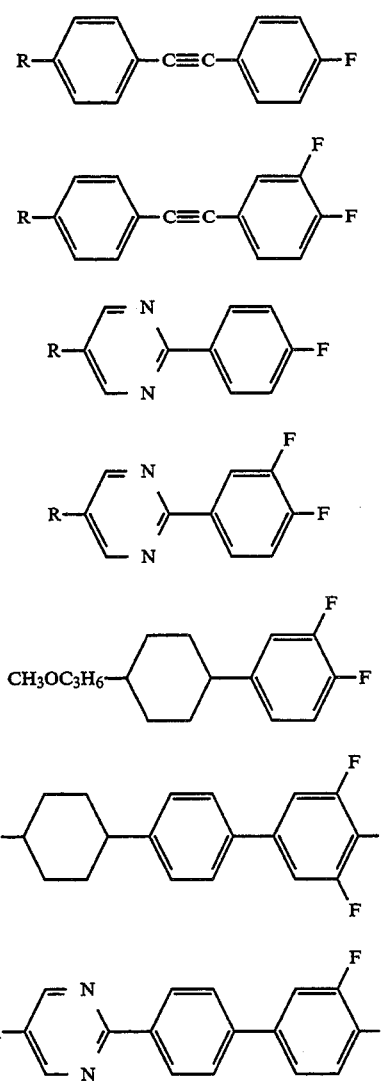
In these formulas, R represents an alkyl group or an alkenyl group of 1 to 10C and one or two not adjacent carbon atoms of the groups may be replaced by oxygen atom(s).
Compounds preferred as component (C) of the liquid crystal composition of the present invention are illustrated below:
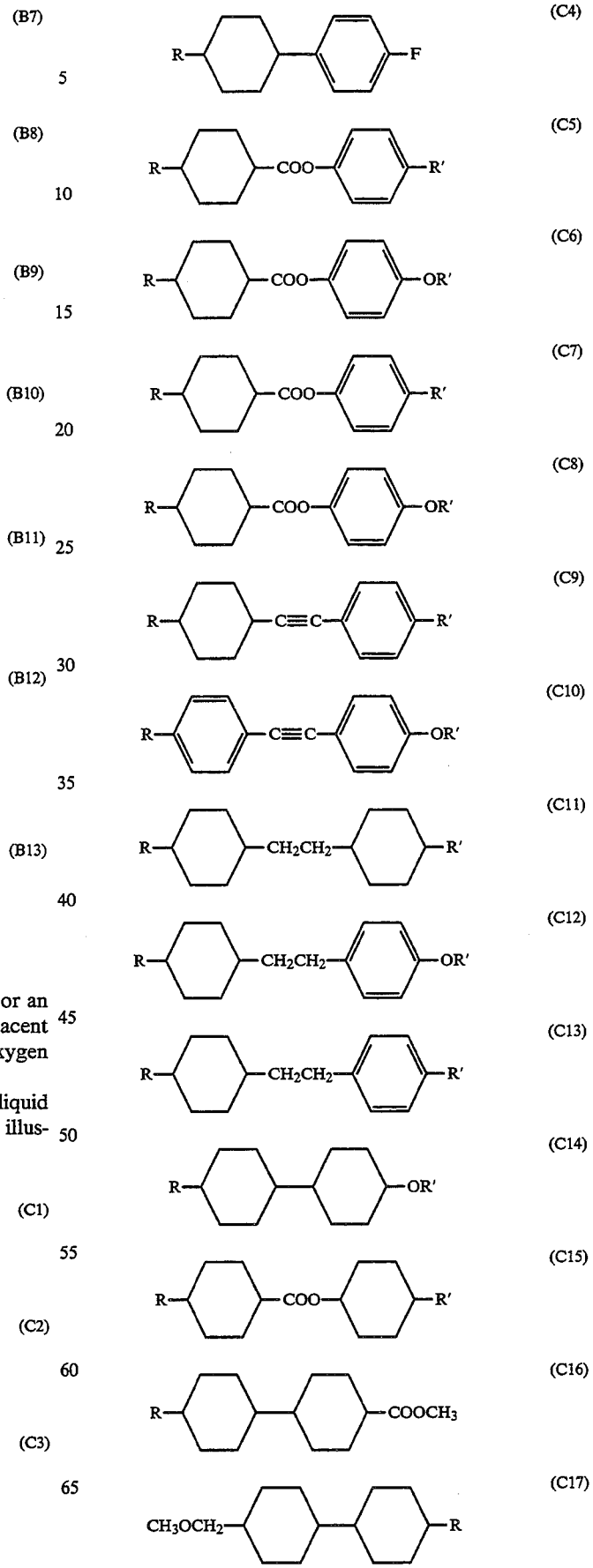

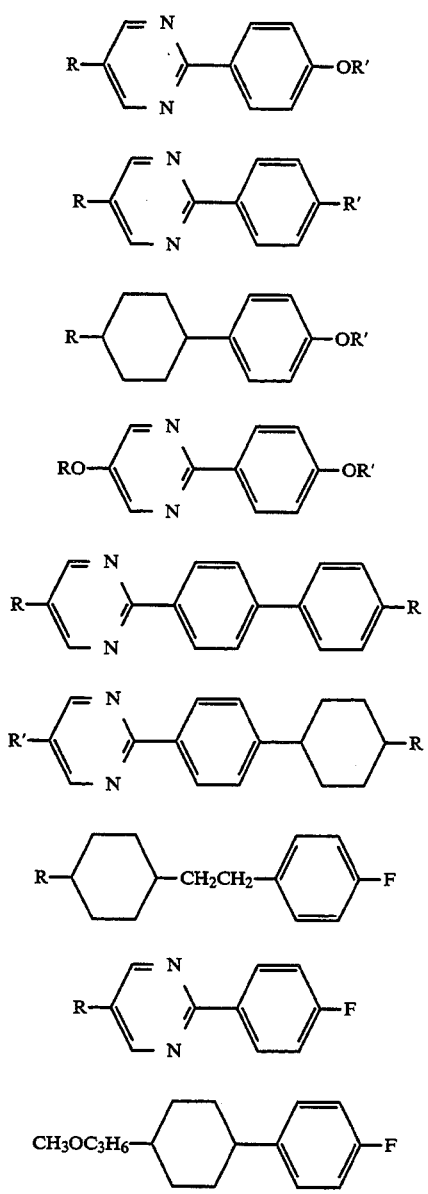
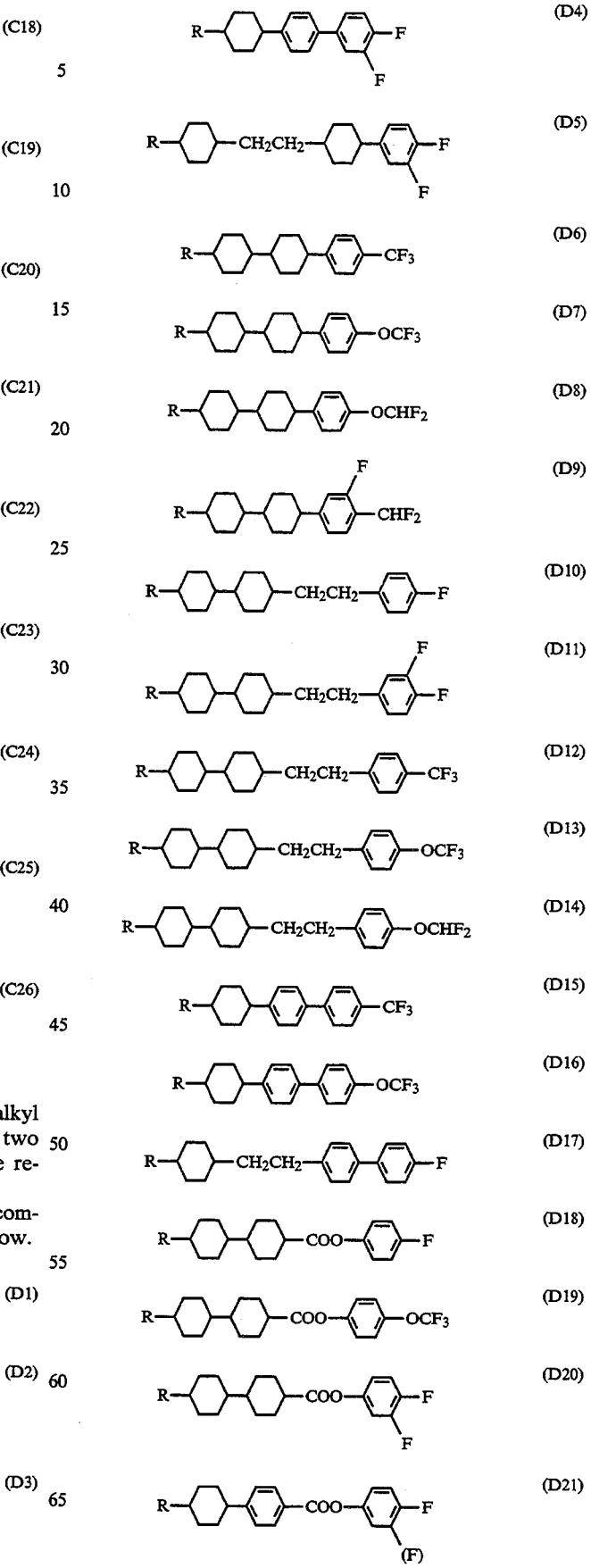
In these formulas, R and R' each represent an alkyl group or an alkenyl group of 1 to 10C and one or two not adjacent carbon atoms of the groups may be replaced by oxygen atom(s).
Compounds preferred as component (D) of the composition of the present invention are illustrated below.

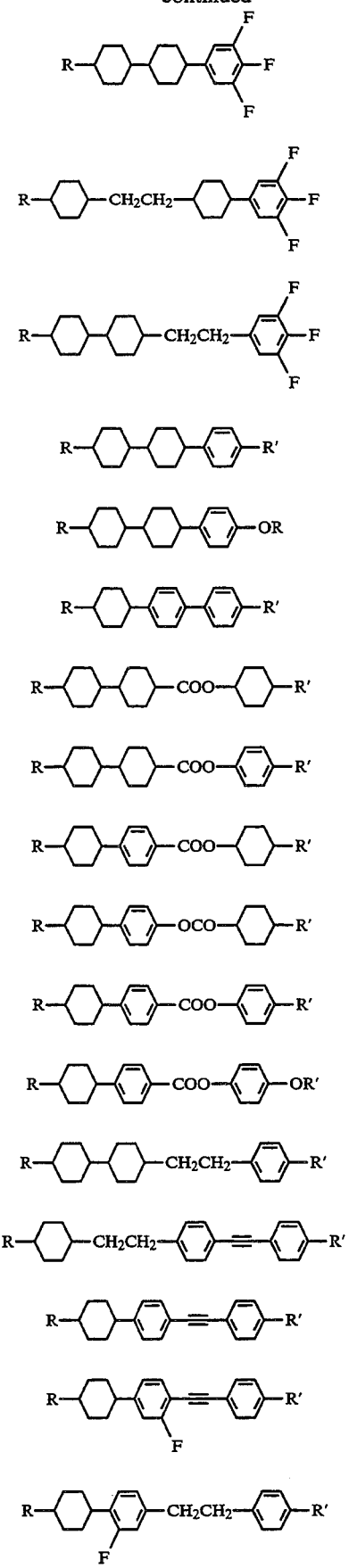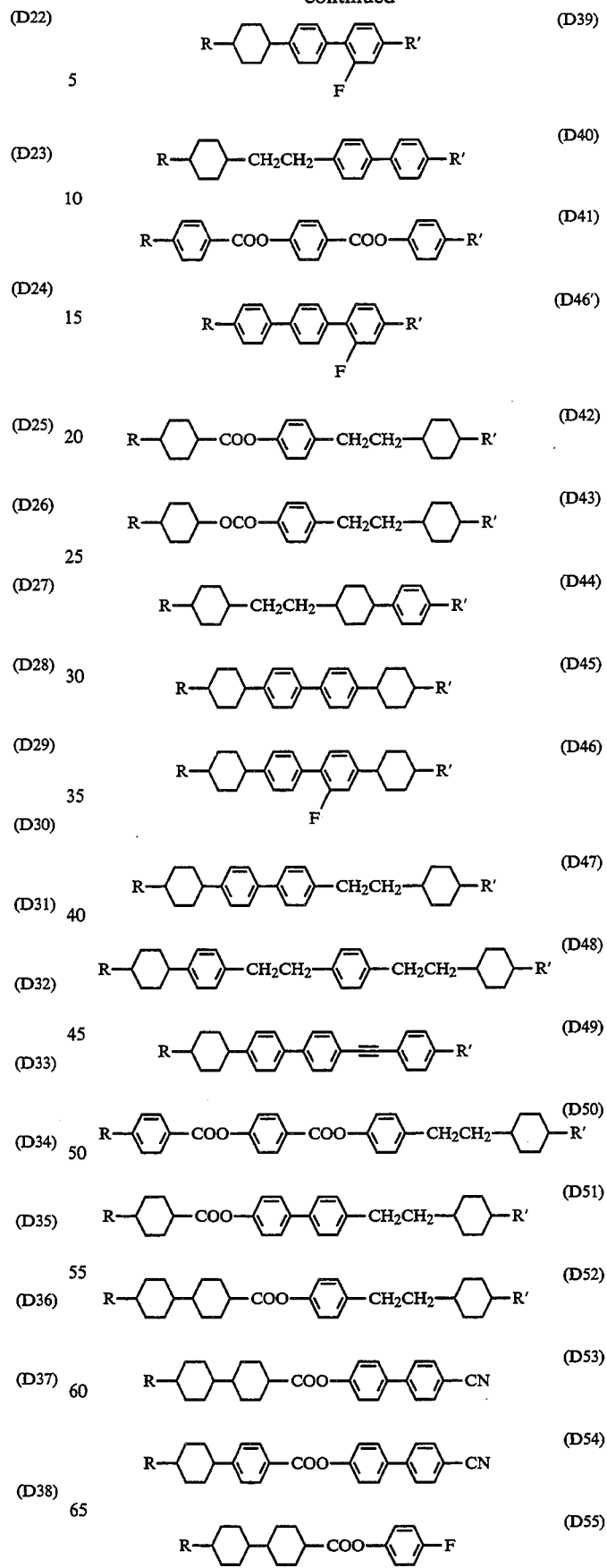

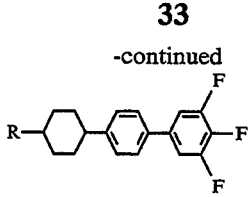
(D56)
In these formulas, R and R' each represent an alkyl group or an alkenyl group of 1 to 10C, and one or two not adjacent carbon atoms of the groups may be replaced by oxygen atom(s).
Compounds preferred as component (E) of the liquid crystal composition of the present invention are illustrated below:
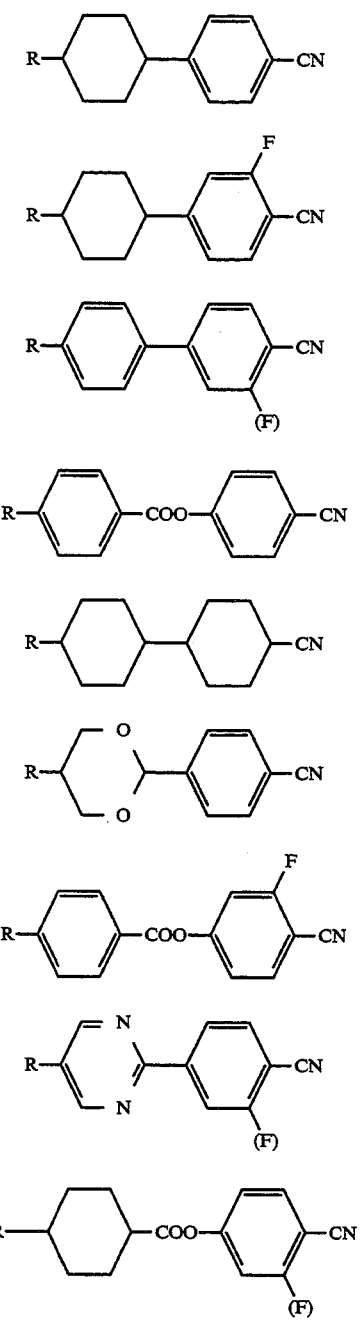
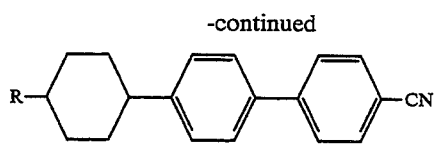
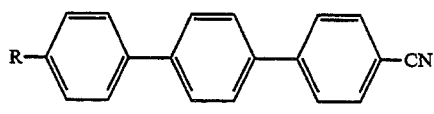
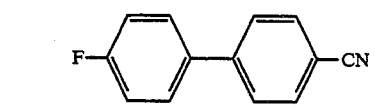

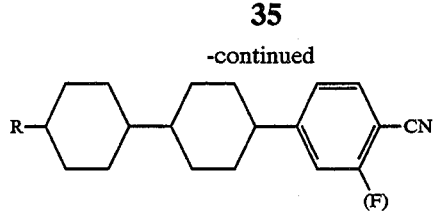

(E22)

In these formulas, R and R' each represent an alkyl group or alkenyl group of 1 to 10C and one or two not adjacent carbon atoms may be replaced by oxygen atom(s).

The composition of the present invention is preferred to contain at least one compound expressed by the formula (I) in a proportion of 1 to 40% by weight, in the aspect of exhibiting superior liquid crystal characteristics.

Further, as the liquid crystal composition of the present invention, the following composition examples can be illustrated:

| Composition example 1 | |
|---|---|
| 1-(4-ethylphenyl)-4-(trans-4-pentylcyclohexyl)-3E-buten-1-yne | 5% by weight |
| 1-(4-propylphenyl)-4-(trans-4-pentylcyclohexyl)-3E-buten-1-yne | 5% by weight |
| 4-(trans-4-(trans-4-propylcyclohexyl)cyclohexyl)-toluene | 10% by weight |
| 4-(trans-4-pentylcyclohexyl-4'-ethylbiphenyl | 10% by weight |
| 4-(trans-4-pentylcyclohexyl-4'-cyanobiphenyl | 15% by weight |
| 4-(trans-4-(trans-4-ethylcyclohexyl)cyclohexyl)-benzonitrile | 5% by weight |
| 4-(trans-4-(trans-4-propylcyclohexyl)cyclohexyl)-benzontrile | 5% by weight |
| 4-(trans-4-(trans-4-butylcyclohexyl)cyclohexyl)-benzontrile | 5% by weight |
| 4-(trans-4-propylcyclohexyl)ethoxybenzene | 20% by weight |
| 4-(trans-4-propylcyclohexyl)butoxybenzene | 20% by weight |

| Composition example 2 | |
|---|---|
| 1-(4-propylphenyl)-4-(trans-4-ethylcyclohexyl)-3E-buten-1-yne | 7% by weight |
| 1-(4-pentylphenyl)-4-(trans-4-ethylcyclohexyl)-3E-buten-1-yne | 8% by weight |
| 4-(trans-4-(trans-4-propylcyclohexyl)cyclohexyl)-propylbenzene | 15% by weight |
| 4-(trans-4-(trans-4-ethylcyclohexyl)cyclohexyl)-1,2-difluorobenzene | 10% by weight |
| 4-(trans-4-(trans-4-propylcyclohexyl)cyclohexyl)-1,2-difluorobenzene | 10% by weight |
| 4-(trans-4-(trans-4-ethylcyclohexyl)cyclohexyl)-benzonitrile | 5% by weight |
| 4-(trans-4-(trans-4-butylcyclohexyl)cyclohexyl)-benzonitrile | 5% by weight |
| 4-(trans-4-pentylcyclohexyl)-4'-cyanobiphenyl | 5% by weight |
| 1-(4-ethylphenyl)-2-tolylacetylene | 10% by weight |
| 1-(4-propylphenyl)-2-(4-ethoxyphenyl)acetylene | 10% by weight |
| 4-(trans-4-propylcyclohexyl)benzonitrile | 10% by weight |

| Composition example 3 | |
|---|---|
| 1-(4-ethylphenyl)-4-(trans-4-ethylcyclohexyl)-3E-buten-1-yne | 10% by weight |
| 1-(4-propylphenyl)-4-(trans-4-ethylcyclohexyl)-3E-buten-1-yne | 10% by weight |
| 1-(4-ethylphenyl)-4-(trans-4-propylcyclohexyl)-3E-buten-1-yne | 10% by weight |
| 4-(trans-4-(trans-4-propylcyclohexyl)cyclohexyl)-propylbenzene | 20% by weight |
| 4-(trans-4-(trans-4-propylcyclohexyl)cyclohexyl)-2-fluorobenzonitrile | 10% by weight |
| 4-(trans-4-(trans-4-ethylcyclohexyl)cyclohexyl)-benzonitrile | 5% by weight |
| 4-(trans-4-(trans-4-propylcyclohexyl)cyclohexyl)-benzonitrile | 5% by weight |
| 4-butoxyphenyl trans-4-propylcyclohexancarboxylate | 10% by weight |
| 4-ethoxyphenyl trans-4-pentylcyclohexancarboxylate | 10% by weight |
| 4-fluorophenyl trans-4-pentylcyclohexancarboxylate | 8% by weight |
| 4-fluorophenyl trans-4-(trans-4-heptylcyclohexyl)-cyclohexancarboxylate | 2% by weight |

| Composition example 4 | |
|---|---|
| 1-(4-ethylphenyl)-4-(trans-4-(trans-4-pentylcyclohexyl)-cyclohexyl)-3E-buten-1-yne | 10% by weight |
| 4-(trans-4-propylcyclohexyl)-2-fluorobenzonitrile | 10% by weight |
| 4-(trans-4-ethylcyclohexyl)-2-fluorobenzonitrile | 10% by weight |
| 4-(5-propyl-1,3-pyrimidin-2-yl)-1,2-difluorobenzene | 10% by weight |
| 4-(5-propyl-1,3-dioxan-2-yl)benzonitrile | 10% by weight |
| 4-(trans-4-(trans-4-ethylcyclohexyl)cyclohexyl)-1,2-difluorobenzene | 8% by weight |
| 4-(trans-4-(trans-4-propylcyclohexyl)cyclohexyl)-1,2-difluorobenzene | 8% by weight |
| 4-(trans-4-(trans-4-pentylcyclohexyl)cyclohexyl)-1,2-difluorobenzene | 4% by weight |
| 4-(trans-4-(trans-4-ethylcyclohexyl)cyclohexyl)-2-fluorobenzonitrile | 15% by weight |
| 4-(trans-4-(trans-4-propylcyclohexyl)cyclohexyl)-2-fluorobenzonitrile | 15% by weight |

| Composition example 5 | |
|---|---|
| 1-(4-methoxyphenyl)-4-(trans-4-ethylcyclohexyl)-3E-buten-1-yne | 5% by weight |
| 1-(4-ethoxyphenyl)-4-(trans-4-ethylcyclohexyl)-3E-buten-1-yne | 5% by weight |
| 1-(4-ethoxyphenyl)-4-(trans-4-propylcyclohexyl)-3E-buten-1-yne | 5% by weight |
| 4-(trans-4-propylcyclohexyl)-2-fluorobenzonitrile | 10% by weight |
| 4-(trans-4-ethylcyclohexyl)-2-fluorobenzonitrile | 15% by weight |
| 4-(5-pentyl-1,3-pyrimidin-2-yl)-1,2-difluorobenzene | 10% by weight |
| 4-(trans-4-(trans-4-ethylcyclohexyl)cyclohexyl)-1,2-difluorobenzene | 10% by weight |
| 4-(trans-4-(trans-4-propylcyclohexyl)cyclohexyl)-1,2-difluorobenzene | 10% by weight |
| 4-(trans-4-(trans-4-pentylcyclohexyl)cyclohexyl)-1,2-difluorobenzene | 10% by weight |
| 4-(trans-4-(trans-4-ethylcyclohexyl)cyclohexyl)-2-fluorobenzonitrile | 10% by weight |
| 4-(trans-4-(trans-4-propylcyclohexyl)cyclohexyl)-2-fluorobenzonitrile | 10% by weight |

| Composition example 6 | |
|---|---|
| 1-(4-ethylphenyl)-4-(trans-4-ethylcyclohexyl)-3E-buten-1-yne | 10% by weight |
| 1-(4-pentylphenyl)-4-(trans-4-ethylcyclohexyl)-3E-buten-1-yne | 10% by weight |
| trans-4-(trans-4-methoxymethylcyclohexyl)propylcyclohexane | 5% by weight |
| 4-(trans-4-methoxymethylcyclohexyl)benzonitrile | 15% by weight |
| 4-(trans-4-(trans-4-ethylcyclohexyl)cyclohexyl)-benzonitrile | 10% by weight |
| 4-(trans-4-(3-buten-1-yl)cyclohexyl)benzon- | 10% by weight |

| Composition example 6 | |
|---|---|
| itrile | |
| 4-(trans-4-propylcyclohexyl)benzonitrile | 10% by weight |
| 2-(4-(trans-4-propylcyclohexyl)phenyl)-5-ethyl-1,3-pyrimidine | 10% by weight |
| 2-(4-(trans-4-propylcyclohexyl)phenyl)-5-propyl-1,3-pyrimidine | 10% by weight |
| 2-(4-(trans-4-propylcyclohexyl)phenyl)-5-butyl-1,3-pyrimidine | 10% by weight |

| Composition example 7 | |
|---|---|
| 1-(4-methoxyphenyl)-4-(trans-4-propylcyclohexyl)-3E-buten-1-yne | 9% by weight |
| 1-(4-ethoxyphenyl)-4-(trans-4-propylcyclohexyl)-3E-buten-1-yne | 9% by weight |
| 1-(4-pentoxyphenyl)-4-(trans-4-propylcyclohexyl)-3E-buten-1-yne | 9% by weight |
| 1-(4-ethylphenyl)-2-(4-(2-(trans-4-propylcyclohexyl)-ethyl)phenyl)acetylene | 8% by weight |
| 1-(4-propylphenyl)-2-(4-(2-(trans-4-propylcyclohexyl)-ethyl)phenyl)acetylene | 10% by weight |
| 1-(4-butylphenyl)-2-(4-(2-(trans-4-propylcyclohexyl)-ethyl)phenyl)acetylene | 10% by weight |
| 4-(trans-4-ethylcyclohexyl)benzonitrile | 10% by weight |
| 4-(trans-4-propylcyclohexyl)benzonitrile | 15% by weight |
| trans-4-propylcyclohexyl trans-4-propylcyclohexyl-carboxylate | 10% by weight |
| trans-4-propylcyclohexyl trans-4-butylcyclohexyl-carboxylate | 10% by weight |

| Composition example 8 | |
|---|---|
| 1-(4-methoxyphenyl)-4-(trans-4-pentylcyclohexyl)-3E-buten-1-yne | 9% by weight |
| 1-(4-ethoxyphenyl)-4-(trans-4-pentylcyclohexyl)-3E-buten-1-yne | 9% by weight |
| 1-(4-ethylphenyl)-2-(4-(2-(trans-4-propylcyclohexyl)ethyl)phenyl)acetylene | 9% by weight |
| 1-(4-propylphenyl)-2-(4-(2-(trans-4-propylcyclohexyl)ethyl)phenyl)acetylene | 8% by weight |
| 2-(3,4-difluorophenyl)-5-propyl-1,3-pyrimidine | 12% by weight |
| 2-(4-ethylphenyl)-5-ethyl-1,3-pyrimidine | 5% by weight |
| 2-(4-propylphenyl)-5-ethyl-1,3-pyrimidine | 5% by weight |
| 1-(4-ethylphenyl)-2-tolylacetylene | 4% by weight |
| 1-(4-ethylphenyl)-2-(4-hexylphenyl)acetylene | 8% by weight |
| 1-tolyl-2-(4-hexylphenyl)acetylene | 5% by weight |
| 1-(4-butylphenyl)-2-(4-butylphenyl)acetylene | 5% by weight |
| 4-fluoro-4'-(5-ethyl-1,3-pyrimidin-2-yl)biphenyl | 7% by weight |
| 4-fluoro-4'-(5-propyl-1,3-pyrimidin-2-yl)biphenyl | 7% by weight |
| 4-fluoro-4'-(5-butyl-1,3-pyrimidin-2-yl)biphenyl | 7% by weight |

| Composition example 9 | |
|---|---|
| 1-(4-ethoxyphenyl)-4-(trans-4-(trans-4-pentylcyclohexyl)-cyclohexyl)-3E-buten-1-yne | 9% by weight |
| 4-(trans-4-propylcyclohexyl)ethoxybenzene | 5% by weight |
| 5-(trans-4-(trans-4-ethylcyclohexyl)cyclohexyl)-1,2,3-trifluorobenzene | 10% by weight |
| 5-(trans-4-(trans-4-propylcyclohexyl)cyclohexyl)-1,2,3-trifluorobenzene | 10% by weight |
| 5-(trans-4-(trans-4-pentylcyclohexyl)cyclohexyl)-1,2,3-trifluorobenzene | 10% by weight |
| 4-(trans-4-heptylcyclohexyl)-1,2-difluorobenzene | 10% by weight |
| 4-(2-(trans-4-pentylcyclohexyl)ethyl)-1,2-difluorobenzene | 5% by weight |
| 4-(trans-4-(trans-4-ethylcyclohexyl)cyclohexyl)-1,2-difluorobenzene | 8% by weight |
| 4-(trans-4-(trans-4-propylcyclohexyl)cyclohexyl)-1,2-difluorobenzene | 8% by weight |

| Composition example 9 | |
|---|---|
| 4-(trans-4-(trans-4-pentylcyclohexyl)cyclohexyl)-1,2-difluorobenzene | 8% by weight |
| 4-(trans-4-(trans-4-propylcyclohexyl)cyclohexyl)-fluorobenzene | 5% by weight |
| 4-(trans-4-(trans-4-propylcyclohexyl)cyclohexyl)-toluene | 6% by weight |
| 4-(trans-4-(trans-4-propylcyclohexyl)cyclohexyl)-propylbenzene | 6% by weight |

| Composition example 10 | |
|---|---|
| 1-(4-ethylphenyl)-4-(trans-4-(trans-4-pentylcyclohexyl)-cyclohexyl)-3E-buten-1-yne | 10% by weight |
| 4-(trans-4-propylcyclohexyl)ethoxybenzene | 5% by weight |
| 4-(trans-4-(3-butenyl)cyclohexyl)benzonitrile | 12% by weight |
| 4-(trans-4-(trans-2-butenyl)cyclohexyl)benzonitrile | 12% by weight |
| 4-ethyl-4'-cyanobiphenyl | 8% by weight |
| 1-(4-ethylphenyl)-2-(4-methoxyphenyl)acetylene | 28% by weight |
| trans-4-(trans-4-propylcyclohexyl)-1-butylcyclohexane | 15% by weight |
| 1-(4-ethylphenyl)-2-(4-(2-(trans-4-propylcyclohexyl)ethyl)phenyl)acetylene | 5% by weight |
| 1-(4-propylphenyl)-2-(4-(2-(trans-4-propylcyclohexyl)-ethyl)phenyl)acetylene | 5% by weight |

| Composition example 11 | |
|---|---|
| 1-(4-cyanophenyl)-4-(trans-4-propylcyclohexyl)-3E-buten-1-yne | 10% by weight |
| 1-(4-cyanophenyl)-4-(trans-4-pentylcyclohexyl)-3E-buten-1-yne | 10% by weight |
| 4-(trans-4-ethylcyclohexyl)benzonitrile | 10% by weight |
| 4-(trans-4-propylcyclohexyl)benzonitrile | 9% by weight |
| 1-(4-ethylphenyl)-2-(4-methoxyphenyl)acetylene | 7% by weight |
| 1-(4-propylphenyl)-2-(4-methoxyphenyl)acetylene | 7% by weight |
| 1-(4-butylphenyl)-2-(4-methoxyphenyl)acetylene | 7% by weight |
| 1-(4-butylphenyl)-2-(4-ethoxyphenyl)acetylene | 7% by weight |
| 1-(4-pentylphenyl)-2-(4-methoxyphenyl)acetylene | 7% by weight |
| 1-(4-(trans-4-propylcyclohexyl)-1-fluorophenyl)-2-(4-ethylphenyl)acetylene | 4% by weight |
| 1-(4-(trans-4-propylcyclohexyl)-2-fluorophenyl)-2-(4-propylphenyl)acetylene | 4% by weight |
| 1-(4-(trans-4-propylcyclohexyl)-2-fluorophenyl)-2-(4-butylphenyl)acetylene | 4% by weight |
| 4-fluoro-4'-(5-propyl-1,3-pyrimidin-2-yl)biphenyl | 7% by weight |
| 4-fluoro-4'-(5-butyl-1,3-pyrimidin-2-yl)biphenyl | 7% by weight |

| Composition exmaple 12 | |
|---|---|
| 1-(3-fluoro-4-cyanophenyl)-4-(trans-4-propylcyclohexyl)-3E-buten-1-yne | 10% by weight |
| 1-(3-fluoro-4-cyanophenyl)-4-(trans-4-pentylcyclohexyl)-3E-buten-1-yne | 10% by weight |
| 4-(trans-4-propylcyclohexyl)benzonitrile | 10% by weight |
| 4-(trans-4-propylcyclohexyl)ethoxybenzene | 10% by weight |
| 1-(4-ethylphenyl)-2-(4-methoxyphenyl)acetylene | 10% by weight |
| 1-(4-ethylphenyl)-2-(4-methylphenyl)acetylene | 4% by weight |
| 1-(4-hexylphenyl)-2-(4-methylphenyl)acetylene | 4% by weight |
| 1,2-bis(4-butylphenyl)acetylene | 4% by weight |
| 4-(trans-4-(trans-4-propylcyclohexyl)cyclohexyl)-fluorobenzene | 3% by weight |

Composition example 12

| | |
|---|---|
| 4-(trans-4-(trans-4-propylcyclohexyl)cyclo-hexyl)-toluene | 8% by weight |
| 4-(trans-4-(trans-4-propylcyclohexyl)cyclo-hexyl)-methoxybenzene | 4% by weight |
| 1-(4-(2-(trans-4-ethylcyclohexyl)ethynyl)phenyl)-2-butylphenylacetylene | 4% by weight |
| 1-(4-(2-(trans-4-propylcyclohexyl)ethynyl)phenyl)-2-ethylphenylacetylene | 5% by weight |
| 1-(4-(2-(trans-4-propylcyclohexyl)ethynyl)phenyl)-2-propylphenylacetylene | 5% by weight |
| 1-(4-(2-(trans-4-propylcyclohexyl)ethynyl)phenyl)-2-butylphenylacetylene | 5% by weight |

Composition example 13

| | |
|---|---|
| 1-(3,4-difluorophenyl)-4-(trans-4-propylcyclohexyl)-3E-buten-1-yne | 10% by weight |
| 1-(3,4-difluorophenyl)-4-(trans-4-pentylcyclohexyl)-3E-1-yne | 10% by weight |
| 4-(trans-4-(3-butenyl)cyclohexyl)benzonitrile | 8% by weight |
| 4-(trans-4-(3E-pentenyl)cyclohexyl)benzonitrile | 8% by weight |
| 4-(trans-4-propylcyclohexyl)benzonitrile | 4.8% by weight |
| 4-(trans-4-pentylcyclohexyl)benzonitrile | 7.2% by weight |
| 4-(trans-4-heptylcyclohexyl)benzonitrile | 5.0% by weight |
| 4'-(trans-4-pentylcyclohexyl)cyanobiphenyl | 3.0% by weight |
| trans-4-(trans-4-methoxymethylcyclohexyl)cyclohexylpropane | 6% by weight |
| trans-4-(trans-4-methoxymethylcyclohexyl)cyclohexylpentane | 5% by weight |
| 1-(4-ethylphenyl)-2-(4-methoxyphenyl)acetylene | 5% by weight |
| 1-(4-methylphenyl)-2-(4-hexylphenyl)acetylene | 5% by weight |
| 4-(trans-4-(trans-4-ethylcyclohexyl)cyclohexyl)-benzonitrile | 4% by weight |
| 4-(trans-4-(trans-4-pentylcyclohexyl)cyclohexyl)-benzonitrile | 5% by weight |
| 1-(2-fluoro-4-(trans-4-propylcyclohexyl)phenyl)-2-(4-ethylphenyl)acetylene | 7% by weight |
| 1-(2-fluoro-4-(trans-4-propylcyclohexyl)phenyl)-2-(4-propylphenyl)acetylene | 7% by weight |

Composition example 14

| | |
|---|---|
| 1-(4-fluorophenyl)-4-(trans-4-propylcyclohexyl)-3E-buten-1-yne | 10% by weight |
| 1-(4-fluorophenyl)-4-(trans-4-pentylcyclohexyl)-3E-buten-1-yne | 12% by weight |
| 4-(trans-4-propylcyclohexyl)benzonitrile | 10% by weight |
| 1-(4-ethylphenyl)-2-(4-methoxyphenyl)acetylene | 1% by weight |
| 1-(4-propylphenyl)-2-(4-methoxyphenyl)acetylene | 1% by weight |
| 1-(4-butylphenyl)-2-(4-methoxyphenyl)acetylene | 1% by weight |
| 1-(4-butylphenyl)-2-(4-ethoxyphenyl)acetylene | 1% by weight |
| 1-(4-pentylphenyl)-2-(4-methoxyphenyl)acetylene | 1% by weight |
| 4-(trans-4-(trans-4-ethylcyclohexyl)cyclohexyl)-1,2-difluorobenzene | 8% by weight |
| 4-(trans-4-(trans-4-propylcyclohexyl)cyclohexyl)-1,2-difluorobenzene | 8% by weight |
| 4-(trans-4-(trans-4-pentylcyclohexyl)cyclohexyl)-1,2-difluorobenzene | 8% by weight |
| 4'-(trans-4-ethylcyclohexyl)-3,4-difluorobiphenyl | 6% by weight |
| 4'-(trans-4-propylcyclohexyl)-3,4-difluorobiphenyl | 6% by weight |
| 4'-(trans-4-pentylcyclohexyl)-3,4-difluorobiphenyl | 12% by weight |
| 1-(2-fluoro-4-(trans-4-propylcyclohexyl)phenyl)-2-(4-ethylphenyl)acetylene | 5% by weight |
| 1-(2-fluoro-4-(trans-4-propylcyclohexyl)phenyl)-2-(4-propylphenyl)acetylene | 5% by weight |
| 1-(2-fluoro-4-(trans-4-propylcyclohexyl)phenyl)-2-(4-butylphenyl)acetylene | 5% by weight |

Composition example 15

| | |
|---|---|
| 1-(4-trifluoromethoxyphenyl)-4-(trans-4-propylcyclohexyl)-3E-buten-1-yne | 10% by weight |
| 1-(4-trifluoromethoxyphenyl)-4-(trans-4-pentylcyclohexyl)-3E-buten-1-yne | 10% by weight |
| 4-(trans-4-propylcyclohexyl)benzonitrile | 5% by weight |
| 4-(trans-4-pentylcyclohexyl)benzonitrile | 5% by weight |
| 4-(trans-4-methoxycyclohexyl)benzonitrile | 9% by weight |
| 4-(trans-4-ethoxycyclohexyl)benzonitrile | 8% by weight |
| trans-4-(trans-4-methoxymethylcyclohexyl)cyclohexylpentane | 6% by weight |
| 1-(4-ethylphenyl)-2-(4-methoxyphenyl)acetylene | 11% by weight |
| 4-(trans-4-(trans-4-propylcyclohexyl)cyclohexyl)-fluorobenzene | 4% by weight |
| 4-(trans-4-(trans-4-propylcyclohexyl)cyclohexyl)-toluene | 8% by weight |
| 4-(trans-4-(trans-4-propylcyclohexyl)cyclohexyl)-propylbenzene | 13% by weight |
| 4-fluorophenyl trans-4-(trans-4-propylcyclohexyl)-cyclohexylcarboxylate | 4% by weight |
| 1-(4-(trans-4-propylcyclohexyl)-2-fluorophenyl)-2-(4-ethylphenyl)acetylene | 3% by weight |

Composition example 16

| | |
|---|---|
| 1-(4-trifluoromethylphenyl)-4-(trans-4-propylcyclohexyl)-3E-buten-1-yne | 10% by weight |
| 1-(4-trifluoromethylphenyl)-4-(trans-4-pentylcyclohexyl)-3E-buten-1-yne | 10% by weight |
| 4-(trans-4-heptylcyclohexyl)-1,2-difluorobenzene | 5% by weight |
| 4-(trans-4-(trans-4-propylcyclohexyl)-cyclohexyl)-fluorobenzene | 5% by weight |
| 4-(trans-4-(trans-4-ethylcyclohexyl)cyclohexyl)-1,2-difluorobenzene | 10% by weight |
| 4-(trans-4-(trans-4-propylcyclohexyl)-cyclohexyl)-1,2-difluorobenzene | 10% by weight |
| 4-(trans-4-(trans-4-pentylcyclohexyl)cyclohexyl)-1,2-difluorobenzene | 10% by weight |
| 4-(trans-4-(2-(trans-4-ethylcyclohexyl)ethynyl)-cyclohexyl)-1,2-difluorobenzene | 14% by weight |
| 4-(trans-4-(2-(trans-4-propylcyclohexyl)ethynyl)-cyclohexyl)-1,2-difluorobenzene | 7% by weight |
| 4-(trans-4-(2-(trans-4-pentylcyclohexyl)ethynyl)-cyclohexyl)-1,2-difluorobenzene | 14% by weight |
| 4'-(trans-4-ethylcyclohexyl)-3,4-difluorobiphenyl | 1.25% by weight |
| 4'-(trans-4-propylcyclohexyl)-3,4-difluorobiphenyl | 1.25% by weight |
| 4'-(trans-4-pentylcyclohexyl)-3,4-difluorobiphenyl | 2.5% by weight |

Composition example 17

| | |
|---|---|
| 1-(3,4,5-trifluorophenyl)-4-(trans-4-propylcyclohexyl)-3E-buten-1-yne | 8% by weight |
| 1-(3,4,5-trifluorophenyl)-4-(trans-4-pentylcyclohexyl)-3E-buten-1-yne | 9% by weight |
| 4-(trans-4-(trans-4-ethylcyclohexyl)cyclohexyl)-1,2-difluorobenzene | 3% by weight |
| 4-(trans-4-(trans-4-propylcyclohexyl)cyclohexyl)-1,2-difluorobenzene | 3% by weight |
| 4-(trans-4-(trans-4-pentylcyclohexyl)cyclohexyl)-1,2-difluorobenzene | 3% by weight |
| 1-(trans-4-(2-(trans-4-propylcyclohexyl)-ethynyl)-cyclohexyl)-3,4,5-trifluorobenzene | 8% by weight |
| 1-(trans-4-(2-(trans-4-butylcyclohexyl)ethynyl)-cyclohexyl)-3,4,5-trifluorobenzene | 8% by weight |

| Composition example 17 | |
|---|---|
| 1-(trans-4-(2-(trans-4-pentylcyclohexyl)ethynyl)-cyclohexyl)-3,4,5-trifluorobenzene | 8% by weight |
| 1-(trans-4-(trans-4-propylcyclohexyl)cyclohexyl)-3,4,5-trifluorobenzene | 7% by weight |
| 1-(trans-4-(trans-4-pentylcyclohexyl)cyclohexyl)-3,4,5-trifluorobenzene | 3% by weight |
| 1-(2-(trans-4-(trans-4-propylcyclohexyl)cyclohexyl)-ethynyl)-3,4,5-trifluorophenyl | 10% by weight |
| 1-(2-(trans-4-(trans-4-pentylcyclohexyl)cyclohexyl)-ethynyl)-3,4,5-trifluorophenyl | 10% by weight |
| 4'-(trans-4-propylcyclohexyl)-3,4,5-trifluorobiphenyl | 10% by weight |
| 4'-(trans-4-pentylcyclohexyl)-3,4,5-trifluorobiphenyl | 10% by weight |

| Compostion example 18 | |
|---|---|
| 1-(4-chlorophenyl)-4-(trans-4-propylcyclohexyl)-3E-buten-1-yne | 7% by weight |
| 1-(4-chlorophenyl)-4-(trans-4-pentylcyclohexyl)-3E-buten-1-yne | 7% by weight |
| 1-(4-trifluoromethylphenyl)-4-(trans-4-(2-(trans-4-propylcyclohexyl)ethynyl)cyclohexyl)-3E-buten-1-yne | 8% by weight |
| 1-(4-trifluoromethylphenyl)-4-(trans-4-(2-(trans-4-pentylcyclohexyl)ethynyl)cyclohexyl)-3E-buten-1-yne | 8% by weight |
| 4-(trans-4-ethylcyclohexyl)benzonitrile | 8% by weight |
| 4-(trans-4-propylcyclohexyl)benzonitrile | 10% by weight |
| 4-(trans-4-butylcyclohexyl)benzonitrile | 8% by weight |
| 4-(trans-4-pentylcyclohexyl)benzonitrile | 12% by weight |
| 1-(4-methylphenyl)-2-(4-ethoxyphenyl)acetylene | 5% by weight |
| 4-(2-(trans-4-(trans-4-propylcyclohexyl)cyclohexyl)-ethynyl)fluorobenzene | 4% by weight |
| 1-(4-pentylphenyl)-2-(2,3-difluoro-4-ethoxyphenyl)-acetylene | 4% by weight |
| 4-(2-(trans-4-(trans-4-propylcyclohexyl)cyclohexyl)-ethynyl)toluene | 5% by weight |
| 4-(2-(trans-4-(trans-4-propylcyclohexyl)cyclohexyl)-ethynyl)ethylbenzene | 5% by weight |
| 4-(2-(trans-4-(trans-4-propylcyclohexyl)cyclohexyl)-ethynyl)fluorobenzene | 4% by weight |
| 4-(2-(trans-4-(trans-4-propylcyclohexyl)cyclohexyl)-ethynyl)pentylbenzene | 5% by weight |

| Composition example 19 | |
|---|---|
| 1-(4-ethylphenyl)-4-(trans-4-pentylcyclohexyl)-3E-buten-1-yne | 5% by weight |
| 1-(4-pentylphenyl)-4-(trans-4-pentylcyclohexyl)-3E-buten-1-yne | 5% by weight |
| 1-(trans-4-(4-fluorophenyl)cyclohexyl)-4-(trans-4-propylcyclohexyl)-3E-buten-1-yne | 5% by weight |
| 1-(trans-4-(4-fluorophenyl)cyclohexyl)-4-(trans-4-pentylcyclohexyl)-3E-buten-1-yne | 5% by weight |
| 4-(trans-4-ethenylcyclohexyl)benzonitrile | 8% by weight |
| 4'-ethyl-4-cyanobiphenyl | 5% by weight |
| 4-(trans-4-propylcyclohexyl)benzontrile | 3% by weight |
| 4-(trans-4-(3E-pentenylcyclohexyl)benzonitrile | 10% by weight |
| 4-(trans-4-(3-butenylcyclohexyl)benzonitrile | 8% by weight |
| 4-(trans-4-propylcyclohexyl)-1-pentyl-1-cyclohexene | 10% by weight |
| 3-fluoro-4-cyanophenyl 4-ethylbenzoate | 2% by weight |
| 4-(trans-4-methoxypropylcyclohexyl)-2-fluorobenzonitrile | 3% by weight |
| 3-fluoro-4-cyanophenyl 4-propylbenzoate | 3% by weight |
| 1-(4-butylphenyl)-2-(4-ethoxyphenyl)acetylene | 3% by weight |
| 1-(4-pentylphenyl)-2-(4-ethoxyphenyl)acetylene | 3% by weight |
| 4'-(trans-4-propylcyclohexyl)-4-methoxymethylbiphenyl | 7% by weight |
| 3-fluoro-4-cyanophenyl 4-(trans-4-ethylcyclohexyl)-benzoate | 9% by weight |
| 1-(4-(trans-4-propylcyclohexyl)-2-(4-ethylphenyl)-acetylene | 6% by weight |

| Composition example 20 | |
|---|---|
| 1-(4-trifluoromethoxyphenyl)-4-(trans-4-propylcyclohexyl)-3E-buten-1-yne | 5% by weight |
| 1-(4-trifluoromethoxyphenyl)-4-(trans-4-pentylcyclohexyl)-3E-buten-1-yne | 5% by weight |
| 1-(4-trifluoromethylphenyl)-4-(trans-4-propylcyclohexyl)-3E-buten-1-yne | 5% by weight |
| 1-(4-trifluoromethylphenyl)-4-(trans-4-pentylcyclohexyl)-3E-buten-1-yne | 5% by weight |
| 4-(trans-4-pentylcyclohexyl)fluorobenzene | 9% by weight |
| 4-(trans-4-hexylcyclohexyl)fluorobenzene | 7% by weight |
| 4-(trans-4-heptylcyclohexyl)fluorobenzene | 7% by weight |
| 4-(trans-4-(trans-4-ethylcyclohexyl)cyclohexyl)-trifluoromethoxybenzene | 6% by weight |
| 4-(trans-4-(trans-4-propylcyclohexyl)cyclohexyl)-trifluoromethoxybenzene | 9% by weight |
| 4'-(trans-4-propylcyclohexyl)-3,4-difluorobiphenyl | 9% by weight |
| 4-(trans-4-(trans-4-butylcyclohexyl)cyclohexyl)-trifluoromethoxybenzene | 6% by weight |
| 4-(trans-4-(trans-4-pentylcyclohexyl)cyclohexyl)-trifluoromethoxybenzene | 8% by weight |
| 4-(2-(trans-4-(trans-4-propylcyclohexyl)cyclohexyl)-ethynyl)trifluoromethoxybenzene | 8% by weight |
| 4-(2-(trans-4-(trans-4-pentylcyclohexyl)cyclohexyl)-ethynyl)trifluoromethoxybenzene | 7% by weight |
| 4-(trans-4-propylcyclohexyl)-2'-fluoro-4'-(trans-4-pentylcyclohexyl)biphenyl | 4% by weight |

Since the compounds of the present invention have a relatively large optical anisotropy value $\Delta n$ as described above, it is possible to optionally set the optical anisotropy value of the composition, to easily adjust the optical anisotropy value $\Delta n$ to that suitable to the mode and the cell thickness of the display used.

Further, since the liquid crystal composition as described above has a high NI point, a low viscosity and a preferable ratio of elastic constants $K_{33}/K_{11}$, when the composition is filled in a TN cell or STN cell composed of transparent electrodes and two opposed glass bases having an aligned membrane optionally subjected to aligning treatment, it is possible to constitute a good display device having a rapid operation response, a large contrast ratio and a small temperature-dependency thereof.

Preparation Process

The compound of the present invention can be prepared according to the process as shown below.

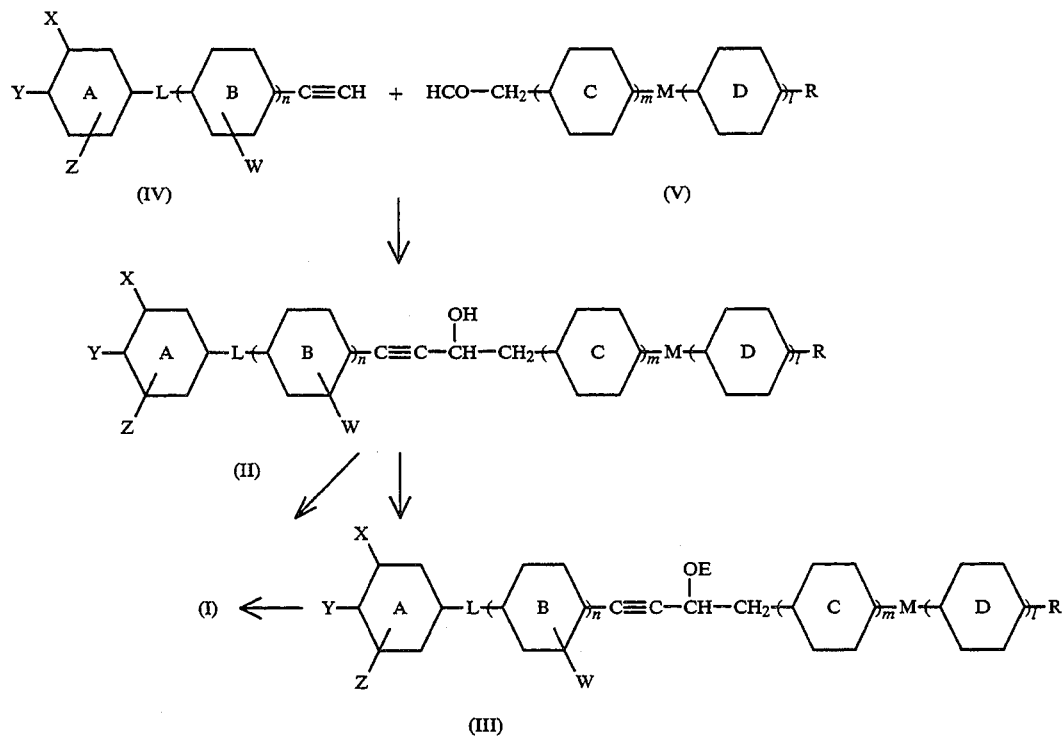

The compound of the present invention can be prepared by subjecting a propargyl alcohol derivative expressed by the following formula (II) to dehydration treatment in the presence of an acid catalyst:

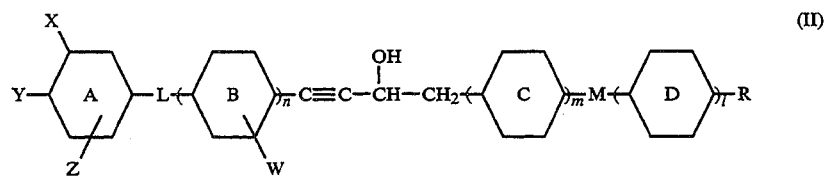

(II)

wherein A, B, C, D, l, m, n, L, M, R, W, X, Y and Z are as defined above. In the dehydration reaction, mineral acid, represented by sulfuric acid, alkylsulfonic acids, arylsulfonic acids, ion-exchange resins, and various carboxylic acids are used as the acid catalyst, but p-toluenesulfonic acid, ion-exchange resins and the like are preferable, since their handling is easy. Further, the reaction can be carried out in a suitable solvent, by means of a dehydration device, preferably represented by Dean-Stark's device, etc. As the solvent used, those which do not inhibit the reaction may be sufficient. For example, hydrocarbon solvents such as toluene, benzene, heptane, octane, etc., oxygen-containing compound solvents such as ethyl acetate, diethyl ether, t-butyl methyl ether, or the like solvents are used. The reaction temperature of the present reaction can be chosen from among the range of $-50°$ C. to the boiling point of the solvent, but it is preferred to carry out the reaction within a range of about room temperature to the boiling point of the solvent, in the aspect of rapidly advancing the reaction.

Further, the compound of the present invention can be prepared by treating an ester derivative expressed by the following formula (III) with a base:

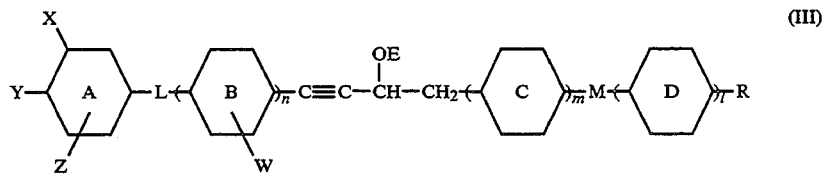

(III)

wherein A, B, C, D, l, m, n, L, M, R, W, X, Y and Z are as defined above and E represents acetyl group, alkyl group or arylsulfonyl group.

The base used in the above elimination reaction is chosen from among NaOH, KOH, $K_2CO_3$, $NaHCO_3$, NaH, $CaH_2$, $NaOCH_3$, $NaOC_2H_5$, t-BuOK, etc. The reaction is preferably carried out in a suitable solvent. Examples of preferable solvents are tetrahydrofuran, dioxane, dimethylsulfoxide, butanol, ethanol, diethyl ether, ethyl acetate, toluene, benzene, etc. Among these, tetrahydrofuran, dioxane, dimethylsulfoxide and butanol are more preferable in that bases are highly soluble therein. The reaction temperature of this reaction is chosen from a range of −78° C. to the boiling point of the solvent, but a range of −20° C. to room temperature is preferable in that the selectivity is good and no side reaction proceeds.

The compound expressed by the formula (III) can be easily prepared by esterifying the propargyl alcohol derivative expressed by the formula (II) with the corresponding esterification agent.

The propargyl alcohol derivative expressed by the formula (II) can be prepared for example according to the following process:

An acetylene derivative expressed by the formula (IV)

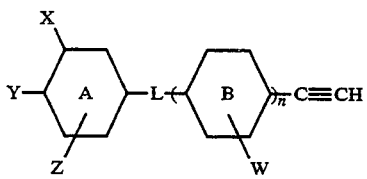

wherein A, B, n, L, W, X, Y and Z are as defined above, is treated with an organometallic agent or the like, followed by adding to the resulting metal acetylide, an aldehyde derivative expressed by the formula (V)

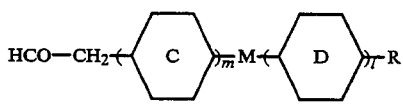

wherein C, D, m, M and R are as defined above.

The preparation of the raw compound of the compound of the present invention is carried out according to a generally known reaction of a metal acetylide with an aldehyde. The metal acetylide can be prepared by reacting acetylene with an alkyl metal such as butyllithium, methyllithium, ethylmagnesium bromide, etc. in a solvent such as tetrahydrofuran, ether, hexane, heptane, etc., or by reacting acetylene with an alkali metal such as Na, K, etc. in liquid ammonia, or by treating it with sodium hydride, potassium hydride, sodium amide, lithium amide, etc. in a solvent inactive to the solution, such as dimethylsulfoxide, dimethylformamide, tetrahydrofuran, etc. The resulting metal acetylide is, as it is, or after changed in a necessary solvent, added to the aldehyde derivative expressed by the formula (V), whereby the resulting material can be converted into a compound expressed by the formula (II). This conversion reaction can be generally carried out under cooled condition. Concretely, the reaction temperature can be chosen within a range of −100° C. to room temperature, but a range of −78° C. to 10° C. is preferred for a simple operation and a good yield. It is preferred for the reaction to carry out it in a suitable solvent, for an easy handling. As the solvent used for the reaction, those which do not inhibit the reaction itself may be sufficient, and solvents used when the metal acetylide has been prepared, or tetrahydrofuran, dioxane, ether, benzene, toluene, hexane, heptane, dimethylformamide, dimethylsulfoxide, etc. are exemplified.

Further, as to compounds having cyano group among the compounds of the present invention, it is also possible to derive a suitable, synthetic intermediate to the objective compound. Namely, a compound of the formula (I) wherein Y represents bromine or iodine is reacted with a cyanogenating agent. Examples of cyanogenating agents used are metal cyanides such as copper cyanide, sodium cyanide, potassium cyanide, etc., or organic cyanogenating agents. As the solvent used for the reaction, those which do not inhibit the reaction may be sufficient, and in particular, polar solvents such as dimethylformamide, hexamethylphosphoric triamide, methylpyrrolidone, dimethylhydantoin, sulfolane, etc. are preferable in that the reaction proceeds rapidly. The cyanogenation reaction may be carried out within a range of 0° C. to the boiling point of used solvent, but a range of room temperature to the boiling point of the solvent is preferable, since the reaction proceeds rapidly and the side reaction is few. The thus obtained compound of the present invention is isolated from the reaction system by carrying out usual post-treatment, but if necessary, a procedure for purifying the compound of the present invention may be carried out.

Further, among the compounds of the present invention, in the case of those wherein L represents carbonyloxy or oxycarbonyl, i.e. ester bond, it is also possible to choose a process of passing through a suitable synthetic intermediate.

Preparation examples in the case where L represents an ester will be shown below.

In the case of L=—COO—:

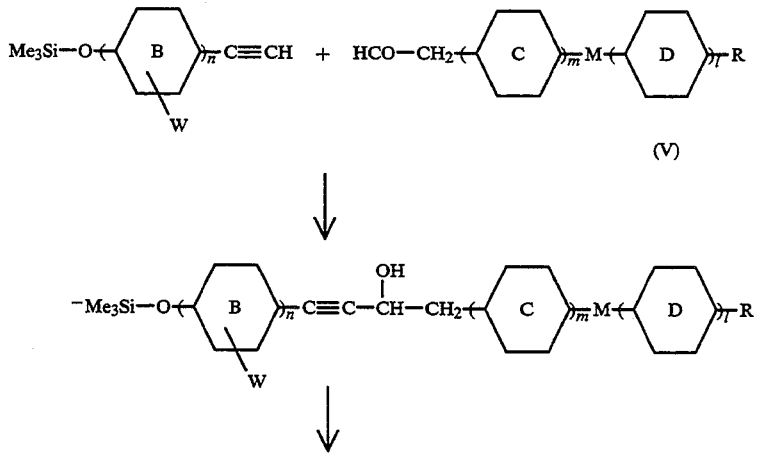

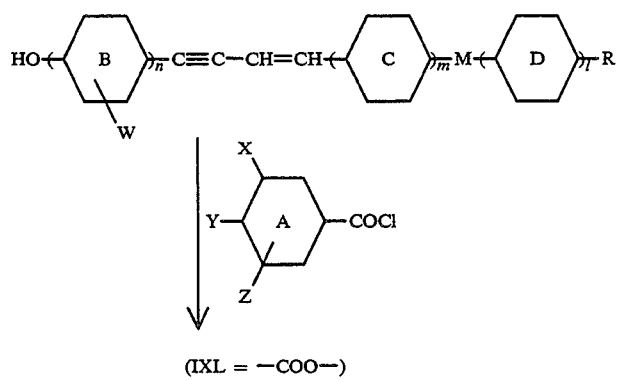
(IXL = —COO—)
In the case of L=—OCO—:
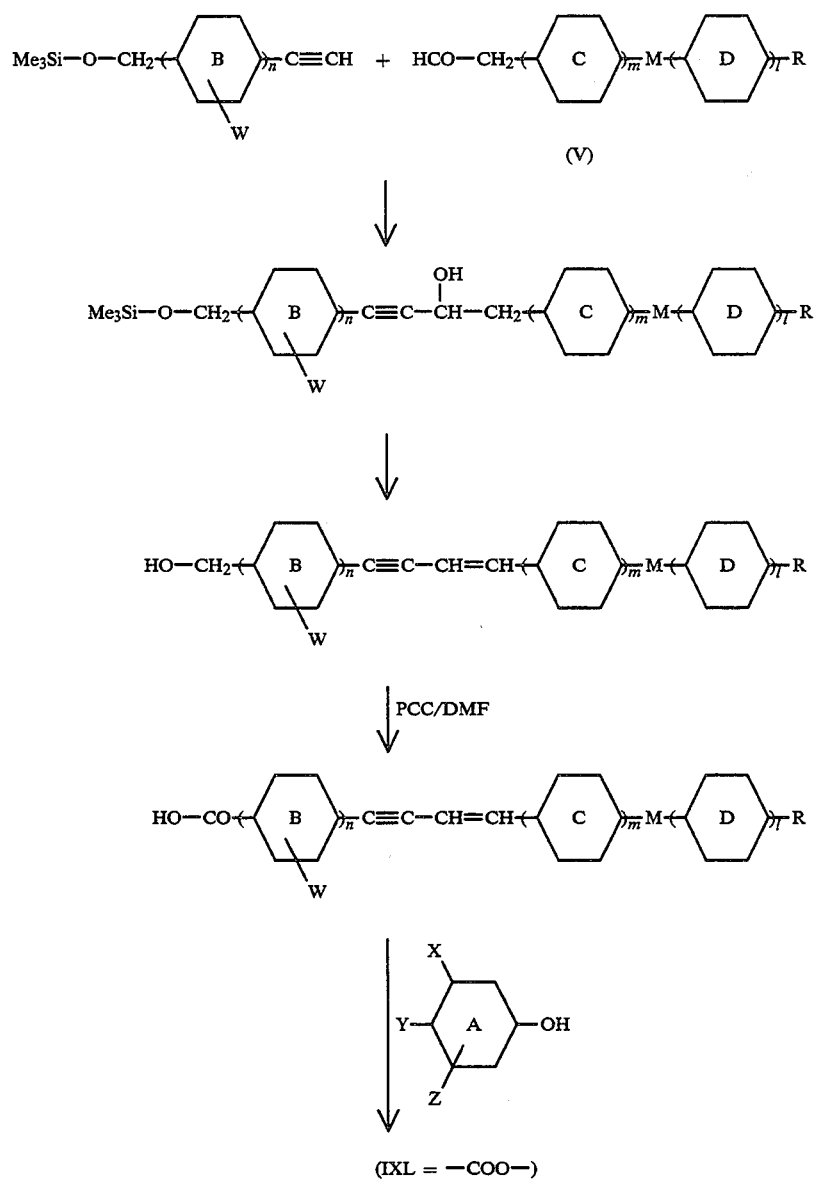
(IXL = —COO—)
The present invention will be described in more detail by way of Examples, but it should not be construed to be limited thereto.

Preparation of
1-(4-ethylphenyl)-4-(trans-4-ethylcyclohexyl-3E-buten-1-yne (a compound of the formula (I) wherein A=1,4-phenylene, C=trans-1,4-cyclohexylene, n=0, m=1, l=0, R=ethyl, X=H, Y=C$_2$H$_5$ and Z=H)

4-Ethylphenylacetylene (1.3 g) was dissolved in THF (20 ml), followed by dropwise adding an n-butyllithium-hexane solution (1.61M, 0.62 ml) under ice cooling with stirring, further stirring the reaction solution under ice cooling for 30 minutes, dropwise adding a solution of 2-(4-ethylcyclohexyl)acetaldehyde (1.5 g) in THF (10 ml), raising the temperature of the reaction solution up to room temperature after completion of the addition, stirring it for 5 hours, adding dilute hydrochloric acid (5 ml) to the resulting raw solution, extracting with ethyl acetate (50 ml), washing the organic layer with water, drying over anhydrous MgSO$_4$ and concentrating under reduced pressure, to obtain a brown oil, which was then recrystallized from an ethyl acetate-heptane mixed solution, to obtain white crystals of 1-(4-ethylphenyl)-4-(4-ethylcyclohexyl)-1-butyn-3-ol (2.3 g).

The thus obtained carbinol substance (2.3 g) and p-toluenesulfonic acid (100 ml) were placed in a flask equipped with Dean-Stark's device, followed by dissolving them in toluene (100 ml), heating the solution under reflux with stirring for 8 hours, washing the reaction solution with water, drying over anhydrous MgSO$_4$ and concentrating under reduced pressure to obtain a brown oil, which was then purified according to silica gel column chromatography and recrystallized from ethanol, to obtain the captioned compounds (colorless crystals) (0.7 g).

CN 19.7°-20.6° C., NI 42.5°-42.7° C.

EXAMPLE 2

Preparation of 1-(4-ethylphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=ethyl and Z=H)

The captioned compound (0.8 g) was obtained from 1-(4-ethylphenyl)-4-(4-propylcyclohexyl)-1-butyn-3-ol (2.6 g), prepared from 4-ethylphenylacetylene (1.3 g) and 2-(4-propylcyclohexyl)acetaldehyde (1.7 g) in the same manner as in Example 1.

CN 31.3°-31.9° C. NI 80.3°-81.1° C.

EXAMPLE 3

Preparation of 1-(4-ethylphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=ethyl and Z=H)

The captioned compound (0.9 g) was obtained from 1-(4-ethylphenyl)-4-(4-pentylcyclohexyl)-1-butyn-3-ol (2.8 g) prepared from 4-ethylphenylacetylene (1.3 g) and 2-(4-pentylcyclohexyl)acetaldehyde (2.0 g) in the same manner as in Example 1.

CN 20.7°-21.9° C. NI 81.7°-82.0° C.

EXAMPLE 4

Preparation of 1-(4-propylphenyl)-4-(trans-4-ethylcyclohexyl)-3E-buten-1-yne (a compound of the formula (I) wherein A=1,4-phenylene, C=trans-1,4-cyclohexylene, n=0, m=1, l=0, R=ethyl, X=H, Y=propyl and Z=H)

The captioned compound (0.9 g) was obtained from 1-(4-propylphenyl)-4-(4-ethylcyclohexyl)-1-butyn-3-ol (2.2 g), prepared from 4-propylphenylacetylene (1.5 g) and 2-(4-ethylcyclohexyl)acetaldehyde (1.5 g) in the same manner as in Example 1.

CN 27.8°-28.5° C. NI 56.2°-59.4° C.

EXAMPLE 5

Preparation of 1-(4-propylphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=propyl and Z=H)

The captioned compound (1.0 g) was obtained from 1-(4-propylphenyl)-4-(4-propylcyclohexyl)-1-butyn-3-ol (2.9 g), prepared from 4-propylphenylacetylene (1.5 g) and 2-(4-propylcyclohexyl)acetaldehyde (1.7 g), in the same manner as in Example 1.

CN 51.6°-53.0° C. NI 93.8°-94.0° C.

EXAMPLE 6

Preparation of 1-(4-propylphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=propyl and Z=H)

The captioned compound (0.8 g) was obtained from 1-(4-propylphenyl)-4-(4-pentylcyclohexyl)-1-butyn-3-ol (3.1 g), prepared from 4-propylphenylacetylene (1.5 g) and 2-(4-pentylcyclohexyl)acetaldehyde (2.0 g) in the same manner as in Example 1.

CN 31.7°-33.1° C. NI 92.2°-92.5° C.

EXAMPLE 7

Preparation of 1-(4-butylphenyl)-4-(trans-4-ethylcyclohexyl)-3E-buten-1-yne (a compound of the formula (I) wherein A=1,4-phenylene, C=trans-1,4-cyclohexylene, n=0, m=1, l=0, R=ethyl, X=H, Y=butyl and Z=H)

The captioned compound (0.5 g) was obtained from 1-(4-butylphenyl)-4-(4-ethylcyclohexyl)-1-butyn-3-ol (2.0 g), prepared from 4-butylphenylacetylene (1.6 g) and 2-(4-ethylcyclohexyl)acetaldehyde (1.5 g) in the same manner as in Example 1.

CN 19.7°-20.7° C. NI 45.5°-46.7° C.

EXAMPLE 8

Preparation of 1-(4-pentylphenyl)-4-(trans-4-ethylcyclohexyl)-3E-buten-1-yne (a compound of the formula (I) wherein A=1,4-phenylene, C=trans-1,4-cyclohexylene, n=0 m=1, l=0, R=ethyl, X=H, Y=pentyl and Z=H)

The captioned compound (0.6 g) was obtained from 1-(4-pentylphenyl-4-(4-ethylcyclohexyl)-1-butyn-3-ol (2.2 g) prepared from 4-pentylphenylacetylene (1.7 g) and 2-(4-ethylcyclohexyl)acetaldehyde (1.5 g) in the same manner as in Example 1.

CN 28.9°-29.6° C. NI 55.0°-56.1° C.

EXAMPLE 9

Preparation of
1-(4-pentylphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=pentyl and Z=H)

The captioned compound (0.7 g) was obtained from 1-(4-pentylphenyl)-4-(4-propylcyclohexyl)-1-butyn-3-ol (2.6 g) prepared from 4-pentylphenylacetylene (1.7 g) and 2-(4-propylcyclohexyl)acetaldehyde (1.7 g) in the same manner as in Example 1.
CN 47.5°–48.7° C. NI 90.3°–90.8° C.

EXAMPLE 10

Preparation of
1-(4-pentylphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=pentyl and Z=H)

The captioned compound (0.6 g) was obtained from 1-(4-pentylphenyl)-4-(4-pentylcyclohexyl)-1-butyn-3-ol (2.5 g) prepared from 4-pentylphenylacetylene (1.7 g) and 2-(4-pentylcyclohexyl)acetaldehyde (2.0 g) in the same manner as in Example 1.
CN 36.1°–37.2° C. NI 78.5°–79.3° C.

EXAMPLE 11

Preparation of
1-(4-methoxyphenyl)-4-(trans-4-ethylcyclohexyl)-3E-buten-1-yne (a compound of the formula (I) wherein A=1,4-phenylene, C=trans-1,4-cyclohexylene, n=0, m=1, l=0, R=ethyl, X=H, Y=methoxy and Z=H)

The captioned compound (0.4 g) was obtained from 1-(4-methoxyphenyl)-4-(4-ethylcyclohexyl)-1-butyn-3-ol (2.5 g) prepared from 4-methoxyphenylacetylene (1.3 g) and 2-(4-ethylcyclohexyl)acetaldehyde (1.5 g) in the same manner as in Example 1.
CN 29.3°–31.3° C. NI 80.9°–82.1° C.

EXAMPLE 12

Preparation of
1-(4-methoxyphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=methoxy and Z=H)

The captioned compound (0.6 g) was obtained from 1-(4-methoxyphenyl)-4-(4-propylcyclohexyl)-1-butyn-3-ol (2.8 g), prepared from 4-methoxyphenylacetylene (1.3 g) and 2-(4-propylcyclohexyl)acetaldehyde (1.7 g), in the same manner as in Example 1.
CN 45.9°–47.1° C. NI 113.3°–114.5° C.

EXAMPLE 13

Preparation of
1-(4-methoxyphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=methoxy and Z=H)

The captioned compound (0.5 g) was obtained from 1-(4-methoxyphenyl)-4-(4-pentylcyclohexyl)-1-butyn-3-ol (2.8 g), prepared from 4-methoxyphenylacetylene (1.3 g) and 2-(4-pentylcyclohexyl)acetaldehyde (2.0 g), in the same manner as in Example 1.
CN 35.3°–36.7° C. NI 117.3°–117.6° C.

EXAMPLE 14

Preparation of
1-(4-ethoxyphenyl)-4-(trans-4-ethylcyclohexyl)-3E-buten-1-yne (a compound of the formula (I) wherein A=1,4-phenylene, C=trans-1,4-cyclohexylene, n=0, m=1, l=0, R=ethyl, X=H, Y=ethoxy and Z=H)

The captioned compound (0.3 g) was obtained from 1-(4-ethoxyphenyl)-4-(4-ethylcyclohexyl)-1-butyn-3-ol (2.2 g) prepared from 4-ethoxyphenylacetylene (1.5 g) and 2-(4-ethylcyclohexyl)acetaldehyde (1.5 g) in the same manner as in Example 1.
CN 62.3°–64.0° C. NI 104.2°–105.6° C.

EXAMPLE 15

Preparation of
1-(4-ethoxyphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=ethoxy and Z=H)

The captioned compound (0.4 g) was obtained from 1-(4-ethoxyphenyl)-4-(4-propylcyclohexyl)-1-butyn-3-ol (2.5 g), prepared from 4-ethoxyphenylacetylene (1.5 g) and 2-(4-propylcyclohexyl)acetaldehyde (1.7 g) in the same manner as in Example 1.
CN 79.8°–80.3° C. NI 135.8°–136.1° C.

EXAMPLE 16

Preparation of
1-(4-ethoxyphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=ethoxy and Z=H)

The captioned compound (0.4 g) was obtained from 1-(4-ethoxyphenyl)-4-(4-pentylcyclohexyl)-1-butyn-3-ol (3.1 g), prepared from 4-ethoxyphenylacetylene (1.5 g) and 2-(4-pentylcyclohexyl)acetaldehyde (2.0 g), in the same manner as in Example 1.
CN 68.9°–70.0 ° C. NI 126.9°–128.8 ° C.

EXAMPLE 17

Preparation of
1-(4-propoxyphenyl)-4-(trans-4-ethylcyclohexyl)-3E-buten-1-yne (a compound of the formula (I) wherein A=1,4-phenylene, C=trans-1,4-cyclohexylene, n=0, m=1, l=0, R=ethyl, X=H, Y=propoxy and Z=H)

The captioned compound (0.3 g) was obtained from 1-(4-propoxyphenyl)-4-(4-ethylcyclohexyl)-1-butyn-3-ol (2.7 g), prepared from 4-propoxyphenylacetylene (1.6 g) and 2-(4-ethylcyclohexyl)acetaldehyde (1.5 g), in the same manner as in Example 1.
CN 60.9°–62.3° C. NI 98.7°–99.3° C.

EXAMPLE 18

Preparation of
1-(4-propoxyphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=propoxy and Z=H)

The captioned compound (0.5 g) was obtained from 1-(4-propoxyphenyl)-4-(4-propylcyclohexyl)-1-butyn-3-ol (3.1 g), prepared from 4-propoxyphenylacetylene (1.6 g) and 2-(4-propylcyclohexyl)acetaldehyde (1.7 g), in the same manner as in Example 1.
CN 72.1°–73.4° C. NI 127.2°–128.2° C.

EXAMPLE 19

Preparation of
1-(4-propoxyphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=propoxy and Z=H)

The captioned compound (0.5 g) was obtained from 1-(4-propoxyphenyl)-4-(4-pentylcyclohexyl)-1-butyn-3-ol (3.1 g), prepared from 4-propoxyphenylacetylene (1.6 g) and 2-(4-pentylcyclohexyl)acetaldehyde (2.0 g), in the same manner as in Example 1.
CN 57.9°–58.8° C. NI 118.9°–120.2° C.

EXAMPLE 20

Preparation of
1-(4-butoxyphenyl)-4-(trans-4-ethylcyclohexyl)-3E-buten-1-yne (a compound of the formula (I) wherein A=1,4-phenylene, C=trans-1,4-cyclohexylene, n=0, m=1, l=0, R=ethyl, X=H, Y=butoxy and Z=H)

The captioned compound (0.3 g) was obtained from 1-(4-butoxyphenyl)-4-(4-ethylcyclohexyl)-1-butyn-3-ol (2.7 g), prepared from 4-butoxyphenylacetylene (1.7 g) and 2-(4-ethylcyclohexyl)acetaldehyde (1.5 g), in the same manner as in Example 1.
CN 55.5°–56.7° C. NI 98.5°–99.3° C.

EXAMPLE 21

Preparation of
1-(4-butoxyphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=butoxy and Z=H)

The captioned compound (0.6 g) was obtained from 1-(4-butoxyphenyl)-4-(4-propylcyclohexyl)-1-butyn-3-ol (3.1 g), prepared from 4-butoxyphenylacetylene (1.7 g) and 2-(4-propylcyclohexyl)acetaldehyde (1.7 g), in the same manner as in Example 1.
CN 63.9°–65.3° C. NI 126.1°–126.8° C.

The following compounds are prepared in the same process as the above:

1-(2-fluoro-4-ethoxyphenyl)-4-(trans-4-pentylcyclohexyl)-3E-buten-1-yne
1-(2-fluoro-4-propoxyphenyl)-4-(trans-4-pentylcyclohexyl)-3E-buten-1-yne
1-(2-fluoro-4-butoxyphenyl)-4-(trans-4-pentylcyclohexyl)-3 E-buten-1-yne
1-(2-fluoro-4-pentoxyphenyl)-4-(trans-4-pentylcyclohexyl)-3E-buten-1-yne
1-(2-fluoro-4-ethoxyphenyl)-4-(trans-4-butylcyclohexyl)-3E-buten-1-yne
1-(2-fluoro-4-propoxyphenyl)-4-(trans-4-butylcyclohexyl)-3E-buten-1-yne
1-(2-fluoro-4-butoxyphenyl)-4-(trans-4-butylcyclohexyl)-3E-buten-1-yne
1-(2-fluoro-4-pentoxyphenyl)-4-(trans-4-butylcyclohexyl)-3E-buten-1-yne
1-(2-fluoro-4-ethoxyphenyl)-4-(trans-4-propylcyclohexyl)-3E-buten-1-yne
1-(2-fluoro-4-propoxyphenyl)-4-(trans-4-propylcyclohexyl)-3E-buten-1-yne
1-(2-fluoro-4-butoxyphenyl)-4-(trans-4-propylcyclohexyl)-3E-buten-1-yne
1-(2-fluoro-4-pentoxyphenyl)-4-(trans-4-propylcyclohexyl)-3E-buten-1-yne
1-(2-fluoro-4-ethoxyphenyl)-4-(trans-4-ethylcyclohexyl)-3E-buten-1-yne
1-(2-fluoro-4-propoxyphenyl)-4-(trans -4-ethylcyclohexyl)-3E-buten-1-yne
1-(2-fluoro-4-butoxyphenyl)-4-(trans-4-ethylcyclohexyl)-3E-buten-1-yne
1-(2-fluoro-4-pentoxyphenyl)-4-(trans-4-ethylcyclohexyl)-3E-buten-1-yne

EXAMPLE 22

Preparation of
1-(4-butoxyphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=butoxy and Z=H)

The captioned compound (0.4 g) was obtained from 1-(4-butoxyphenyl)-4-(4-pentylcyclohexyl)-1-butyn-3-ol (2.6 g), prepared from 4-butoxyphenylacetylene (1.7 g) and 2-(4-pentylcyclohexyl)acetaldehyde (2.0 g), in the same manner as in Example 1.
CN 60.4°–61.7° C. NI 126.8°–127.1° C.

The following compounds are prepared in the same manner as the above:

1-(2-fluoro-4-ethylphenyl)-4-(trans-4-pentylcyclohexyl)-3E-buten-1-yne
1-(2-fluoro-4-propylphenyl)-4-(trans-4-pentylcyclohexyl)-3E-buten-1-yne
1-(2-fluoro-4-butylphenyl)-4-(trans-4-pentylcyclohexyl)-3E-buten-1-yne
1-(2-fluoro-4-pentylphenyl)-4-(trans-4-pentylcyclohexyl)-3E-buten-1-yne
1-(2-fluoro-4-ethylphenyl)-4-(trans-4-butylcyclohexyl)-3E-buten-1-yne
1-(2-fluoro-4-propylphenyl)-4-(trans-4-butylcyclohexyl)-3E-buten-1-yne
1-(2-fluoro-4-butylphenyl)-4-(trans-4-butylcyclohexyl)-3E-buten-1-yne
1-(2-fluoro-4-pentylphenyl)-4-(trans-4-butylcyclohexyl)-3E-buten-1-yne
1-(2-fluoro-4-ethylphenyl)-4-(trans-4-propylcyclohexyl)-3E-buten-1-yne
1-(2-fluoro-4-propylphenyl)-4-(trans-4-propylcyclohexyl)-3E-buten-1-yne
1-(2-fluoro-4-butylphenyl)-4-(trans-4-propylcyclohexyl)-3E-buten-1-yne
1-(2-fluoro-4-pentylphenyl)-4-(trans-4-propylcyclohexyl)-3E-buten-1-yne
1-(2-fluoro-4-ethylphenyl)-4-(trans-4-ethylcyclohexyl)-3E-buten-1-yne
1-(2-fluoro-4-propylphenyl)-4-(trans-4-ethylcyclohexyl)-3E-buten-1-yne
1-(2-fluoro-4-butylphenyl)-4-(trans-4-ethylcyclohexyl)-3E-buten-1-yne
1-(2-fluoro-4-pentylphenyl)-4-(trans-4-ethylcyclohexyl)-3E-buten-1-yne

EXAMPLE 23

Preparation of
1-(4-ethylphenyl)-4-(trans-4-(trans-4-pentylcyclohexyl)cyclohexyl)-3E-buten-1-yne (a compound of the formula (I) wherein A=1,4-phenylene, C=trans-1,4-cyclohexylene, D=trans-1,4-cyclohexylene, n=0, m=1, l=1, R=pentyl, X=H, Y=ethyl and Z=H)

The captioned compound (0.6 g) was obtained from 1-(4-ethylphenyl)-4-(4-(4-pentylcyclohexyl)cyclohexyl)-1-butyn-3-ol (3.0 g), prepared from 4-ethylphenylacetylene (1.3 g) and 2-(4-(4-pentylcyclohexyl)cyclohexyl)acetaldehyde (cis: trans=1:7) (2.9 g), in the same manner as in Example 1.

$S_A S_B$ 117.5°–117.8° C. $S_B N$ 131.1°–134.5° C. NI 238.1°–244.9° C.

The following compounds are prepared in the same manner as the above:

1-(4-ethylphenyl)-4-(trans-4-(trans-4-ethylcyclohexyl)cyclohexyl)-3E-buten-1-yne
1-(4-ethylphenyl)-4-(trans-4-(trans-4-propylcyclohexyl)cyclohexyl)-3E-buten-1-yne
1-(4-ethylphenyl)-4-(trans-4-(trans-4-butylcyclohexyl)cyclohexyl)-3E-buten-1-yne
1-(4-propylphenyl)-4-(trans-4-(trans-4-ethylcyclohexyl)cyclohexyl)-3E-buten-1-yne
1-(4-propylphenyl)-4-(trans-4-(trans-4-propylcyclohexyl)cyclohexyl)-3E-buten-1-yne,
1-(4-propylphenyl)-4-(trans-4-(trans-4-butylcyclohexyl)cyclohexyl)-3E-buten-1-yne
1-(4-propylphenyl)-4-(trans-4-(trans-4-pentylcyclohexyl)cyclohexyl)-3E-buten-1-yne
1-(4-pentylphenyl)-4-(trans-4-(trans-4-ethylcyclohexyl)cyclohexyl)-3E-buten-1-yne
1-(4-pentylphenyl)-4-(trans-4-(trans-4-propylcyclohexyl)cyclohexyl)-3E-buten-1-yne
1-(4-pentylphenyl)-4-(trans-4-(trans-4-butylcyclohexyl)cyclohexyl)-3E-buten-1-yne
1-(4-pentylphenyl)-4-(trans-4-(trans-4-pentylcyclohexyl)cyclohexyl)-3E-buten-1-yne
1-(4-ethylphenyl)-4-(trans-4-(2-(trans-4-ethylcyclohexyl)ethyl)cyclohexyl)-3E-buten-1-yne
1-(4-ethylphenyl)-4-(trans-4-(2-(trans-4-propylcyclohexyl)ethyl)cyclohexyl)-3E-buten-1-yne
1-(4-ethylphenyl)-4-(trans-4-(2-(trans-4-butylcyclohexyl)ethyl)cyclohexyl)-3E-buten-1-yne
1-(4-propylphenyl)-4-(trans-4-(2-(trans-4-ethylcyclohexyl)ethyl)cyclohexyl)-3E-buten-1-yne
1-(4-propylphenyl)-4-(trans-4-(2-(trans-4-propylcyclohexyl)ethyl)cyclohexyl)-3E-buten-1-yne
1-(4-propylphenyl)-4-(trans-4-(2-(trans-4-butylcyclohexyl)ethyl)cyclohexyl)-3E-buten-1-yne
1-(4-propylphenyl)-4-(trans-4-(2-(trans-4-pentylcyclohexyl)ethyl)cyclohexyl)-3E-buten-1-yne
1-(4-pentylphenyl)-4-(trans-4-(2-(trans-4-ethylcyclohexyl)ethyl)cyclohexyl)-3E-buten-1-yne
1-(4-pentylphenyl)-4-(trans-4-(2-(trans-4-propylcyclohexyl)ethyl)cyclohexyl)-3E-buten-1-yne
1-(4-pentylphenyl)-4-(trans-4-(2-(trans-4-butylcyclohexyl)ethyl)cyclohexyl)-3E-buten-1-yne
1-(4-pentylphenyl)-4-(trans-4-(2-(trans-4-pentylcyclohexyl)ethyl)cyclohexyl)-3E-buten-1-yne

EXAMPLE 24

Preparation of 1-(4-ethoxyphenyl)-4-(trans-4-(trans-4-pentylcyclohexyl)cyclohexyl)-3E-buten-1-yne (a compound of the formula (I) wherein A=1,4-phenylene, C=trans-1,4-cyclohexylene, D=trans-1,4-cyclohexylene, n=0, m=1, l=1, R=pentyl, X=H, Y=ethoxy and Z=H)

The captioned compound (0.5 g) was obtained from 1-(4-ethoxyphenyl)-4-(4-(4-pentylcyclohexyl)cyclohexyl)-1-butyn-3-ol (2.9 g), prepared from 4-ethoxyphenylacetylene (1.5 g) and 2-(4-(4-pentylcyclohexyl)cyclohexyl)acetaldehyde (cis: trans=1:7) (2.9 g) in the same manner as in Example 1.

NI 264.3°–266.2° C.

The following compounds are prepared in the same manner as the above:

1-(4-methoxyphenyl)-4-(trans-4-(trans-4-ethylcyclohexyl)cyclohexyl)-3E-buten-1-yne
1-(4-methoxyphenyl)-4-(trans-4-(trans-4-propylcyclohexyl)cyclohexyl)-3E-buten-1-yne
1-(4-methoxyphenyl)-4-(trans-4-(trans-4-butylcyclohexyl)cyclohexyl)-3E-buten-1-yne
1-(4-ethoxyphenyl)-4-(trans-4-(trans-4-ethylcyclohexyl)cyclohexyl)-3E-buten-1-yne
1-(4-ethoxyphenyl)-4-(trans-4-(trans-4-propylcyclohexyl)cyclohexyl)-3E-buten-1-yne
1-(4-ethoxyphenyl)-4-(trans-4-(trans-4-butylcyclohexyl)cyclohexyl)-3E-buten-1-yne
1-(4-propoxyphenyl)-4-(trans-4-(trans-4-ethylcyclohexyl)cyclohexyl)-3E-buten-1-yne
1-(4-propoxyphenyl)-4-(trans-4-(trans-4-propylcyclohexyl)cyclohexyl)-3E-buten-1-yne
1-(4-propoxyphenyl)-4-(trans-4-(trans-4-butylcyclohexyl)cyclohexyl)-3E-buten-1-yne
1-(4-propoxyphenyl)-4-(trans-4-(trans-4-pentylcyclohexyl)cyclohexyl)-3E-buten-1-yne
1-(4-butoxyphenyl)-4-(trans-4-(trans-4-ethylcyclohexyl)cyclohexyl)-3E-buten-1-yne
1-(4-butoxyphenyl)-4-(trans-4-(trans-4-propylcyclohexyl)cyclohexyl)-3E-buten-1-yne
1-(4-butoxyphenyl)-4-(trans-4-(trans-4-butylcyclohexyl)cyclohexyl)-3E-buten-1-yne
1-(4-butoxyphenyl)-4-(trans-4-(trans-4-pentylcyclohexyl)cyclohexyl)-3E-buten-1-yne
1-(4-methoxyphenyl)-4-(trans-4-(2-(trans-4-ethylcyclohexyl)ethyl)cyclohexyl)-3E-buten-1-yne
1-(4-methoxyphenyl)-4-(trans-4-(2-(trans-4-propylcyclohexyl)ethyl)cyclohexyl)-3E-buten-1-yne
1-(4-methoxyphenyl)-4-(trans-4-(2-(trans-4-butylcyclohexyl)ethyl)cyclohexyl)-3E-buten-1-yne
1-(4-ethoxyphenyl)-4-(trans-4-(2-(trans-4-ethylcyclohexyl)ethyl)cyclohexyl)-3E-buten-1-yne
1-(4-ethoxyphenyl)-4-(trans-4-(2-(trans-4-propylcyclohexyl)ethyl)cyclohexyl)-3E-buten-1-yne
1-(4-ethoxyphenyl)-4-(trans-4-(2-(trans-4-butylcyclohexyl)ethyl)cyclohexyl)-3E-buten-1-yne
1-(4-propoxyphenyl)-4-(trans-4-(2-(trans-4-ethylcyclohexyl)ethyl)cyclohexyl)-3E-buten-1-yne
1-(4-propoxyphenyl)-4-(trans-4-(2-(trans-4-propylcyclohexyl)ethyl)cyclohexyl)-3E-buten-1-yne
1-(4-propoxyphenyl)-4-(trans-4-(2-(trans-4-butylcyclohexyl)ethyl)cyclohexyl)-3E-buten-1-yne
1-(4-propoxyphenyl)-4-(trans-4-(2-(trans-4-pentylcyclohexyl)ethyl)cyclohexyl)-3E-buten-1-yne
1-(4-butoxyphenyl)-4-(trans-4-(2-(trans-4-ethylcyclohexyl)ethyl)cyclohexyl)-3E-buten-1-yne
1-(4-butoxyphenyl)-4-(trans-4-(2-(trans-4-propylcyclohexyl)ethyl)cyclohexyl)-3E-buten-1-yne
1-(4-butoxyphenyl)-4-(trans-4-(2-(trans-4-butylcyclohexyl)ethyl)cyclohexyl)-3E-buten-1-yne
1-(4-butoxyphenyl)-4-(trans-4-(2-(trans-4-pentylcyclohexyl)ethyl)cyclohexyl)-3E-buten-1-yne

EXAMPLE 25

Preparation of 1-(4-methoxyphenyl)-4-(trans-4-butoxy-cyclohexyl)-3E-buten-1-yne (a compound of the formula (I) wherein A=1,4-phenylene, C=trans-1,4-cyclohexylene, n=0, m=1, l=0, R=butoxy, X=H, Y=methoxy and Z=H)

The captioned compound (0.6 g) was obtained from 1-(4-methoxyphenyl)-4-(4-butoxycyclohexyl)-1-butyn- 3-ol (3.3 g), prepared from 4-methoxyphenylacetylene (1.5 g) and 2-(4-butoxycyclohexyl)acetaldehyde (2.0 g), in the same manner as in Example 1.
CN 71.1°–72.3° C. NI 84.2°–84.4° C.

EXAMPLE 26

Preparation of
1-(4-ethoxyphenyl)-4-(trans-4-butoxycyclohexyl-3E-buten-1-yne (a compound of the formula (I) wherein A=1,4-phenylene, C=trans-1,4-cyclohexylene, n=0, m=1, l=0, R=butoxy, X=H, Y=ethoxy and Z=H)

The captioned compound (0.6 g) was obtained from 1-(4-ethoxyphenyl)-4-(4-butoxycyclohexyl)-1-butyn-3-ol (3.3 g), prepared from 4-ethoxyphenylacetylene (1.5 g) and 2-(4-butoxycyclohexyl)acetaldehyde (2.0 g), in the same manner as in Example 1.
CN 62.2°–62.8° C. NI 63.7°–66.0° C.

EXAMPLE 27

Preparation of
1-(4-methoxyphenyl)-4-(trans-4-ethenylcyclohexyl)-3E-buten-1-yne (a compound of the formula (I) wherein A=1,4-phenylene, C=trans-1,4-cyclohexylene, n=0, m=1, l=0, R=butoxy, X=H, Y=ethenyl and Z=H)

The captioned compound (0.6 g) was obtained from 1-(4-ethoxyphenyl)-4-(4-ethenylcyclohexyl)-1-butyn-3-ol (3.3 g), prepared from 4-ethoxyphenylacetylene (1.5 g) and 2-(4-ethenylcyclohexyl)acetaldehyde (2.0 g), in the same manner as in Example 1.

The following compounds are prepared in the same manner as the above:
1-(4-ethylphenyl)-4-(trans-4-ethenylcyclohexyl)-3E-buten-1-yne
1-(4-propylphenyl)-4-(trans-4-(2-propenyl)cyclohexyl)-3E-buten-1-yne
1-(4-ethylphenyl)-4-(trans-4-(2E-butenyl)cyclohexyl)-3E-buten-1-yne
1-(4-propylphenyl)-4-(trans-4-(2E-butenyl)cyclohexyl)-3E-buten-1-yne
1-(4-pentylphenyl)-4-(trans-4-(2E-butenyl)cyclohexyl)-3E-buten-1-yne
1-(2-fluoro-4-ethylphenyl)-4-(trans-4-ethenylcyclohexyl)-3E-buten-1-yne
1-(2-fluoro-4-pentylphenyl)-4-(trans-4-ethenylcyclohexyl)-3E-buten-1-yne
1-(4-cyanophenyl)-4-(trans-4-ethenylcyclohexyl)-3E-buten-1-yne

EXAMPLE 28

Preparation of
1-(4-(trans-4-propylcyclohexyl)phenyl)-4-(trans-4-pentylcyclohexyl)-3E-buten-1-yne (a compound of the formula (I) wherein A=trans-1,4-cyclohexylene, B=1,4-phenylene, C=trans-1,4-cyclohexylene, n=1, m=1, l=0, R=pentyl, X=H, Y=propyl and Z=H)

The captioned compound (1.0 g) was obtained from 1-(4-(trans-4-propylcyclohexyl)phenyl)-4-(trans-4-pentylcyclohexyl)-1-butyn-3-ol (3.3 g) prepared from 4-(trans-4-propylcyclohexyl)phenylacetylene (2.0 g) and 2-(4-pentylcyclohexyl)acetaldehyde (2.0 g), in the same manner as in Example 1.
CN 110.1°–113.6° C. NI 229.8°–233.0° C.

The following compounds are prepared in the same manner as the above.
1-(4-(trans-4-ethylcyclohexyl)phenyl)-4-(trans-4-methylcyclohexyl)-3E-buten-1-yne
1-(4-(trans-4- ethylcyclohexyl)phenyl)-4-(trans-4-ethylcyclohexyl)-3E-buten-1-yne
1-(4-(trans-4-ethylcyclohexyl)phenyl)-4-(trans-4-propylcyclohexyl)-3E-buten-1-yne
1-(4-(trans-4-ethylcyclohexyl)phenyl)-4-(trans-4-butylcyclohexyl)-3E-buten-1-yne
1-(4-(trans-4-ethylcyclohexyl)phenyl)-4-(trans-4-pentylcyclohexyl)-3E-buten-1-yne
1-(4-(trans-4-propylcyclohexyl)phenyl)-4-(trans-4-methylcyclohexyl)-3E-buten-1-yne
1-(4-(trans-4-propylcyclohexyl)phenyl)-4-(trans-4-ethylcyclohexyl)-3E-buten-1-yne
1-(4-(trans-4-propylcyclohexyl)phenyl)-4-(trans-4-propylcyclohexyl)-3E-buten-1-yne
1-(4-(trans-4-propylcyclohexyl)phenyl)-4-(trans-4-butylcyclohexyl)-3E-buten-1-yne
1-(4-(trans-4-propylcyclohexyl)phenyl)-4-(trans-4-hexylcyclohexyl)-3E-buten-1-yne
1-(4-(trans-4-butylcyclohexyl)phenyl)-4-(trans-4-methylcyclohexyl)-3E-buten-1-yne
1-(4-(trans-4-butylcyclohexyl)phenyl)-4-(trans-4-ethylcyclohexyl)-3E-buten-1-yne
1-(4-(trans-4-butylcyclohexyl)phenyl)-4-(trans-4-propylcyclohexyl)-3E-buten-1-yne
1-(4-(trans-4-butylcyclohexyl)phenyl)-4-(trans-4-butylcyclohexyl)-3E-buten-1-yne
1-(4-(trans-4-butylcyclohexyl)phenyl)-4-(trans-4-hexylcyclohexyl)-3E-buten-1-yne
1-(4-(trans-4-pentylcyclohexyl)phenyl)-4-(trans-4-methylcyclohexyl)-3E-buten-1-yne
1-(4-(trans-4-pentylcyclohexyl)phenyl)-4-(trans-4-ethylcyclohexyl)-3E-buten-1-yne
1-(4-(trans-4-pentylcyclohexyl)phenyl)-4-(trans-4-propylcyclohexyl)-3E-buten-1-yne
1-(4-(trans-4-pentylcyclohexyl)phenyl)-4-(trans-4-butylcyclohexyl)-3E-buten-1-yne
1-(4-(trans-4-pentylcyclohexyl)phenyl)-4-(trans-4-hexylcyclohexyl)-3E-buten-1-yne
1-(4-(trans-4-ethoxycyclohexyl)phenyl)-4-(trans-4-methylcyclohexyl)-3E-buten-1-yne
1-(4-(trans-4-ethoxycyclohexyl)phenyl)-4-(trans-4-ethylcyclohexyl)-3E-buten-1-yne
1-(4-(trans-4-propoxycyclohexyl)phenyl)-4-(trans-4-propylcyclohexyl)-3E-buten-1-yne
1-(4-(trans-4-butoxycyclohexyl)phenyl)-4-(trans-4-butylcyclohexyl)-3E-buten-1-yne
1-(4-(trans-4-methoxycyclohexyl)phenyl)-4-(trans-4-pentylcyclohexyl)-3E-buten-1-yne
1-(4'-ethylbiphenyl)-4-(trans-4-ethylcyclohexyl)-3E-buten-1-yne
1-(4'-ethylbiphenyl)-4-(trans-4-propylcyclohexyl)-3E-buten-1-yne
1-(4'-ethylbiphenyl)-4-(trans-4-butylcyclohexyl)-3E-buten-1-yne
1-(4'-ethylbiphenyl)-4-(trans-4-pentylcyclohexyl)-3E-buten-1-yne
1-(4'-propylbiphenyl)-4-(trans-4-ethylcyclohexyl)-3E-buten-1-yne
1-(4'-propylbiphenyl)-4-(trans-4-propylcyclohexyl)-3E-buten-1-yne
1-(4'-propylbiphenyl)-4-(trans-4-butylcyclohexyl)-3E-buten-1-yne
1-(4'-propylbiphenyl)-4-(trans-4-pentylcyclohexyl)-3E-buten-1-yne
1-(4'-butylbiphenyl)-4-(trans-4-ethylcyclohexyl)-3E-buten-1-yne
1-(4'-butylbiphenyl)-4-(trans-4-propylcyclohexyl)-3E-buten-1-yne 1-(4'-butylbiphenyl)-4-(trans-4-butylcyclohexyl)-3E-buten-1-yne
1-(4'-butylbiphenyl)-4-(trans-4-pentylcyclohexyl)-3E-buten-1-yne
1-(4'-pentylbiphenyl)-4-(trans-4-ethylcyclohexyl)-3E-buten-1-yne
1-(4'-pentylbiphenyl)-4-(trans-4-propylcyclohexyl)-3E-buten-1-yne
1-(4'-pentylbiphenyl)-4-(trans-4-butylcyclohexyl)-3E-buten-1-yne
1-(4'-pentylbiphenyl)-4-(trans-4-pentylcyclohexyl)-3E-buten-1-yne
1-(4'-ethoxybiphenyl)-4-(trans-4-ethylcyclohexyl)-3E-buten-1-yne
1-(4'-ethoxybiphenyl)-4-(trans-4-propylcyclohexyl)-3E-buten-1-yne
1-(4'-ethoxybiphenyl)-4-(trans-4-butylcyclohexyl)-3E-buten-1-yne
1-(4'-ethoxybiphenyl)-4-(trans-4-pentylcyclohexyl)-3E-buten-1-yne
1-(4'-propoxybiphenyl)-4-(trans-4-ethylcyclohexyl)-3E-buten-1-yne
1-(4'-propoxybiphenyl)-4-(trans-4-propylcyclohexyl)-3E-buten-1-yne
1-(4'-propoxybiphenyl)-4-(trans-4-butylcyclohexyl)-3E-buten-1-yne
1-(4'-propoxybiphenyl)-4-(trans-4-pentylcyclohexyl)-3E-buten-1-yne
1-(4'-butoxybiphenyl)-4-(trans-4-ethylcyclohexyl)-3E-buten-1-yne
1-(4'-butoxybiphenyl)-4-(trans-4-propylcyclohexyl)-3E-buten-1-yne
1-(4'-butoxybiphenyl)-4-(trans-4-butylcyclohexyl)-3E-buten-1-yne
1-(4'-butoxybiphenyl)-4-(trans-4-pentylcyclohexyl)-3E-buten-1-yne
1-(4'-pentoxybiphenyl)-4-(trans-4-ethylcyclohexyl)-3E-buten-1-yne
1-(4'-pentoxybiphenyl)-4-(trans-4-propylcyclohexyl)-3E-buten-1-yne
1-(4'-pentoxybiphenyl)-4-(trans-4-butylcyclohexyl)-3E-buten-1-yne
1-(4'-pentoxybiphenyl)-4-(trans-4-pentylcyclohexyl)-3E-buten-1-yne
1-(4-(trans-4-ethylcyclohexyl)phenyl)-4-(trans-4-(trans-4-methylcyclohexyl)cyclohexyl)-3E-buten-1-yne
1-(4-(trans-4-ethylcyclohexyl)phenyl)-4-(trans-4-(trans-4-ethylcyclohexyl)cyclohexyl)-3E-buten-1-yne
1-(4-(trans-4-ethylcyclohexyl)phenyl)-4-(trans-4-(trans-4-propylcyclohexyl)cyclohexyl)-3E-buten-1-yne
1-(4-(trans-4-ethylcyclohexyl)phenyl)-4-(trans-4-(trans-4-butylcyclohexyl)cyclohexyl)-3E-buten-1-yne
1-(4-(trans-4-ethylcyclohexyl)phenyl)-4-(trans-4-(trans-4-pentylcyclohexyl)cyclohexyl)-3E-buten-1-yne
1-(4-(trans-4-propylcyclohexyl)phenyl)-4-(trans-4-(trans-4-methylcyclohexyl)cyclohexyl)-3E-buten-1-yne
1-(4-(trans-4-propylcyclohexyl)phenyl)-4-(trans-4-(trans-4-ethylcyclohexyl)cyclohexyl)-3E-buten-1-yne
1-(4-(trans-4-propylcyclohexyl)phenyl)-4-(trans-4-(trans-4-propylcyclohexyl)cyclohexyl)-3E-buten-1-yne
1-(4-(trans-4-propylcyclohexyl)phenyl)-4-(trans-4-(trans-4-butylcyclohexyl)cyclohexyl)-3E-buten-1-yne
1-(4-(trans-4-propylcyclohexyl)phenyl)-4-(trans-4-(trans-4-hexylcyclohexyl)cyclohexyl)-3E-buten-1-yne
1-(4-(trans-4-butylcyclohexyl)phenyl)-4-(trans-4-(trans-4-methylcyclohexyl)cyclohexyl)-3E-buten-1-yne
1-(4-(trans-4-butylcyclohexyl)phenyl)-4-(trans-4-(trans-4-ethylcyclohexyl)cyclohexyl)-3E-buten-1-yne
1-(4-(trans-4-butylcyclohexyl)phenyl)-4-(trans-4-(trans-4-propylcyclohexyl)cyclohexyl)-3E-buten-1-yne
1-(4-(trans-4-butylcyclohexyl)phenyl)-4-(trans-4-(trans-4-butylcyclohexyl)cyclohexyl)-3E-buten-1-yne
1-(4-(trans-4-butylcyclohexyl)phenyl)-4-(trans-4-(trans-4-hexylcyclohexyl)cyclohexyl)-3E-buten-1-yne
1-(4-(trans-4-pentylcyclohexyl)phenyl)-4-(trans-4-(trans-4-methylcyclohexyl)cyclohexyl)-3E-buten-1-yne
1-(4-(trans-4-pentylcyclohexyl)phenyl)-4-(trans-4-(trans-4-ethylcyclohexyl)cyclohexyl)-3E-buten-1-yne
1-(4-(trans-4-pentylcyclohexyl)phenyl)-4-(trans-4-(trans-4-propylcyclohexyl)cyclohexyl)-3E-buten-1-yne
1-(4-(trans-4-pentylcyclohexyl)phenyl)-4-(trans-4-(trans-4-butylcyclohexyl)cyclohexyl)-3E-buten-1-yne
1-(4-(trans-4-pentylcyclohexyl)phenyl)-4-(trans-4-(trans-4-hexylcyclohexyl)cyclohexyl)-3E-buten-1-yne

EXAMPLE 29

Preparation of 1-(trans-4-pentylcyclohexyl)-4-trans-4-propylcyclohexyl)-3E-buten-1-yne (a compound of the formula (I) wherein A=trans-1,4-cyclohexylene, C=trans-1,4-cyclohexylene, n=0, m=1, l=0, R=propyl, X=H, Y=pentyl and Z=H)

The captioned compound (0.1 g) was obtained from 1-(4-pentylcyclohexyl)-4-(trans-4-propylcyclohexyl)-1-butyn-3-ol (3.3 g), prepared from 4-pentylcyclohexylacetylene (1.5 g) and 2-(trans-4-propylcyclohexyl)acetaldehyde (3.0 g), in the same manner as in Example 1.

NI69.3°–71.8° C.

The following compounds are prepared in the same manner as the above:

1-(trans-4-ethylcyclohexyl)-4-(trans-4-ethylcyclohexyl)-3E-buten-1-yne
1-(trans-4-propylcyclohexyl)-4-(trans-4-ethylcyclohexyl)-3E-buten-1-yne
1-(trans-4-butylcyclohexyl)-4-(trans-4-ethylcyclohexyl)-3E-buten-1-yne
1-(trans-4-pentylcyclohexyl)-4-(trans-4-ethylcyclohexyl)-3E-buten-1-yne
1-(trans-4-ethylcyclohexyl)-4-(trans-4-propylcyclohexyl)-3E-buten-1-yne
1-(trans-4-propylcyclohexyl)-4-(trans-4-propylcyclohexyl)-3E-buten-1-yne
1-(trans-4-butylcyclohexyl)-4-(trans-4-propylcyclohexyl)-3E-buten-1-yne
1-(trans-4-pentylcyclohexyl)-4-(trans-4-propylcyclohexyl)-3E-buten-1-yne
1-(trans-4-methylcyclohexyl)-4-(trans-4-pentylcyclohexyl)-3E-buten-1-yne
1-(trans-4-ethylcyclohexyl)-4-(trans-4-pentylcyclohexyl)-3E-buten-1-yne
1-(trans-4-butylcyclohexyl)-4-(trans-4-pentylcyclohexyl)-3E-buten-1-yne 1-(trans-4-pentylcyclohexyl)-4-(trans-4-pentylcyclohexyl)-3E-buten-1-yne 1-(trans-4-(4-ethylphenyl)cyclohexyl)-4-(trans-4-ethylcyclohexyl)-3E-buten-1-yne 1-(trans-4-(4-propylphenyl)cyclohexyl)-4-(trans-4-ethylcyclohexyl)-3E-buten-1-yne 1-(trans-4-(4-butylphenyl)cyclohexyl)-4-(trans-4-ethylcyclohexyl)-3E-buten-1-yne 1-(trans-4-(4-pentylphenyl)cyclohexyl)-4-(trans-4-ethylcyclohexyl)-3E-buten-1-yne 1-(trans-4-(4-ethylphenyl)cyclohexyl)-4-(trans-4-propylcyclohexyl)-3E-buten-1-yne 1-(trans-4-(4-propylphenyl)cyclohexyl)-4-(trans-4-propylcyclohexyl)-3E-buten-1-yne 1-(trans-4-(4-butylphenyl)cyclohexyl)-4-(trans-4-propylcyclohexyl)-3E-buten-1-yne 1-(trans-4-(4-pentylphenyl)cyclohexyl)-4-(trans-4-propylcyclohexyl)-3E-buten-1-yne 1-(trans-4-(4-methylphenyl)cyclohexyl)-4-(trans-4-pentylcyclohexyl)-3E-buten-1-yne 1-(trans-4-(4-ethylphenyl)cyclohexyl)-4-(trans-4-pentylcyclohexyl)-3E-buten-1-yne 1-(trans-4-(4-butylphenyl)cyclohexyl)-4-(trans-4-pentylcyclohexyl)-3E-buten-1-yne 1-(trans-4-(4-pentylphenyl)cyclohexyl)-4-(trans-4-pentylcyclohexyl)-3E-buten-1-yne 1-(trans-4-(4-ethoxyphenyl)cyclohexyl)-4-(trans-4-ethylcyclohexyl)-3E-buten-1-yne 1-(trans-4-(4-propoxyphenyl)cyclohexyl)-4-(trans-4-ethylcyclohexyl)-3E-buten-1-yne 1-(trans-4-(4-butoxyphenyl)cyclohexyl)-4-(trans-4-ethylcyclohexyl)-3E-buten-1-yne 1-(trans-4-(4-pentoxyphenyl)cyclohexyl)-4-(trans-4-ethylcyclohexyl)-3E-buten-1-yne 1-(trans-4-(4-ethoxyphenyl)cyclohexyl)-4-(trans-4-propylcyclohexyl)-3E-buten-1-yne 1-(trans-4-(4-propoxyphenyl)cyclohexyl)-4-(trans-4-propylcyclohexyl)-3E-buten-1-yne 1-(trans-4-(4-butoxyphenyl)cyclohexyl)-4-(trans-4-propylcyclohexyl)-3E-buten-1-yne 1-(trans-4-(4-pentoxyphenyl)cyclohexyl)-4-(trans-4-propylcyclohexyl)-3E-buten-1-yne 1-(trans-4-(4-methoxyphenyl)cyclohexyl)-4-(trans-4-pentylcyclohexyl)-3E-buten-1-yne 1-(trans-4-(4-ethoxyphenyl)cyclohexyl)-4-(trans-4-pentylcyclohexyl)-3E-buten-1-yne 1-(trans-4-(4-butoxyphenyl)cyclohexyl)-4-(trans-4-pentylcyclohexyl)-3E-buten-1-yne 1-(trans-4-(4-pentoxyphenyl)cyclohexyl)-4-(trans-4-pentylcyclohexyl)-3E-buten-1-yne 1-(trans-4-trifluoromethylcyclohexyl)-4-(trans-4-ethylcyclohexyl)-3E-buten-1-yne 1-(trans-4-trifluoromethoxycyclohexyl)-4-(trans-4-ethylcyclohexyl)-3E-buten-1-yne 1-(trans-4-difluoromethoxycyclohexyl)-4-(trans-4-ethylcyclohexyl)-3E-buten-1-yne 1-(trans-4-difluoromethylcyclohexyl)-4-(trans-4-ethylcyclohexyl)-3E-buten-1-yne 1-(trans-4-trifluoromethylcyclohexyl)-4-(trans-4-propylcyclohexyl)-3E-buten-1-yne 1-(trans-4-trifluoromethoxycyclohexyl)-4-(trans-4-propylcyclohexyl)-3E-buten-1-yne 1-(trans-4-difluoromethoxycyclohexyl)-4-(trans-4-propylcyclohexyl)-3E-buten-1-yne 1-(trans-4-difluoromethylcyclohexyl)-4-(trans-4-propylcyclohexyl)-3E-buten-1-yne 1-(trans-4-trifluoromethylcyclohexyl)-4-(trans-4-pentylcyclohexyl)-3E-buten-1-yne 1-(trans-4-trifluoromethoxycyclohexyl)-4-(trans-4-pentylcyclohexyl)-3E-buten-1-yne 1-(trans-4-difluoromethoxycyclohexyl)-4-(trans-4-pentylcyclohexyl)-3E-buten-1-yne 1-(trans-4-difluoromethylcyclohexyl)-4-(trans-4-pentylcyclohexyl)-3E-buten-1-yne

EXAMPLE 30

Preparation of
1-(trans-4-(4-tolylcarbonyloxy)cyclohexyl)-4-(trans-4-pentylcyclohexyl)-3E-buten-1-yne (a compound of the formula (I) wherein A=1,4-phenylene,
B=trans-1,4-cyclohexylene,
C=trans-1,4-cyclohexylene, L=carbonyloxy, n=0, m=1, l=1, R=-pentyl, X=H, Y=methyl and Z=H)

4-Trimethylsilyloxycyclohexylacetylene (20 mmol) was dissolved in THF (20 ml), followed by dropwise adding a n-butyllithium-hexane solution (1.61M, 12.4 ml) while stirring the above solution under ice cooling, stirring the reaction solution under ice cooling for 30 minutes, dropwise adding a solution of 2-(4-pentylcyclohexyl)acetaldehyde (4.0 g) in THF (10 ml), raising the temperature of the reaction solution up to room temperature after completion of the dropwise addition, stirring it for 5 hours, adding dilute hydrochloric acid (5 ml) to the resulting raw solution, extracting the mixture with ethyl acetate (150 ml), washing the organic phase with water, drying over anhydrous MgSO$_4$, concentrating under reduced pressure to obtain a brown oil, which is recrystallized from a mixed solution of ethyl acetate-heptane, to obtain 1-(4-trimethylsilyloxycyclohexyl)-4-(4-pentylcyclohexyl)-1-butyn-3-ol (5.0 g) (white crystal).

The thus obtained carbinol substance (5.0 g) and formic acid (10 ml) were placed in a flask equipped with Dean-Stark's device, followed by dissolving them in toluene (200 ml), heating the solution under reflux with stirring for 8 hours, washing the resulting reaction solution with water, drying over anhydrous MgSO$_4$, concentrating under reduced pressure to obtain a brown oil, which was purified according to silica gel column chromatography, to obtain 1-(4-trimethylsilyloxycyclohexyl)-4-(4-pentylcyclohexyl)-3E-buten-1-yne (a colorless oil) (3.2 g).

This substance was dissolved in dimethylformamide (100 ml), followed by adding anhydrous potassium fluoride (1.0 g), stirring the mixture at room temperature for 3 hours, adding water (50 ml) to the reaction solution after completion of the stirring, extracting with ethyl acetate, drying the organic layer, concentrating to obtain a yellow oil, and purifying it according to silica gel column chromatography, to obtain 1-(4-hydroxycyclohexyl)-4-(4-pentylcyclohexyl)-3E-buten-1-yne (a colorless oil) (2.0 g) .

4-Methylbenzoyl acid chloride (1.02 g) was added to pyridine (100 ml), followed by dropwise adding 1-(4-hydroxycyclohexyl)-4-(4-pentylcyclohexyl)-3E-buten-1-yne (2.0 g), while stirring the solution of the chloride under ice-cooling, stirring the reaction solution for 2 hours after completion of the dropwise addition, adding dilute hydrochloric acid (20 ml), extracting the solution with toluene, drying the resulting organic layer, concentrating to obtain a pale-yellow oil, and isolating and purifying it according to silica gel column chromatography, to obtain the captioned compound (0.8 g).

The following compounds are prepared in the same manner as the above.

1-(trans-4-(4-tolylcarbonyloxy)cyclohexyl)-4-(trans-4-ethylcyclohexyl)-3E-buten-1-yne
1-(trans-4-(4-tolylcarbonyloxy)cyclohexyl)-4-(trans-4-propylcyclohexyl)-3E-buten-1-yne
1-(trans-4-(4-tolylcarbonyloxy)cyclohexyl)-4-(trans-4-butylcyclohexyl)-3E-buten-1-yne
1-(trans-4-(4-tolylcarbonyloxy)cyclohexyl)-4-(trans-4-pentylcyclohexyl)-3E-buten-1-yne
1-(trans-4-(4-ethylphenylcarbonyloxy)cyclohexyl)-4-(trans-4-ethylcyclohexyl)-3E-buten-1-yne
1-(trans-4-(4-ethylphenylcarbonyloxy)cyclohexyl)-4-(trans-4-propylcyclohexyl)-3E-buten-1-yne
1-(trans-4-(4-ethylphenylcarbonyloxy)cyclohexyl)-4-(trans-4-butylcyclohexyl)-3E-buten-1-yne
1-(trans-4-(4-ethylphenylcarbonyloxy)cyclohexyl)-4-(trans-4-pentylcyclohexyl)-3E-buten-1-yne
1-(trans-4-(4-propylphenylcarbonyloxy)cyclohexyl)-4-(trans-4-ethylcyclohexyl)-3E-buten-1-yne
1-(trans-4-(4-propylphenylcarbonyloxy)cyclohexyl)-4-(trans-4-propylcyclohexyl)cyclohexyl)-3E-buten-1-yne
1-(trans-4-(4-propylphenylcarbonyloxy)cyclohexyl)-4-(trans-4-butylcyclohexyl)-3E-buten-1-yne
1-(trans-4-(4-propylphenylcarbonyloxy)cyclohexyl)-4-(trans-4-pentylcyclohexyl)-3E-buten-1-yne
1-(trans-4-(4-pentylphenylcarbonyloxy)cyclohexyl)-4-(trans-4-ethylcyclohexyl)-3E-buten-1-yne
1-(trans-4-(4-pentylphenylcarbonyloxy)cyclohexyl)-4-(trans-4-propylcyclohexyl)-3E-buten-1-yne
1-(trans-4-(4-pentylphenylcarbonyloxy)cyclohexyl)-4-(trans-4-butylcyclohexyl)-3E-buten-1-yne
1-(trans-4-(4-pentylphenylcarbonyloxy)cyclohexyl)-4-(trans-4-pentylcyclohexyl)-3E-buten-1-yne EXAMPLE 31
Preparation of
1-(4-(trans-4-ethylcyclohexylcarbonyloxy)phenyl)-4-(trans-4-pentylcyclohexyl)-3E-buten-1-yne (a compound of the formula (I) wherein
A=trans-1,4-cyclohexylene, B=1,4-phenylene, C=trans-1,4-cyclohexylene, L=carbonyloxy, n=1, m=1, R=pentyl, X=H, Y=ethyl and Z=H)

4-Trimethylsilyloxymethylphenylacetylene (20 mmol) was dissolved in THF (20 ml), followed by dropwise adding n-butyllithium-hexane solution (1.61M, 12.4 ml) while stirring the above solution under ice-cooling, stirring the reaction solution under ice-cooling for 30 minutes, dropwise adding a solution of 2-(4-pentylcyclohexyl)acetaldehyde (4.0 g) in THF (10 ml), raising the temperature of the reaction solution up to room temperature after completion of the dropwise addition, stirring for 5 hours, adding dilute hydrochloric acid (5 ml) to the resulting raw solution, extracting with ethyl acetate (150 ml), washing the organic phase with water, drying over anhydrous MgSO4, concentrating under reduced pressure to obtain a brown oil, and recrystallizing it from a mixed solution of ethyl acetate-heptane, to obtain 1-(4-trimethylsilyloxymethylphenyl)-4-(trans-4-pentylcyclohexyl)-1-butyn-3-ol (white crystals) (5.0 g).

The thus obtained carbinol substance (5.0 g) and formic acid (10 ml) were placed in a flask equipped with Dean-Stark's device and dissolved in toluene (200 ml), followed by heating the solution under reflux with stirring for 8 hours, washing the resulting reaction solution with water, drying over anhydrous MgSO4, concentrating under reduced pressure, to obtain a brown oil, and purifying it according to silica gel column chromatography, to obtain 1-(4-trimethylsilyloxymethylphenyl)-4-(trans-4-pentylcyclohexyl)-3E-buten-1-yne (an uncolorless oil) (3.2 g).

The substance was dissolved in dimethylformamide (100 ml), followed by adding anhydrous potassium fluoride (1.0 g), stirring the mixture at room temperature for 3 hours, adding water (50 ml) to the reaction solution after completion of the stirring, extracting with ethyl acetate, drying the organic layer, concentrating, to obtain an yellow oil, and purifying it according to silica gel column chromatography, to obtain 1-(4-hydroxymethylphenyl)-4-(trans-4-pentylcyclohexyl)-3E-buten-1-yne (colorless oil) (2.0 g).

The thus obtained hydroxymethyl substance was dissolved in dimethylformamide (100 ml), followed by adding pyridinium chlorochomate (3.5 g) while stirring the above solution at room temperature, filtering off insolubles after completion of the stirring, concentrating the resulting solution under reduced pressure, purifying the resulting brown residue according to silica gel column chromatography and recrystallizing it from ether, to obtain 1-(4-hydroxycarbonylphenyl)-4-(trans-4-pentylcyclohexyl)-3E-buten-1-yne (1.2 g).

The carboxylic acid (1.2 g) was dissolved in toluene (50 ml), followed by adding thionyl chloride (15 ml), heating the mixture under reflux for 3 hours, adding cold water (20 ml) and ether (50 ml) to the reaction solution, just thereafter extracting, drying, concentrating the organic layer under reduced pressure, dissolving the resulting layer in pyridine (100 ml), dropwise adding 4-pentylphenol under ice-cooling with stirring, stirring the reaction solution for 2 hours after completion of the dropwise addition, adding dilute hydrochloric acid (20 ml), extracting the solution with toluene, drying the resulting organic layer, concentrating it to obtain a pale yellow oil, and isolating and purifying the resulting substance according to silica gel column chromatography, to obtain the captioned compound (0.8 g).

The following compounds are prepared in the same manner as the above.

1-(4-(trans-4-ethylcyclohexylcarbonyloxy)phenyl)-4-(trans-4-ethylcyclohexyl)-3E-buten-1-yne
1-(4-(trans-4-ethylcyclohexylcarbonyloxy)phenyl)-4-(trans-4-propylcyclohexyl)-3E-buten-1-yne
1-(4-(trans-4-ethylcyclohexylcarbonyloxy)phenyl)-4-(trans-4-butylcyclohexyl)-3E-buten-1-yne
1-(4-(trans-4-propylcyclohexylcarbonyloxy)phenyl)-4-(trans-4-ethylcyclohexyl)-3E-buten-1-yne
1-(4-(trans-4-propylcyclohexylcarbonyloxy)phenyl)-4-(trans-4-propylcyclohexyl)-3E-buten-1-yne
1-(4-(trans-4-propylcyclohexylcarbonyloxy)phenyl)-4-(trans-4-butylcyclohexyl)-3E-buten-1-yne
1-(4-(trans-4-propylcyclohexylcarbonyloxy)phenyl)-4-(trans-4-pentylcyclohexyl)-3E-buten-1-yne
1-(4-(trans-4-pentylcyclohexylcarbonyloxy)phenyl)-4-(trans-4-ethylcyclohexyl)-3E-buten-1-yne
1-(4-(trans-4-pentylcyclohexylcarbonyloxy)phenyl)-4-(trans-4-propylcyclohexyl)-3E-buten-1-yne
1-(4-(trans-4-pentylcyclohexylcarbonyloxy)phenyl)-4-(trans-4-butylcyclohexyl)-3E-buten-1-yne
1-(4-(trans-4-pentylcyclohexylcarbonyloxy)phenyl)-4-(trans-4-pentylcyclohexyl)-3E-buten-1-yne

EXAMPLE 32

Preparation of
1-(4-(4-pentylphenyloxymethyl)cyclohexyl)-4-(trans-4-pentylcyclohexyl)-3E-buten-1-yne (a compound of the formula (I) wherein A=1,4-phenylene,
B=trans-1,4-cyclohexylene,
C=trans-1,4-cyclohexylene, L=oxymethyl, n=1,
m=1, l=0, R=pentyl, X=H, Y=pentyl and Z=H)

The captioned compound was obtained from 1-(trans-4-(4-pentylphenyloxymethyl)cyclohexyl)-4-(trans-4-pentylcyclohexyl)-1-butyn-3-ol, derived from 4-(4-pentylphenyloxymethyl)cyclohexylacetylene and 2-trans-4-pentylcyclohexyl)acetadehyde, in the same manner as in Example 1.

The following compounds are prepared in the same manner as the above:

1-(trans-4-(4-ethylphenyloxymethyl)cyclohexyl)-4-(trans-4-ethylcyclohexyl)-3E-buten-1-yne
1-(trans-4-(4-ethylphenyloxymethyl)cyclohexyl)-4-(trans-4-propylcyclohexyl)-3E-buten-1-yne
1-(trans-4-(4-ethylphenyloxymethyl)cyclohexyl)-4-(trans-4-butylcyclohexyl)-3E-buten-1-yne
1-(trans-4-(4-ethylphenyloxymethyl)cyclohexyl)-4-(trans-4-pentylcyclohexyl)-3E-buten-1-yne
1-(trans-4-(4-propylphenyloxymethyl)cyclohexyl)-4-(trans-4-ethylcyclohexyl)-3E-buten-1-yne
1-(trans-4-(4-propylphenyloxymethyl)cyclohexyl)-4-(trans-4-propylcyclohexyl)-3E-buten-1-yne
1-(trans-4-(4-propylphenyloxymethyl)cyclohexyl)-4-(trans-4-butylcyclohexyl)-3E-buten-1-yne
1-(trans-4-(4-propylphenyloxymethyl)cyclohexyl)-4-(trans-4-pentylcyclohexyl)-3E-buten-1-yne
1-(trans-4-(4-butylphenyloxymethyl)cyclohexyl)-4-(trans-4-ethylcyclohexyl)-3E-buten-1-yne
1-(trans-4-(4-butylphenyloxymethyl)cyclohexyl)-4-(trans-4-propylcyclohexyl)-3E-buten-1-yne
1-(trans-4-(4-butylphenyloxymethyl)cyclohexyl)-4-(trans-4-butylcyclohexyl)-3E-buten-1-yne
1-(trans-4-(4-butylphenyloxymethyl)cyclohexyl)-4-(trans-4-pentylcyclohexyl)-3E-buten-1-yne
1-(trans-4-(4-pentylphenyloxymethyl)cyclohexyl)-4-(trans-4-ethylcyclohexyl)-3E-buten-1-yne
1-(trans-4-(4-pentylphenyloxymethyl)cyclohexyl)-4-(trans-4-propylcyclohexyl)-3E-buten-1-yne
1-(trans-4-(4-pentylphenyloxymethyl)cyclohexyl)-4-(trans-4-butylcyclohexyl)-3E-buten-1-yne
1-(trans-4-(4-ethoxyphenyloxymethyl)cyclohexyl)-4-(trans-4-ethylcyclohexyl)-3E-buten-1-yne
1-(trans-4-(4-ethoxyphenyloxymethyl)cyclohexyl)-4-(trans-4-propylcyclohexyl)-3E-buten-1-yne
1-(trans-4-(4-ethoxyphenyloxymethyl)cyclohexyl)-4-(trans-4-butylcyclohexyl)-3E-buten-1-yne
1-(trans-4-(4-ethoxyphenyloxymethyl)cyclohexyl)-4-(trans-4-pentylcyclohexyl)-3E-buten-1-yne
1-(trans-4-(4-propoxyphenyloxymethyl)cyclohexyl)-4-(trans-4-ethylcyclohexyl)-3E-buten-1-yne
1-(trans-4-(4-propoxyphenyloxymethyl)cyclohexyl)-4-(trans-4-propylcyclohexyl)-3E-buten-1-yne
1-(trans-4-(4-propoxyphenyloxymethyl)cyclohexyl)-4-(trans-4-butylcyclohexyl)-3E-buten-1-yne
1-(trans-4-(4-propoxyphenyloxymethyl)cyclohexyl)-4-(trans-4-pentylcyclohexyl)-3E-buten-1-yne
1-(trans-4-(4-butoxyphenyloxymethyl)cyclohexyl)-4-(trans-4-ethylcyclohexyl)-3E-buten-1-yne
1-(trans-4-(4-butoxyphenyloxymethyl)cyclohexyl)-4-(trans-4-propylcyclohexyl)-3E-buten-1-yne
1-(trans-4-(4-butoxyphenyloxymethyl)cyclohexyl)-4-(trans-4-butylcyclohexyl)-3E-buten-1-yne
1-(trans-4-(4-butoxyphenyloxymethyl)cyclohexyl)-4-(trans-4-pentylcyclohexyl)-3E-buten-1-yne
1-(trans-4-(4-pentoxyphenyloxymethyl)cyclohexyl)-4-(trans-4-ethylcyclohexyl)-3E-buten-1-yne
1-(trans-4-(4-pentoxyphenyloxymethyl)cyclohexyl)-4-(trans-4-propylcyclohexyl)-3E-buten-1-yne
1-(trans-4-(4-pentoxyphenyloxymethyl)cyclohexyl)-4-(trans-4-butylcyclohexyl)-3E-buten-1-yne
1-(trans-4-(4-pentoxyphenyloxymethyl)cyclohexyl)-4-(trans-4-pentylcyclohexyl)-3E-buten-1-yne

EXAMPLE 33

Preparation of
1-(4-butoxyphenyl)-4-(trans-4-(4-pentylphenyl)cyclohexyl)-3E-buten-1-yne (a compound of the formula (I) wherein A=1,4-phenylene,
C=trans-1,4-cyclohexylene, D=1,4-phenylene, n=0,
m=1, l=1, R=-pentyl, X=H, Y=butoxy and Z=H)

The captioned compound was obtained from 1-(4-butoxyphenyl)-4-(trans-4-(trans-4-pentylcyclohexyl)phenyl)-1-butyn-3-ol, derived from 4-butoxyphenylacetylene and 2-(trans-4-(trans-4-pentylcyclohexyl)cyclohexyl)acetadehyde.

The following compounds are prepared in the same manner as the above:

1-(4-ethylphenyl)-4-(trans-4-(4-ethylphenyl)cyclohexyl)-3E-buten-1-yne
1-(4-ethylphenyl)-4-(trans-4-(4-propylphenyl)cyclohexyl)-3E-buten-1-yne
1-(4-ethylphenyl)-4-(trans-4-(4-butylphenyl)cyclohexyl)-3E-buten-1-yne
1-(4-ethylphenyl)-4-(trans-4-(4-pentylphenyl)cyclohexyl)-3E-buten-1-yne
1-(4-propylphenyl)-4-(trans-4-(4-ethylphenyl)cyclohexyl)-3E-buten-1-yne
1-(4-propylphenyl)-4-(trans-4-(4-propylphenyl)cyclohexyl)-3E-buten-1-yne
1-(4-propylphenyl)-4-(trans-4-(4-butylphenyl)cyclohexyl)-3E-buten-1-yne
1-(4-propylphenyl)-4-(trans-4-(4-pentylphenyl)cyclohexyl)-3E-buten-1-yne
1-(4-butylphenyl)-4-(trans-4-(4-ethylphenyl)cyclohexyl)-3E-buten-1-yne
1-(4-butylphenyl)-4-(trans-4-(4-propylphenyl)cyclohexyl)-3E-buten-1-yne
1-(4-butylphenyl)-4-(trans-4-(4-butylphenyl)cyclohexyl)-3E-buten-1-yne
1-(4-butylphenyl)-4-(trans-4-(4-pentylphenyl)cyclohexyl)-3E-buten-1-yne
1-(4-pentylphenyl)-4-(trans-4-(4-ethylphenyl)cyclohexyl)-3E-buten-1-yne
1-(4-pentylphenyl)-4-(trans-4-(4-propylphenyl)cyclohexyl)-3E-buten-1-yne
1-(4-pentylphenyl)-4-(trans-4-(4-butylphenyl)cyclohexyl)-3E-buten-1-yne
1-(4-pentylphenyl)-4-(trans-4-(4-pentylphenyl)cyclohexyl)-3E-buten-1-yne
1-(4-ethoxyphenyl)-4-(trans-4-(4-ethylphenyl)cyclohexyl)-3E-buten-1-yne
1-(4-ethoxyphenyl)-4-(trans-4-(4-propylphenyl)cyclohexyl)-3E-buten-1-yne
1-(4-ethoxyphenyl)-4-(trans-4-(4-butylphenyl)cyclohexyl)-3E-buten-1-yne
1-(4-ethoxyphenyl)-4-(trans-4-(4-pentylphenyl)cyclohexyl)-3E-buten-1-yne 1-(4-propoxyphenyl)-4-(trans-4-(4-ethylphenyl)cyclohexyl)-3E-buten-1-yne
1-(4-propoxyphenyl)-4-(trans-4-(4-propylphenyl)cyclohexyl)-3E-buten-1-yne
1-(4-propoxyphenyl)-4-(trans-4-(4-butylphenyl)cyclohexyl)-3E-buten-1-yne
1-(4-propoxyphenyl)-4-(trans-4-(4-pentylphenyl)cyclohexyl)-3E-buten-1-yne
1-(4-butoxyphenyl)-4-(trans-4-(4-ethylphenyl)cyclohexyl)-3E-buten-1-yne
1-(4-butoxyphenyl)-4-(trans-4-(4-propylphenyl)cyclohexyl)-3E-buten-1-yne
1-(4-butoxyphenyl)-4-(trans-4-(4-butylphenyl)cyclohexyl)-3E-buten-1-yne
1-(4-pentoxyphenyl)-4-(trans-4-(4-ethylphenyl)cyclohexyl)-3E-buten-1-yne
1-(4-pentoxyphenyl)-4-(trans-4-(4-propylphenyl)cyclohexyl)-3E-buten-1-yne
1-(4-pentoxyphenyl)-4-(trans-4-(4-butylphenyl)cyclohexyl)-3E-buten-1-yne
1-(4-pentoxyphenyl)-4-(trans-4-(4-pentylphenyl)cyclohexyl)-3E-buten-1-yne
1-(4-ethylphenyl)-4-(trans-4-(4-ethoxyphenyl)cyclohexyl)-3E-buten-1-yne
1-(4-ethylphenyl)-4-(trans-4-(4-propoxyphenyl)cyclohexyl)-3E-buten-1-yne
1-(4-ethylphenyl)-4-(trans-4-(4-butoxyphenyl)cyclohexyl)-3E-buten-1-yne
1-(4-ethylphenyl)-4-(trans-4-(4-pentoxyphenyl)cyclohexyl)-3E-buten-1-yne
1-(4-propylphenyl)-4-(trans-4-(4-ethoxyphenyl)cyclohexyl)-3E-buten-1-yne
1-(4-propylphenyl)-4-(trans-4-(4-propoxyphenyl)cyclohexyl)-3E-buten-1-yne
1-(4-propylphenyl)-4-(trans-4-(4-butoxyphenyl)cyclohexyl)-3E-buten-1-yne
1-(4-propylphenyl)-4-(trans-4-(4-pentoxyphenyl)cyclohexyl)-3E-buten-1-yne
1-(4-butylphenyl)-4-(trans-4-(4-ethoxyphenyl)cyclohexyl)-3E-buten-1-yne
1-(4-butylphenyl)-4-(trans-4-(4-propoxyphenyl)cyclohexyl)-3E-buten-1-yne
1-(4-butylphenyl)-4-(trans-4-(4-butoxyphenyl)cyclohexyl)-3E-buten-1-yne
1-(4-butylphenyl)-4-(trans-4-(4-pentoxyphenyl)cyclohexyl)-3E-buten-1-yne
1-(4-pentylphenyl)-4-(trans-4-(4-ethoxyphenyl)cyclohexyl)-3E-buten-1-yne
1-(4-pentylphenyl)-4-(trans-4-(4-propoxyphenyl)cyclohexyl)-3E-buten-1-yne
1-(4-pentylphenyl)-4-(trans-4-(4-butoxyphenyl)cyclohexyl)-3E-buten-1-yne
1-(4-pentylphenyl)-4-(trans-4-(4-pentoxyphenyl)cyclohexyl)-3E-buten-1-yne
1-(4-(trans-4-ethylcyclohexyl)phenyl)-4-(trans-4-(4-ethylphenyl)cyclohexyl)-3E-buten-1-yne
1-(4-(trans-4-propylcyclohexyl)phenyl)-4-(trans-4-(4-ethylphenyl)cyclohexyl)-3E-buten-1-yne
1-(4-(trans-4-butylcyclohexyl)phenyl)-4-(trans-4-(4-ethylphenyl)cyclohexyl)-3E-buten-1-yne
1-(4-(trans-4-pentylcyclohexyl)phenyl)-4-(trans-4-(4-ethylphenyl)cyclohexyl)-3E-buten-1-yne
1-(4-(trans-4-ethylcyclohexyl)phenyl)-4-(trans-4-(4-propylphenyl)cyclohexyl)-3E-buten-1-yne
1-(4-(trans-4-propylcyclohexyl)phenyl)-4-(trans-4-(4-propylphenyl)cyclohexyl)-3E-buten-1-yne
1-(4-(trans-4-butylcyclohexyl)phenyl)-4-(trans-4-(4-propylphenyl)cyclohexyl)-3E-buten-1-yne
1-(4-(trans-4-pentylcyclohexyl)phenyl)-4-(trans-4-(4-propylphenyl)cyclohexyl)-3E-buten-1-yne
1-(4-(trans-4-ethylcyclohexyl)phenyl)-4-(trans-4-(4-butylphenyl)cyclohexyl)-3E-buten-1-yne
1-(4-(trans-4-propylcyclohexyl)phenyl)-4-(trans-4-(4-butylphenyl)cyclohexyl)-3E-buten-1-yne
1-(4-(trans-4-butylcyclohexyl)phenyl)-4-(trans-4-(4-butylphenyl)cyclohexyl)-3E-buten-1-yne
1-(4-(trans-4-pentylcyclohexyl)phenyl)-4-(trans-4-(4-butylphenyl)cyclohexyl)-3E-buten-1-yne
1-(4-(trans-4-ethylcyclohexyl)phenyl)-4-(trans-4-(4-pentylphenyl)cyclohexyl)-3E-buten-1-yne
1-(4-(trans-4-propylcyclohexyl)phenyl)-4-(trans-4-(4-pentylphenyl)cyclohexyl)-3E-buten-1-yne
1-(4-(trans-4-butylcyclohexyl)phenyl)-4-(trans-4-(4-pentylphenyl)cyclohexyl)-3E-buten-1-yne
1-(4-(trans-4-pentylcyclohexyl)phenyl)-4-(trans-4-(4-pentylphenyl)cyclohexyl)-3E-buten-1-yne
1-(4-(trans-4-ethylcyclohexyl)phenyl)-4-(trans-4-(4-ethoxyphenyl)cyclohexyl)-3E-buten-1-yne
1-(4-(trans-4-ethylcyclohexyl)phenyl)-4-(trans-4-(4-propoxyphenyl)cyclohexyl)-3E-buten-1-yne
1-(4-(trans-4-ethylcyclohexyl)phenyl)-4-(trans-4-(4-butoxyphenyl)cyclohexyl)-3E-buten-1-yne
1-(4-(trans-4-ethylcyclohexyl)phenyl)-4-(trans-4-(4-pentoxyphenyl)cyclohexyl)-3E-buten-1-yne
1-(4-(trans-4-propylcyclohexyl)phenyl)-4-(trans-4-(4-ethoxyphenyl)cyclohexyl)-3E-buten-1-yne
1-(4-(trans-4-propylcyclohexyl)phenyl)-4-(trans-4-(4-propoxyphenyl)cyclohexyl)-3E-buten-1-yne
1-(4-(trans-4-propylcyclohexyl)phenyl)-4-(trans-4-(4-butoxyphenyl)cyclohexyl)-3E-buten-1-yne
1-(4-(trans-4-propylcyclohexyl)phenyl)-4-(trans-4-(4-pentoxyphenyl)cyclohexyl)-3E-buten-1-yne
1-(4-(trans-4-butylcyclohexyl)phenyl)-4-(trans-4-(4-ethoxyphenyl)cyclohexyl)-3E-buten-1-yne
1-(4-(trans-4-butylcyclohexyl)phenyl)-4-(trans-4-(4-propoxyphenyl)cyclohexyl)-3E-buten-1-yne
1-(4-(trans-4-butylcyclohexyl)phenyl)-4-(trans-4-(4-butoxyphenyl)cyclohexyl)-3E-buten-1-yne
1-(4-(trans-4-butylcyclohexyl)phenyl)-4-(trans-4-(4-pentoxyphenyl)cyclohexyl)-3E-buten-1-yne
1-(4-(trans-4-pentylcyclohexyl)phenyl)-4-(trans-4-(4-ethoxyphenyl)cyclohexyl)-3E-buten-1-yne
1-(4-(trans-4-pentylcyclohexyl)phenyl)-4-(trans-4-(4-propoxyphenyl)cyclohexyl)-3E-buten-1-yne
1-(4-(trans-4-pentylcyclohexyl)phenyl)-4-(trans-4-(4-butoxyphenyl)cyclohexyl)-3E-buten-1-yne
1-(4-(trans-4-pentylcyclohexyl)phenyl)-4-(trans-4-(4-pentoxyphenyl)cyclohexyl)-3E-buten-1-yne

EXAMPLE 34

Preparation of
1-(4-fluorophenyl)-4-(trans-4-pentylcyclohexyl)-3E-buten-1-yne (a compound of the formula (I) wherein A=1,4-phenylene, C=trans-1,4-cyclohexylene, n=0, m=1, l=1, R=pentyl, X=H, Y=fluoro and Z=H)

4-Fluorophenylacetylene (1.3 g) was dissolved in THF (20 ml), followed by dropwise adding a n-butyllithium-hexane solution (1.61M, 0.62 ml) while stirring the above solution under ice-cooling, stirring the reaction solution under ice-cooling for 30 minutes, dropwise adding a solution of 2-(4-pentylcyclohexyl)acetaldehyde (1.5 g) in THF (10 ml), raising the temperature of the reaction solution up to room temperature after completion of the dropwise addition, stirring the mixture for 5 hours, adding dilute hydrochloric acid (5 ml) to the resulting raw solution, extracting with ethyl acetate (50 ml), washing the organic layer with water, drying over anhydrous MgSO4, concentrating under reduced pressure to obtain a brown oil, and recrystallizing this oil from a mixed solution of ethyl acetate-heptane, to obtain 1-(4-fluorophenyl)-4-(4-pentylcyclohexyl)-1-butyn-3-ol (white crystal) (2.3 g).

The thus obtained carbinol substance (2.3 g) and p-toluenesulfonic acid (100 mg) were placed in a flask equipped with Dean-Stark's device and dissolved in toluene (100 ml), followed by heating the solution under reflux with stirring for 8 hours, washing the resulting reaction solution with water, drying over anhydrous MgSO4, concentrating under reduced pressure to obtain a brown oil, purifying it according to silica gel column chromatography and recrystallizing it from ethanol, to obtain the captioned compound (colorless crystal) (0.7 g).

CN 49.2°–50.6° C. NI 78.0°–78.3° C.

The following compounds are prepared in the same manner as the above.

1-(4-fluorophenyl)-4-(trans-4-ethylcyclohexyl)-3E-buten-1-yne 1-(4-fluorophenyl)-4-(trans-4-propylcyclohexyl)-3E-buten-1-yne 1-(4-fluorophenyl)-4-(4-(trans-4-ethylcyclohexyl)cyclohexyl)-3E-buten-1-yne 1-(4-fluorophenyl)-4-(4-(trans-4-propylcyclohexyl)cyclohexyl)-3E-buten-1-yne 1-(4-fluorophenyl)-4-(4-(trans-4-pentylcyclohexyl)cyclohexyl)-3E-buten-1-yne

EXAMPLE 35

Preparation of 1-(3,4-difluorophenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=-pentyl, X=F, Y=fluoro and Z=H)

The captioned compound (0.8 g) was obtained from 1-(3,4-difluorophenyl)-4-(4-pentylcyclohexyl)-1-butyn-3-ol (2.6 g), prepared from 3,4-difluorophenylacetylene (1.3 g) and 2-(4-pentylcyclohexyl)acetaldehyde (1.7 g), in the same manner as in Example 1.

CN 34.5°–35.9° C. NI 44.4°–44.6° C.

The following compounds are prepared in the same manner as the above.

1-(3,4-difluorophenyl)-4-(trans-4-ethylcyclohexyl)-3E-buten-1-yne 1-(3,4-difluorophenyl)-4-(trans-4-pentylcyclohexyl)-3E-buten-1-yne 1-(3,4-difluorophenyl)-4-(4-(trans-4-ethylcyclohexyl)cyclohexyl)-3E-buten-1-yne 1-(3,4-difluorophenyl)-4-(4-(trans-4-propylcyclohexyl)cyclohexyl)-3E-buten-1-yne 1-(3,4-difluorophenyl)-4-(4-(trans-4-pentylcyclohexyl)cyclohexyl)-3E-buten-1-yne

EXAMPLE 36

Preparation of 1-(4-chlorophenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=chloro and Z=H)

The captioned compound (0.8 g) was obtained from 1-(4-chlorophenyl)-4-(4-propylcyclohexyl)-1-butyn-3-ol (2.6 g), prepared from 4-chlorophenylacetylene (1.3 g) and 2-(4-propylcyclohexyl)acetaldehyde (1.7 g) in the same manner as in Example 1.

CI 106.5°–106.9° C. NI 88.1°–89.4° C.

The following compounds are prepared in the same manner as the above.

1-(4-chlorophenyl)-4-(trans-4-ethylcyclohexyl)-3E-buten-1-yne 1-(4-chlorophenyl)-4-(trans-4-pentylcyclohexyl)-3E-buten-1-yne 1-(4-chlorophenyl)-4-(4-(trans-4-ethylcyclohexyl)cyclohexyl)-3E-buten-1-yne 1-(4-chlorophenyl)-4-(4-(trans-4-propylcyclohexyl)cyclohexyl)-3E-buten-1-yne 1-(4-chlorophenyl)-4-(4-(trans-4-pentylcyclohexyl)cyclohexyl)-3E-buten-1-yne 1-(3-fluoro-4-chlorophenyl)-4-(trans-4-ethylcyclohexyl)-3E-buten-1-yne 1-(3-fluoro-4-chlorophenyl)-4-(trans-4-pentylcyclohexyl)-3E-buten-1-yne 1-(3-fluoro-4-chlorophenyl)-4-(4-(trans-4-ethylcyclohexyl)cyclohexyl)-3E-buten-1-yne 1-(3-fluoro-4-chlorophenyl)-4-(4-(trans-4-propylcyclohexyl)cyclohexyl)-3E-buten-1-yne 1-(3-fluoro-4-chlorophenyl)-4-(4-(trans-4-pentylcyclohexyl)cyclohexyl)-3E-buten-1-yne

EXAMPLE 37

Preparation of 1-(4-trifluoromethylphenyl)-4-(trans-4-pentylcyclohexyl)-3E-buten-1-yne (a compound of the formula (I) wherein A=1,4-phenylene, C=trans-1,4-cyclohexylene, n=0, m=1, l=0, R=pentyl, X=H, Y=trifluoromethyl and Z=H)

The captioned compound (0.8 g) was obtained from 1-(4-trifluoromethylphenyl)-4-(4-pentylcyclohexyl)-1-butyn-3-ol, prepared from 4-trifluoromethylphenylacetylene (1.3 g) and 2-(4-pentylcyclohexyl)acetaldehyde (1.7 g), prepared in the same manner as in Example 1.

CI 63.3°–63.9° C.

The following compounds are prepared in the same manner as the above:

1-(4-trifluoromethylphenyl)-4-(trans-4-ethylcyclohexyl)-3E-buten-1-yne 1-(4-trifluoromethylphenyl)-4-(trans-4-propylcyclohexyl)-3E-buten-1-yne 1-(4-trifluoromethylphenyl)-4-(4-(trans-4-ethylcyclohexyl)cyclohexyl)-3E-buten-1-yne 1-(4-trifluoromethylphenyl)-4-(4-(trans-4-propylcyclohexyl)cyclohexyl)-3E-buten-1-yne 1-(4-trifluoromethylphenyl)-4-(4-(trans-4-pentylcyclohexyl)cyclohexyl)-3E-buten-1-yne 1-(3-fluoro-4-trifluoromethylphenyl)-4-(trans-4-ethylcyclohexyl)-3E-buten-1-yne 1-(3-fluoro-4-trifluoromethylphenyl)-4-(trans-4-propylcyclohexyl)-3E-buten-1-yne 1-(3-fluoro-4-trifluoromethylphenyl)-4-(trans-4-(trans-4-ethylcyclohexyl)cyclohexyl)-3E-buten-1-yne 1-(3-fluoro-4-trifluoromethylphenyl)-4-(trans-4-(trans-4-propylcyclohexyl)cyclohexyl)-3E-buten-1-yne 1-(3-fluoro-4-trifluoromethylphenyl)-4-(trans-4-(trans-4-pentylcyclohexyl)cyclohexyl)-3E-buten-1-yne 1-(3,5-difluoro-4-trifluoromethylphenyl)-4-(trans-4-ethylcyclohexyl)-3E-buten-1-yne 1-(3,5-difluoro-4-trifluoromethylphenyl)-4-(trans-4-propylcyclohexyl)-3E-buten-1-yne 1-(3,5-difluoro-4-trifluoromethylphenyl)-4-(trans-4-(trans-4-ethylcyclohexyl)cyclohexyl)-3E-buten-1-yne 1-(3,5-difluoro-4-trifluoromethylphenyl)-4-(trans-4-(trans-4-propylcyclohexyl)cyclohexyl)-3E-buten-1-yne 1-(3,5-difluoro-4-trifluoromethylphenyl)-4-(trans-4-(trans-4-pentylcyclohexyl)cyclohexyl)-3E-buten-1-yne

EXAMPLE 38

Preparation of 1-(4-cyanophenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=H, Y=cyano and Z=H)

1-(4-Bromophenyl)-4-(trans-4-propylcyclohexyl)-1-butyn-3-ol (2.6 g) was obtained from 4-bromophenylacetylene (1.3 g) and 2-(4-propylcyclohexyl)acetaldehyde (1.7 g), in the same manner as in Example 1, followed by obtaining 1-(4-bromophenyl)-4-(trans-4-propylcyclohexyl)-3E-buten-1-yne from the above carbinol substance, dissolving it (1.3 g) in N-methylpyrrolidone (10 ml), adding copper cyanide (0.6 g), heating the mixture under reflux with stirring for 6 hours, adding a mixture of iron chloride and conc. hydrochloric acid to the solution after completion of the reaction, further stirring the mixture for one hour, filtering with Celite, adding water to the filtrate, extracting with toluene, washing the organic layer with water, drying, to obtain a brown oil, and isolating and purifying it according to silica gel column chromatography, to obtain the captioned compound (0.8 g).

CN 94.7°–95.5° C. NI 142.4°–143.3° C.

The following compounds are prepared in the same manner as the above:

1-(4-cyanophenyl)-4-(trans-4-ethylcyclohexyl)-3E-buten-1-yne 1-(4-cyanophenyl)-4-(trans-4-butylcyclohexyl)-3E-buten-1-yne 1-(4-cyanophenyl)-4-(4-(trans-4-ethylcyclohexyl)cyclohexyl)-3E-buten-1-yne 1-(4-cyanophenyl)-4-(4-(trans-4-propylcyclohexyl)cyclohexyl)-3E-buten-1-yne 1-(4-cyanophenyl)-4-(4-(trans-4-pentylcyclohexyl)cyclohexyl)-3E-buten-1-yne

EXAMPLE 39

Preparation of 1-(3-fluoro-4-cyanophenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=fluoro, Y=cyano and Z=H)

The captioned compound (0.8 g) was obtained by cyanogenating 1-(3-fluoro-4-bromophenyl)-4-(4-propylcyclohexyl)-3E-buten-1-yne, obtained from 1-(3-fluoro-4-bromophenyl)-4-(trans-4-propylcyclohexyl)-1-butyn-3-ol (2.5 g), prepared from 3-fluoro-4-bromophenylacetylene (1.3 g) and 2-(trans-4-propylcyclohexyl)acetaldehyde (1.2 g), in the same manner as in Example 38.

CN 64.7°–66.3° C. NI 113.2°–113.7° C.

The following compounds are prepared in the same manner as the above:

1-(3-fluoro-4-cyanophenyl)-4-(trans-4-ethylcyclohexyl)-3E-buten-1-yne 1-(3-fluoro-4-cyanophenyl)-4-(trans-4-pentylcyclohexyl)-3E-buten-1-yne 1-(3-fluoro-4-cyanophenyl)-4-(trans-4-(trans-4-ethylcyclohexyl)cyclohexyl)-3E-buten-1-yne 1-(3-fluoro-4-cyanophenyl)-4-(trans-4-(trans-4-propylcyclohexyl)cyclohexyl)-3E-buten-1-yne 1-(3-fluoro-4-cyanophenyl)-4-(trans-4-(trans-4-butylcyclohexyl)cyclohexyl)-3E-buten-1-yne 1-(3,5-difluoro-4-cyanophenyl)-4-(trans-4-ethylcyclohexyl)-3E-buten-1-yne 1-(3,5-difluoro-4-cyanophenyl)-4-(trans-4-propylcyclohexyl)-3E-buten-1-yne 1-(3,5-difluoro-4-cyanophenyl)-4-(trans-4-pentylcyclohexyl)-3E-buten-1-yne 1-(3,5-difluoro-4-cyanophenyl)-4-(trans-4-(trans-4-ethylcyclohexyl)cyclohexyl)-3E-buten-1-yne 1-(3,5-difluoro-4-cyanophenyl)-4-(trans-4-(trans-4-propylcyclohexyl)cyclohexyl)-3E-buten-1-yne 1-(3,5-difluoro-4-cyanophenyl)-4-(trans-4-(trans-4-pentylcyclohexyl)cyclohexyl)-3E-buten-1-yne

EXAMPLE 40

Preparation of 1-(3,4,5-trifluorophenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=propyl, X=fluoro, Y=fluoro and Z=3-fluoro)

The captioned compound (0.8 g) was obtained from 1-(3,4,5-trifluorophenyl)-4-(4-propylcyclohexyl)-1-butyn-3-ol (2.6 g), prepared from 3,4,5-trifluorophenylacetylene (1.3 g) and 2-(4-propylcyclohexyl)acetaldehyde (1.7 g), in the same manner as in Example 1.

The following compounds are prepared in the same manner as the above:

1-(3,4,5-trifluorophenyl)-4-(trans-4-ethylcyclohexyl)-3E-buten-1-yne 1-(3,4,5-trifluorophenyl)-4-(trans-4-pentylcyclohexyl)-3E-buten-1-yne 1-(3,4,5-trifluorophenyl)-4-(trans-4-(trans-4-ethylcyclohexyl)cyclohexyl)-3E-buten-1-yne 1-(3,4,5-trifluorophenyl)-4-(trans-4-(trans-4-propylcyclohexyl)cyclohexyl)-3E-buten-1-yne 1-(3,4,5-trifluorophenyl)-4-(trans-4-(trans-4-butylcyclohexyl)cyclohexyl)-3E-buten-1-yne

EXAMPLE 41

Preparation of 1-(4-trifluoromethoxyphenyl)-4-(trans-4-propylcyclohexyl)-3E-buten-1-yne (a compound of the formula (I) wherein A=1,4-phenylene, C=trans-1,4-cyclohexylene, n=0, m=1, l=0, R=pentyl, X=H, Y=trifluoromethoxy and Z=H)

The captioned compound (0.8 g) was obtained from 1-(4-trifluoromethoxyphenyl)-4-(4-propylcyclohexyl)-1-butyn-3-ol (2.6 g), prepared from 4-trifluoromethoxyphenylacetylene (1.3 g) and 2-(trans-4-propylcyclohexyl)acetaldehyde (1.7 g), in the same manner as in Example 1.

1-(4-trifluoromethoxyphenyl)-4-(trans-4-ethylcyclohexyl)-3E-buten-1-yne 1-(4-trifluoromethoxyphenyl)-4-(trans-4-pentylcyclohexyl)-3E-buten-1-yne 1-(4-trifluoromethoxyphenyl)-4-(trans-4-(trans-4-ethylcyclohexyl)cyclohexyl)-3E-buten-1-yne 1-(4-trifluoromethoxyphenyl)-4-(trans-4-(trans-4-propylcyclohexyl)cyclohexyl)-3E-buten-1-yne 1-(4-trifluoromethoxyphenyl)-4-(trans-4-(trans-4-pentylcyclohexyl)cyclohexyl)-3E-buten-1-yne
1-(3-fluoro-4-trifluoromethoxyphenyl)-4-(trans-4-ethylcyclohexyl)-3E-buten-1-yne
1-(3-fluoro-4-trifluoromethoxyphenyl)-4-(trans-4-pentylcyclohexyl)-3E-buten-1-yne
1-(3-fluoro-4-trifluoromethoxyphenyl)-4-(trans-4-(trans-4-ethylcyclohexyl)cyclohexyl)-3E-buten-1-yne
1-(3-fluoro-4-trifluoromethoxyphenyl)-4-(trans-4-(trans-4-propylcyclohexyl)cyclohexyl)-3E-buten-1-yne
1-(3-fluoro-4-trifluoromethoxyphenyl)-4-(trans-4-(trans-4-pentylcyclohexyl)cyclohexyl)-3E-buten-1-yne
1-(3,5-difluoro-4-trifluoromethoxyphenyl)-4-(trans-4-ethylcyclohexyl)-3E-buten-1-yne
1-(3,5-difluoro-4-trifluoromethoxyphenyl)-4-(trans-4-pentylcyclohexyl)-3E-buten-1-yne
1-(3,5-difluoro-4-trifluoromethoxyphenyl)-4-(trans-4-(trans-4-ethylcyclohexyl)cyclohexyl)-3E-buten-1-yne
1-(3,5-difluoro-4-trifluoromethoxyphenyl)-4-(trans-4-(trans-4-propylcycloheyxl)cyclohexyl)-3E-buten-1-yne
1-(3,5-difluoro-4-trifluoromethoxyphenyl)-4-(trans-4-(trans-4-pentylcyclohexyl)cyclohexyl)-3E-buten-1-yne

EXAMPLE 42

Preparation of
1-(trans-4-(4-fluorophenyl)cyclohexyl)-4-(trans-4-propylcyclohexyl)-3E-buten-1-yne (a compound of the formula (I) wherein A=1,4-phenylene,
B=trans-1,4-cyclohexylene,
C=trans-1,4-cyclohexylene n=1, m=1, l=0,
R=propyl, X=H, Y=fluoro and Z=H)

The captioned compound (0.8 g) was obtained from 1-(4-(4-fluorophenyl)cyclohexyl)-4-(4-propylcyclohexyl)-1-butyn-3-ol (2.6 g), prepared from trans-4-(4-fluorophenyl)cyclohexylacetylene (1.3 g) and 2-(trans-4-propylcyclohexyl)acetaldehyde (1.7 g), in the same manner as in Example 1.

The following compounds are prepared in the same manner as the above:
1-(trans-4-(4-fluorophenyl)cyclohexyl)-4-(trans-4-ethylcyclohexyl)-3E-buten-1-yne
1-(trans-4-(4-fluorophenyl)cyclohexyl)-4-(trans-4-pentylcyclohexyl)-3E-buten-1-yne
1-(trans-4-(3,4-difluorophenyl)cyclohexyl)-4-(trans-4-ethylcyclohexyl)-3E-buten-1-yne
1-(trans-4-(3,4-difluorophenyl)cyclohexyl)-4-(trans-4-propylcyclohexyl)-3E-buten-1-yne
1-(trans-4-(3,4-difluorophenyl)cyclohexyl)-4-(trans-4-pentylcyclohexyl)-3E-buten-1-yne
1-(trans-4-(4-chlorophenyl)cyclohexyl)-4-(trans-4-ethylcyclohexyl)-3E-buten-1-yne
1-(trans-4-(4-chlorophenyl)cyclohexyl)-4-(trans-4-propylcyclohexyl)-3E-buten-1-yne
1-(trans-4-(4-chlorophenyl)cyclohexyl)-4-(trans-4-butylcyclohexyl)-3E-buten-1-yne
1-(trans-4-(4-trifluoromethylphenyl)cyclohexyl)-4-(trans-4-ethylpropylcyclohexyl)-3E-buten-1-yne
1-(trans-4-(4-trifluoromethylphenyl)cyclohexyl)-4-(trans-4-propylcyclohexyl)-3E-buten-1-yne
1-(trans-4-(4-trifluoromethylphenyl)cyclohexyl)-4-(trans-4-pentylcyclohexyl)-3E-buten-1-yne
1-(trans-4-(3-fluoro-4-trifluoromethylphenyl)cyclohexyl)-4-(trans-4-ethylcyclohexyl)-3E-buten-1-yne
1-(trans-4-(3-fluoro-4-trifluoromethylphenyl)cyclohexyl)-4-(trans-4-propylcyclohexyl)-3E-buten-1-yne
1-(trans-4-(3-fluoro-4-trifluoromethylphenyl)cyclohexyl)-4-(trans-4-pentylcyclohexyl)-3E-buten-1-yne
1-(trans-4-(3,4,5-trifluorophenyl)cyclohexyl)-4-(trans-4-ethylcyclohexyl)-3E-buten-1-yne
1-(trans-4-(3,4,5-trifluorophenyl)cyclohexyl)-4-(trans-4-propylcyclohexyl)cyclohexyl)-3E-buten-1-yne
1-(trans-4-(3,4,5-trifluorophenyl)cyclohexyl)-4-(trans-4-pentylcyclohexyl)-3E-buten-1-yne

EXAMPLE 43

Preparation of
1-(trans-4-(4-cyanophenyl)cyclohexyl)-4-(trans-4-propylcyclohexyl)-3E-buten-1-yne (a compound of the formula (I) wherein A=1,4-phenylene,
B=trans-1,4-cyclohexylene,
C=trans-1,4-cyclohexylene, n=1, m=1, l=0,
R=propyl, X=H, Y=cyano and Z=H)

The captioned compound (0.8 g) was obtained by cyanogenating 1-(4-(4-bromophenyl)cyclohexyl)-4-(trans-4-propylcyclohexyl)-3E-buten-1-yne, prepared from trans-4-(4-bromophenyl)cyclohexylacetylene (1.3 g) and 2-(trans-4-propylcyclohexyl)acetaldehyde (1.7 g), in the same manner as in Example 38.

The following compounds are prepared in the same manner as the above:
1-(trans-4-(4-cyanophenyl)cyclohexyl)-4-(trans-4-ethylcyclohexyl)-3E-buten-1-yne
1-(trans-4-(4-cyanophenyl)cyclohexyl)-4-(trans-4-butylcyclohexyl)-3E-buten-1-yne
1-(trans-4-(3-fluoro-4-cyanophenyl)cyclohexyl)-4-(trans-4-ethylcyclohexyl)-3E-buten-1-yne
1-(trans-4-(3-fluoro-4-cyanophenyl)cyclohexyl)-4-(trans-4-propylcyclohexyl)-3E-buten-1-yne
1-(trans-4-(3-fluoro-4-cyanophenyl)cyclohexyl)-4-(trans-4-pentylcyclohexyl)-3E-buten-1-yne
1-(trans-4-(3,5-difluoro-4-cyanophenyl)cyclohexyl)-4-(trans-4-ethylcyclohexyl)-3E-buten-1-yne
1-(trans-4-(3,5-difluoro-4-cyanophenyl)cyclohexyl)-4-(trans-4-propylcyclohexyl)-3E-buten-1-yne
1-(trans-4-(3,5-difluoro-4-cyanophenyl)cyclohexyl)-4-(trans-4-pentylcyclohexyl)-3E-buten-1-yne

EXAMPLE 44

Preparation of
1-(trans-4-(4-trifluoromethylphenyl)cyclohexyl)-4-(trans-4-butylcyclohexyl)-3E-buten-1yne (a compound of the formula (I) wherein A=1,4-phenylene,
B=trans-1,4-cyclohexylene,
C=trans-1,4-cyclohexylene, n=1, m=1, l=0,
R=butyl, X=H, Y=trifluoromethyl and Z=H)

The captioned compound was obtained from 1-(trans-4-(4-trifluoromethylphenyl)cyclohexyl)-4-(trans-4-butylcyclohexyl)-1-butyn-3-ol, prepared from 4-trifluoromethylacetylene and 2-(4-butylcyclohexyl)acetaldehyde, in the same manner as in Example 1.

The following compounds are prepared in the same manner as the above:
1-(trans-4-(4-trifluoromethylphenyl)cyclohexyl)-4-(trans-4-ethylcyclohexyl)-3E-buten-1-yne
1-(trans-4-(4-trifluoromethylphenyl)cyclohexyl)-4-(trans-4-propylcyclohexyl)-3E-buten-1-yne
1-(trans-4-(4-trifluoromethylphenyl)cyclohexyl)-4-(trans-4-pentylcyclohexyl)-3E-buten-1-yne 1-(trans-4-(3-fluoro-4-trifluoromethylphenyl)cyclohexyl)-4-(trans-4-ethylcyclohexyl)-3E-buten-1-yne 1-(trans-4-(3-fluoro-4-trifluoromethylphenyl)cyclohexyl)-4-(trans-4-propylcyclohexyl)-3E-buten-1-yne 1-(trans-4-(3-fluoro-4-trifluoromethylphenyl)cyclohexyl)-4-(trans-4-pentylcyclohexyl)-3-buten-1-yne 1-(trans-4-(3,5-difluoro-4-trifluoromethylphenyl)cyclohexyl)-4-(trans-4-ethylcyclohexyl)-3E-buten-1-yne 1-(trans-4-(3,5-difluoro-4-trifluoromethylphenyl)cyclohexyl)-4-(trans-4-propylcyclohexyl)-3E-buten-1-yne 1-(trans-4-(3,5-difluoro-4-trifluoromethylphenyl)cyclohexyl)-4-(trans-4-butylcyclohexyl)-3E-buten-1-yne 1-(trans-4-(4-trifluoromethoxyphenyl)cyclohexyl)-4-(trans-4-ethylcyclohexyl)-3E-buten-1-yne 1-(trans-4-(4-trifluoromethoxyphenyl)cyclohexyl)-4-(trans-4-propylcyclohexyl)-3E-buten-1-yne 1-(trans-4-(3-fluoro-4-trifluoromethoxyphenyl)cyclohexyl)-4-(trans-4-ethylcyclohexyl)-3E-buten-1-yne 1-(trans-4-(3-fluoro-4-trifluoromethoxyphenyl)cyclohexyl)-4-(trans-4-propylcyclohexyl)-3E-buten-1-yne 1-(trans-4-(3-fluoro-4-trifluoromethoxyphenyl)cyclohexyl)-4-(trans-4-pentylcyclohexyl)-3E-buten-1-yne 1-(trans-4-(3,5-difluoro-4-trifluoromethoxyphenyl)cyclohexyl)-4-(trans-4-ethylcyclohexyl)-3E-buten-1-yne 1-(trans-4-(3,5-difluoro-4-trifluoromethoxyphenyl)cyclohexyl)-4-(trans-4-propylcyclohexyl)-3E-buten-1-yne 1-(trans-4-(3,5-difluoro-4-trifluoromethoxyphenyl)cyclohexyl)-4-(trans-4-pentylcyclohexyl)-3E-buten-1-yne 1-(trans-4-(4-difluoromethoxyphenyl)cyclohexyl)-4-(trans-4-ethylcyclohexyl)-3E-buten-1-yne 1-(trans-4-(4-difluoromethoxyphenyl)cyclohexyl)-4-(trans-4-propylcyclohexyl)-3E-buten-1-yne 1-(trans-4-(4-difluoromethoxyphenyl)cyclohexyl)-4-(trans-4-pentylcyclohexyl)-3E-buten-1-yne

EXAMPLE 45

Preparation of
1-(4'-fluorobiphenyl)-4-(trans-4-propylcyclohexyl)-3E-buten-1-yne (a compound of the formula (I) wherein
A=1,4-phenylene, B=1,4-phenylene,
C=trans-1,4-cyclohexylene, n=1, m=1, l=0,
R=propyl, W=H, X=H, Y=fluoro and Z=H)

The captioned compound (0.8 g) was obtained from 1-(4'-fluorobiphenyl)-4-(trans-4-propylcyclohexyl)-1-butyn-3-ol (2.6 g), prepared from 4'-fluorobiphenylacetylene (1.3 g) and 2-(4-propylcyclohexyl)acetaldehyde (1.7 g) in the same manner as in Example 1.

The following compounds are prepared in the same manner as the above:

1-(4'-fluorobiphenyl)-4-(trans-4-ethylcyclohexyl)-3E-buten-1-yne 1-(4'-fluorobiphenyl)-4-(trans-4-pentylcyclohexyl)-3E-buten-1-yne 1-(3',4'-difluorobiphenyl)-4-(trans-4-ethylcyclohexyl)-3E-buten-1-yne 1-(3',4'-difluorobiphenyl)-4-(trans-4-propylcyclohexyl)-3E-buten-1-yne 1-(3',4'-difluorobiphenyl)-4-(trans 4-pentylcyclohexyl)-3E-buten-1-yne 1-(4'-chlorobiphenyl)-4-(trans-4-ethylcyclohexyl)-3E-buten-1-yne 1-(4'-chlorobiphenyl)-4-(trans-4-propylcyclohexyl)-3E-buten-1-yne 1-(4'-chlorobiphenyl)-4-(trans-4-butylcyclohexyl)-3E-buten-1-yne 1-(3',4',5'-trifluorobiphenyl)-4-(trans-4-ethylcyclohexyl)-3E-buten-1-yne 1-(3',4',5'-trifluorobiphenyl)-4-(trans-4-propylcyclohexyl)-3E-buten-1-yne 1-(3',4',5'-trifluorobiphenyl)-4-(trans-4-pentylcyclohexyl)-3E-buten-1-yne

EXAMPLE 46

Preparation of
1-(4'-cyanobiphenyl)-4-(trans-4-propylcyclohexyl)-3E-buten-1-yne (a compound of the formula (I) wherein
A=1,4-phenylene, B=1,4-phenylene,
C=trans-1,4-cyclohexylene, n=1, m=1, l=0,
R=propyl, W=H, X=H, Y=cyano and Z=H The captioned compound (0.8 g) was obtained by cyanogenating 1-(4'-bromobiphenyl)-4-(trans-4-propylcyclohexyl)-3E-buten-1-yne, prepared from 4'-bromobiphenylacetylene (1.3 g) and 2-(trans-4-propylcyclohexyl)acetaldehyde (1.7 g) in the same manner as in Example 36.

The following compounds are prepared in the same manner as the above:

1-(4'-cyanobiphenyl)-4-(trans-4-ethylcyclohexyl)-3E-buten-1-yne 1-(4'-cyanobiphenyl)-4-(trans-4-butylcyclohexyl)-3E-buten-1-yne 1-(3'-fluoro-4'-cyanobiphenyl)-4-(trans-4-ethylcyclohexyl)-3E-buten-1-yne 1-(3'-fluoro-4'-cyanobiphenyl)-4-(trans-4-propylcyclohexyl)-3E-buten-1-yne 1-(3'-fluoro-4'-cyanobiphenyl)-4-(trans-4-pentylcyclohexyl)-3E-buten-1-yne 1-(3',5'-difluoro-4-cyanobiphenyl)-4-(trans-4-ethylcyclohexyl)-3E-buten-1-yne 1-(3',5'-difluoro-4-cyanobiphenyl)-4-(trans-4-propylcyclohexyl)-3E-buten-1-yne 1-(3',5'-difluoro-4-cyanobiphenyl)-4-(trans-4-pentylcyclohexyl)-3E-buten-1-yne

EXAMPLE 47

Preparation of
1-(4'-trifluoromethylbiphenyl)-4-(trans-4-butylcyclohexyl)-3E-buten-1-yne (a compound of the formula (I) wherein A=1,4-phenylene, B=1,4-phenylene,
C=trans-1,4-cyclohexylene, n=1, m=1, l=0,
R=butyl, W=H, X=H, Y=trifluoromethyl and Z=H)

The captioned compound was obtained from 1-(4'-trifluoromethylbiphenyl)-4-(trans-butylcyclohexyl)-1-butyn-3-ol, prepared from 4'-trifluoromethylbiphenylacetylene and 2-(4-butylcyclohexyl)acetaldehyde, in the same manner as in Example 1.

The following compounds are prepared in the same manner as the above:

1-(4'-trifluoromethylbiphenyl)-4-(trans-4-ethylcyclohexyl)-3E-buten-1-yne 1-(4'-trifluoromethylbiphenyl)-4-(trans-4-propylcyclohexyl)-3E-buten-1-yne 1-(4'-trifluoromethylbiphenyl)-4-(trans-4-pentylcyclohexyl)-3E-buten-1-yne
1-(3'-fluoro-4'-trifluoromethylbiphenyl)-4-(trans-4-ethylcyclohexyl)-3E-buten-1-yne
1-(3'-fluoro-4'-trifluoromethylbiphenyl)-4-(trans-4-propylcyclohexyl)-3E-buten-1-yne
1-(3'-fluoro-4'-trifluoromethylbiphenyl)-4-(trans-4-pentylcyclohexyl)-3E-buten-1-yne
1-(3',5'-difluoro-4'-trifluoromethylbiphenyl)-4-(trans-4-ethylcyclohexyl)-3E-buten-1-yne
1-(3',5'-difluoro-4'-trifluoromethylbiphenyl)-4-(trans-4-propylcyclohexyl)-3E-buten-1-yne
1-(3',5'-difluoro-4'-trifluoromethylbiphenyl)-4-(trans-4-butylcyclohexyl)-3E-buten-1-yne
1-(4'-trifluoromethoxybiphenyl)-4-(trans-4-ethylcyclohexyl)-3E-buten-1-yne
1-(4'-trifluoromethoxybiphenyl)-4-(trans-4-propylcyclohexyl)-3E-buten-1-yne
1-(3'-fluoro-4'-trifluoromethoxybiphenyl)-4-(trans-4-ethylcyclohexyl)-3E-buten-1-yne
1-(3'-fluoro-4'-trifluoromethoxybiphenyl)-4-(trans-4-propylcyclohexyl)-3E-buten-1-yne
1-(3'-fluoro-4'-trifluoromethoxybiphenyl)-4-(trans-4-pentylcyclohexyl)-3E-buten-1-yne
1-(3',5'-difluoro-4'-trifluoromethoxybiphenyl)-4-(trans-4-ethylcyclohexyl)-3E-buten-1-yne
1-(3',5'-difluoro-4'-trifluoromethoxybiphenyl)-4-(trans-4-propylcyclohexyl)-3E-buten-1-yne
1-(3',5'-difluorolotrifluoromethoxybiphenyl)-4-(trans-4-pentylcyclohexyl)-3E-buten-1-yne
1-(4'-difluoromethoxybiphenyl)-4-(trans-4-ethylcyclohexyl)-3E-buten-1-yne
1-(4'-difluoromethoxybiphenyl)-4-(trans-4-propylcyclohexyl)-3E-buten-1-yne
1-(4'-difluoromethoxybiphenyl)-4-(trans-4-pentylcyclohexyl)-3E-buten-1-yne

EXAMPLE 48

Preparation of
1-(4-fluorophenyl)-4-(trans-4-(2-(trans-4-propylcyclohexyl)ethyl)cyclohexyl)-3E-buten-1-yne (a compound of the formula (I) wherein A=1,4-phenylene, C=trans-1,4-cyclohexylene, D=trans-1,4-cyclohexylene, M=ethylene, n=0, m=1, l=1, R=propyl, X=H, Y=fluoro and Z=H)

The captioned compound (0.8 g) was obtained from 1-(fluorophenyl)-4-(trans-4-(2-(4-propylcyclohexyl)ethyl)cyclohexyl)-1-butyn-3-ol (2.6 g), prepared from 4-fluorophenylacetylene (1.3 g) and 2-trans-4-(2-(4-propylcyclohexyl)ethyl)cyclohexyl)acetaldehyde (1.7 g) in the same manner as in Example 1.

The following compounds are prepared in the same manner as the above:

1-(4-fluorophenyl)-4-(trans-4-(2-(trans-4-ethylcyclohexyl)ethylcyclohexyl)-3E-buten-1-yne
1-(4-fluorophenyl)-4-(trans-4-(2-(trans-4-pentylcyclohexyl)ethyl)cyclohexyl)-3E-buten-1-yne
1-(3,4-difluorophenyl)-4-(trans-4-(2-(trans-4-ethylcyclohexyl)ethyl)cyclohexyl)-3E-buten-1-yne
1-(3,4-difluorophenyl)-4-(trans-4-(2-(trans-4-propylcyclohexyl)ethyl)cyclohexyl)-3E-buten-1-yne
1-(3,4-difluorophenyl)-4-(trans-4-(2-(trans-4-pentylcyclohexyl)ethyl)cyclohexyl)-3E-buten-1-yne
1-(4-chlorophenyl)-4-(trans-4-(2-(trans-4-ethylcyclohexyl)ethyl)cyclohexyl)-3E-buten-1-yne
1-(4-chlorophenyl)-4-(trans-4-(2-(trans-4-propylcyclohexyl)ethyl)cyclohexyl)-3E-buten-1-yne
1-(4-chlorophenyl)-4-(trans-4-(2-(trans-4-butylcyclohexyl)ethyl)cyclohexyl)-3E-buten-1-yne
1-(4-trifluoromethylphenyl)-4-(trans-4-(2-(trans-4-ethylcyclohexyl)ethyl)cyclohexyl)-3E-buten-1-yne
1-(4-trifluoromethylphenyl)-4-(trans-4-(2-(trans-4-propylcyclohexyl)ethyl)cyclohexyl)-3E-buten-1-yne
1-(4-trifluoromethylphenyl)-4-(trans-4-(2-(trans-4-pentylcyclohexyl)ethyl)cyclohexyl)-3E-buten-1-yne
1-(3-fluoro-4-trifluoromethylphenyl)-4-(trans-4-(2-(trans-4-ethylcyclohexyl)ethyl)cyclohexyl)-3E-buten-1-yne
1-(3-fluoro-4-trifluoromethylphenyl)-4-(trans-4-(2-(trans-4-propylcyclohexyl)ethyl)cyclohexyl)-3E-buten-1-yne
1-(3-fluoro-4-trifluoromethylphenyl)-4-(trans-4-(2-(trans-4-pentylcyclohexyl)ethyl)cyclohexyl)-3E-buten-1-yne
1-(3,4,5-trifluorophenyl)-4-(trans-4-(2-(trans-4-ethylcyclohexyl)ethyl)cyclohexyl)-3E-buten-1-yne
1-(3,4,5-trifluorophenyl)-4-(trans-4-(2-(trans-4-propylcyclohexyl)ethyl)cyclohexyl)-3E-buten-1-yne
1-(3,4,5-trifluorophenyl)-4-(trans-4-(2-(trans-4-pentylcyclohexyl)ethyl)cyclohexyl)-3E-buten-1-yne

EXAMPLE 49

Preparation of
1-(4-cyanophenyl)-4-(trans-4-(2-trans-4-propylcyclohexyl)ethyl)cyclohexyl)-3E-buten-1-yne (a compound of the formula (I) wherein A=1,4-phenylene, C=trans-1,4-cyclohexylene, D-trans-1,4-cyclohexylene, M-ethylene, n=0, m=1, l=1, R=propyl, X=H, Y=cyano and Z=H)

The captioned compound (0.8 g) was obtained by cyanogenating 1-(4-bromophenyl)-4-(trans-4-(2-(trans-4-propylcyclohexyl)ethyl)cyclohexyl)-3E-buten-1-yne, obtained from 1-(4-bromophenyl)-4-(trans-4-(2-(trans-4-propylcyclohexyl)ethyl)cyclohexyl)-1-butyn-3-ol (2.6 g), prepared from 4-bromophenylacetylene (1.3 g) and 2-(4-(2-(trans-4-propylcyclohexyl)acetaldehyde (1.7 g), in the same manner as in Example 36.

The following compounds are prepared in the same manner as the above:

1-(4-cyanophenyl)-4-(trans-4-(2-(trans-4-ethylcyclohexyl)ethyl)cyclohexyl)-3E-buten-1-yne
1-(4-cyanophenyl)-4-(trans-4-(2-(trans-4-butylcyclohexyl)ethyl)cyclohexyl)-3E-buten-1-yne
1-(3-fluoro-4-cyanophenyl)-4-(trans-4-(2-(trans-4-ethylcyclohexyl)ethyl)cyclohexyl)-3E-buten-1-yne
1-(3-fluoro-4-cyanophenyl)-4-(trans-4-(2-(trans-4-propylcyclohexyl)ethyl)cyclohexyl)-3E-buten-1-yne
1-(3-fluoro-4-cyanophenyl)-4-(trans-4-(2-(trans-4-pentylcyclohexyl)ethyl)cyclohexyl)-3E-buten-1-yne
1-(3,5-difluoro-4-cyanophenyl)-4-(trans-4-(2-(trans-4-ethylcyclohexyl)ethyl)cyclohexyl)-3E-buten-1-yne
1-(3,5-difluoro-4-cyanophenyl)-4-(trans-4-(2-(trans-4-propylcyclohexyl)ethyl)cyclohexyl)-3E-buten-1-yne
1-(3,5-difluoro-4-cyanophenyl)-4-(trans-4-(2-(trans-4-pentylcyclohexyl)ethyl)cyclohexyl)cyclohexyl)-3E-buten-1-yne

EXAMPLE 50

Preparation of
1-(4-trifluoromethylphenyl)-4-(trans-4-(2-(trans-4-butylcyclohexyl)ethyl)cyclohexyl)-3E-buten-1-yne (a compound of the formula (I) wherein A=1,4-phenylene, C=trans-1,4-cyclohexylene, D=trans-1,4-cyclohexylene, M=ethylene, n=0, m=1, l=1, R=butyl, X=H, Y=trifluoromethyl and Z=H)

The captioned compound was obtained from 1-(4-trifluoromethylphenyl)-4-(trans-4-(2-(trans-4-butylcyclohexyl)ethyl)cyclohexyl)-1-butyn-3-ol, prepared from 4-trifluoromethylphenylacetylene and 2-(trans-4-(2-trans-4-butylcyclohexyl)ethyl)cyclohexyl)acetaldehyde, in the same manner as in Example 1.

The following compounds are prepared in the same manner as the above:

1-(4-trifluoromethylphenyl)-4-(trans-4-(2-trans-4-ethylcyclohexyl)ethyl)cyclohexyl)-3E-buten-1-yne
1-(4-trifluoromethylphenyl)-4-(trans-4-(2-(trans-4-propylcyclohexyl)ethyl)cyclohexyl)-3E-buten-1-yne
1-(4-trifluoromethylphenyl)-4-(trans-4-(2-(trans-4-pentylcyclohexyl)ethyl)cyclohexyl)-3E-buten-1-yne
1-(3-fluoro-4-trifluoromethylphenyl)-4-(trans-4-(2-(trans-4-ethylcyclohexyl)ethyl)cyclohexyl)-3E-buten-1-yne
1-(3-fluoro-4-trifluoromethylphenyl)-4-(trans-4-(2-(trans-4-propylcyclohexyl)ethyl)cyclohexyl)-3E-buten-1-yne
1-(3-fluoro-4-trifluoromethylphenyl)-4-(trans-4-(2-(trans-4-pentylcyclohexyl)ethyl)cyclohexyl)-3E-buten-1-yne
1-(3,5-difluoro-4-trifluoromethylphenyl)-4-(trans-4-(2-(trans-4-ethylcyclohexyl)ethyl)cyclohexyl)-3E-buten-1-yne
1-(3,5-difluoro-4-trifluoromethylphenyl)-4-(trans-4-(2-(trans-4-propylcyclohexyl)ethyl)cyclohexyl)-3E-buten-1-yne
1-(3,5-difluoro-4-trifluoromethylphenyl)-4-(trans-4-(2-(trans-4-butylcyclohexyl)ethyl)cyclohexyl)-3E-buten-1-yne
1-(4-trifluoromethoxyphenyl)-4-(trans-4-(2-(trans-4-ethylcyclohexyl)ethyl)cyclohexyl)-3E-buten-1-yne
1-(4-trifluoromethoxyphenyl)-4-(trans-4-(2-(trans-4-propylcyclohexyl)ethyl)cyclohexyl)-3E-buten-1-yne
1-(3-fluoro-4-trifluoromethoxyphenyl)-4-(trans-4-(2-(trans-4-ethylcyclohexyl)ethyl)cyclohexyl)-3E-buten-1-yne
1-(3-fluoro-4-trifluoromethoxyphenyl)-4-(trans-4-(2-(trans-4-propylcyclohexyl)ethyl)cyclohexyl)-3E-buten-1-yne
1-(3-fluoro-4-trifluoromethoxyphenyl)-4-(trans-4-(2-(trans-4-pentylcyclohexyl)ethyl)cyclohexyl)-3E-buten-1-yne
1-(3,5-difluoro-4-trifluoromethoxyphenyl)-4-(trans-4-(2-(trans-4-ethylcyclohexyl)ethyl)cyclohexyl)-3E-buten-1-yne
1-(3,5-difluoro-4-trifluoromethoxyphenyl)-4-(trans-4-(2-(trans-4-propylcyclohexyl)ethyl)cyclohexyl)-3E-buten-1-yne
1-(3,5-difluoro-4-trifluoromethoxyphenyl)-4-(trans-4-(2-(trans-4-pentylcyclohexyl)ethyl)cyclohexyl)-3E-buten-1-yne
1-(4-difluoromethoxyphenyl)-4-(trans-4-(2-trans-4-ethylcyclohexyl)ethyl)cyclohexyl)-3E-buten-1-yne
1-(4-difluoromethoxyphenyl)-4-(trans-4-(2-(trans-4-propylcyclohexyl)ethyl)cyclohexyl)-3E-buten-1-yne
1-(4-difluoromethoxyphenyl)-4-(trans-4-(2-(trans-4-pentylcyclohexyl)ethyl)cyclohexyl)-3E-buten-1-yne

EXAMPLE 51

Preparation of
1-(4-fluorophenyl)-4-(trans-4-(4-propylphenyl)cyclohexyl)-3E-buten-1-yne (a compound of the formula (I) wherein A=1,4-phenylene, C=1,4-phenylene, D=trans-1,4-cyclohexylene, n=0, m=1, l=1, R=propyl, X=H, Y=fluoro and Z=H)

The captioned compound (0.6 g) was obtained from 1-(4-fluorophenyl)-4-(trans-4-(4-propylphenyl)cyclohexyl)-1-butyn-3-ol (2.0 g), prepared from 4-fluorophenylacetylene (1.3 g) and 2-(4-propylphenyl)cyclohexyl)acetaldehyde (1.7 g), in the same manner as in Example 1.

The following compounds are prepared in the same manner as the above:

1-(4-fluorophenyl)-4-(trans-4-(4-ethylphenyl)cyclohexyl)-3E-buten-1-yne
1-(4-fluorophenyl)-4-(trans-4-(4-pentylphenyl)cyclohexyl)-3E-buten-1-yne
1-(3,4-difluorophenyl)-4-(trans-4-(4-ethylphenyl)cyclohexyl)-3E-buten-1-yne
1-(3,4-difluorophenyl)-4-(trans-4-(4-propylphenyl)cyclohexyl)-3E-buten-1-yne
1-(3,4-difluorophenyl)-4-(trans-4-(4-pentylphenyl)cyclohexyl)-3E-buten-1-yne
1-(4-chlorophenyl)-4-(trans-4-(4-ethylphenyl)cyclohexyl)-3E-buten-1-yne
1-(4-chlorophenyl)-4-(trans-4-(4-propylphenyl)cyclohexyl)-3E-buten-1-yne
1-(4-chlorophenyl)-4-(trans-4-(4-butylphenyl)cyclohexyl)-3E-buten-1-yne
1-(4-trifluoromethylphenyl)-4-(trans-4-(4-ethylpropylphenyl)cyclohexyl)-3E-buten-1-yne
1-(4-trifluoromethylphenyl)-4-(trans-4-(4-propylphenyl)cyclohexyl)-3E-buten-1-yne
1-(4-trifluoromethylphenyl)-4-(trans-4-(4-pentylphenyl)cyclohexyl)-3E-buten-1-yne
1-(3-fluoro-4-trifluoromethylphenyl)-4-(trans-4-(4-ethylpropylphenyl)cyclohexyl)-3E-buten-1-yne
1-(3-fluoro-4-trifluoromethylphenyl)-4-(trans-4-(4-propylphenyl)cyclohexyl)-3E-buten-1-yne
1-(3-fluoro-4-trifluoromethylphenyl)-4-(trans-4-(4-pentylphenyl)cyclohexyl)-3E-buten-1-yne
1-(3,4,5-trifluorophenyl)-4-(trans-4-(4-ethylphenyl)cyclohexyl)-3E-buten-1-yne
1-(3,4,5-trifluorophenyl)-4-(trans-4-(4-propylphenyl)cyclohexyl)-3E-buten-1-yne
1-(3,4,5-trifluorophenyl)-4-(trans-4-(4-pentylphenyl)cyclohexyl)-3E-buten-1-yne

EXAMPLE 52

Preparation of
1-(4-cyanophenyl)-4-(trans-4-(4-propylphenyl)cyclohexyl)-3E-buten-1-yne (a compound of the formula (I) wherein A=1,4-phenylene, C=1,4-phenylene, D=trans-1,4-cyclohexylene, n=0, m=1, l=1, R=propyl, X=H, Y=cyano and Z=H)

The captioned compound (0.5 g) was obtained by cyanogenating 1-(4-bromophenyl)-4-(trans-4-(4-propylphenyl)cyclohexyl)-3E-buten-1-yne, obtained from 1-(4-bromophenyl)-4-(4-propylphenyl)cyclohexyl-1-butyn-3-ol (1.3 g), prepared from 4-bromophenylacetylene (1.5 g) and 2-(trans-4-(4-propylphenyl)cyclohexyl- )acetaldehyde (1.8 g), in the same manner as in Example 38.

The following compounds are prepared in the same manner as the above:

1-(4-cyanophenyl)-4-(trans-4-(4-ethylphenyl)cyclohexyl)-3E-buten-1-yne
1-(4-cyanophenyl)-4-(trans-4-(4-butylphenyl)cyclohexyl)-3E-buten-1-yne
1-(3-fluoro-4-cyanophenyl)-4-(trans-4-(4-ethylphenyl)cyclohexyl)-3E-buten-1-yne
1-(3-fluoro-4-cyanophenyl)-4-(trans-4-(4-propylcyclohexyl)-3E-buten-1-yne
1-(3-fluoro-4-cyanophenyl)-4-(trans-4-(4-pentylphenyl)cyclohexyl)-3E-buten-1-yne
1-(3,5-difluoro-4-cyanophenyl)-4-(trans-4-(4-ethylphenyl)cyclohexyl)-3E-buten-1-yne
1-(3,5-difluoro-4-cyanophenyl)-4-(trans-4-(4-propylphenyl)cyclohexyl)-3E-buten-1-yne
1-(3,5-difluoro-4-cyanophenyl)-4-(trans-4-(4-pentylphenyl)cyclohexyl)-3E-buten-1-yne

EXAMPLE 53

Preparation of 1-(4-trifluoromethylphenyl)-4-(trans-4-(4-butylphenyl)cyclohexyl)-3E-buten-1-yne (a compound of the formula (I) wherein A=1,4-phenylene, C=1,4-phenylene, D=trans-1,4-cyclohexylene, n=0, m=1, l=1, R=butyl, X=H, Y=trifluoromethyl and Z=H)

The captioned compound was obtained from 1-(4-trifluoromethylphenyl)-4-(trans-4-(4-butylphenyl)cyclohexyl)-1-butyn-3-ol, prepared from 4-trifluoromethylphenylacetylene and 2-(trans-4-(4-butylphenyl)cyclohexyl)acetaldehyde, in the same manner as in Example 1.

The following compounds are prepared in the same manner as the above:

1-(4-trifluoromethylphenyl)-4-(trans-4-(4-ethylphenyl)cyclohexyl)-3E-buten-1-yne
1-(4-trifluoromethylphenyl)-4-(trans-4-(4-propylphenyl)cyclohexyl)-3E-buten-1-yne
1-(4-trifluoromethylphenyl)-4-(trans-4-(4-pentylphenyl)cyclohexyl)-3E-buten-1-yne
1-(3-fluoro-4-trifluoromethylphenyl)-4-(trans-4-(4-ethylphenyl)cyclohexyl)-3E-buten-1-yne
1-(3-fluoro-4-trifluoromethylphenyl)-4-(trans-4-(4-propylphenyl)cyclohexyl)-3E-buten-1-yne
1-(3-fluoro-4-trifluoromethylphenyl)-4-(trans-4-(4-pentylphenyl)cyclohexyl)-3E-buten-1-yne
1-(3,5-difluoro-4-trifluoromethylphenyl)-4-(trans-4-(4-ethylphenyl)cyclohexyl)-3E-buten-1-yne
1-(3,5-difluoro-4-trifluoromethylphenyl)-4-(trans-4-(4-propylphenyl)cyclohexyl)-3E-buten-1-yne
1-(3,5-difluoro-4-trifluoromethylphenyl)-4-(trans-4-(4-butylphenyl)cyclohexyl)-3E-buten-1-yne
1-(4-trifluoromethoxyphenyl)-4-(trans-4-(4-ethylphenyl)cyclohexyl)-3E-buten-1-yne
1-(4-trifluoromethoxyphenyl)-4-(trans-4-(4-propylphenyl)cyclohexyl)-3E-buten-1-yne
1-(3-fluoro-4-trifluoromethoxyphenyl)-4-(trans-4-(4-ethylphenyl)cyclohexyl)-3E-buten-1-yne
1-(3-fluoro-4-trifluoromethoxyphenyl)-4-(trans-4-(4-propylphenyl)cyclohexyl)-3E-buten-1-yne
1-(3-fluoro-4-trifluoromethoxyphenyl)-4-(trans-4-(4-pentylphenyl)cyclohexyl)-3E-buten-1-yne
1-(3,5-difluoro-4-trifluoromethoxyphenyl)-4-(trans-4-(4-ethylphenyl)cyclohexyl)-3E-buten-1-yne
1-(3,5-difluoro-4-trifluoromethoxyphenyl)-4-(trans-4-(4-propylphenyl)cyclohexyl)-3E-buten-1-yne
1-(3,5-difluoro-4-trifluoromethoxyphenyl)-4-(trans-4-(4-pentylphenyl)cyclohexyl)-3E-buten-1-yne
1-(4-difluoromethoxyphenyl)-4-(trans-4-(4-ethylphenyl)cyclohexyl)-3E-buten-1-yne
1-(4-difluoromethoxyphenyl)-4-(trans-4-(4-propylphenyl)cyclohexyl)-3E-buten-1-yne
1-(4-difluoromethoxyphenyl)-4-(trans-4-(4-pentylphenyl)cyclohexyl)-3E-buten-1-yne

EXAMPLE 54 (Use example 1)

1-(4-Ethylphenyl)-4-(trans-4-ethylcyclohexyl)-3E-buten-1-yne among the compounds of the present invention, having its preparation described in Example 1 was dissolved in a quantity of 15% by weight, in a liquid crystal composition ZLI-1132 made by Merck Co., Ltd. (a mixture consisting of 4-(trans-4-propylcyclohexyl)benzonitrile (24 parts by weight), (4-(trans-4-pentylcyclohexyl)benzonitrile (36 parts by weight), 4-(trans-4-pentylcyclohexyl)benzonitrile (25 parts by weight), 4-(4-trans-4-heptylcyclohexyl)phenyl)benzonitrile (15 parts by weight)), followed by measuring the physical properties of the resulting composition. As a result, clearing point, Cp=64.2° C., dielectric anisotropy value, $\Delta\epsilon=9.7$, optical anisotropy value, $\Delta n=0.137$, viscosity, $\eta_{20}=12.5$ cP, threshold voltage, Vth=1.52, elastic constant ratio, $K_{33}/K_{11}=1.81$ and $K_{33}/K_{22}=2.53$. Further, this composition was allowed to stand in a freezer at $-20°$ C. for 20 days, but no deposition of crystal was observed.

EXAMPLE 55 (Use example 2)

1-(4-Ethylphenyl)-4-(trans-4-propylcyclohexyl)-3E-buten-1-yne among the compounds of the present invention, having its preparation described in Example 2 was dissolved in a quantity of 15% by weight, in a liquid crystal composition ZLI-1132 made by Merck Co., Ltd., followed by measuring the physical properties of the resulting composition. As a result, Cp=72.9° C., $\Delta\epsilon=9.8$, $\Delta n=0.143$, $\eta_{20}=24.5$ cP, Vth=1.66, $K_{33}/K_{11}=1.93$ and $K_{33}/K_{22}=2.61$. Further, this composition was allowed to stand in a freezer at $-20°$ C. for 20 days. No deposition of crystal was observed.

EXAMPLE 56 (Use example 3)

1-(4-Ethylphenyl)-4-(trans-4-pentylcyclohexyl)-3E-buten-1-yne among the compounds of the present invention, having its preparation described in Example 3, was dissolved in a quantity of 15% by weight, in a liquid crystal composition ZLI-1132 made by Merck Co., Ltd., followed by measuring the physical properties of the resulting composition. As a result, Cp=73.4° C., $\Delta\epsilon=9.8$, $\Delta n=0.142$, $\eta_{20}=25.2$ cP, Vth=1.66, $K_{33}/K_{11}=1.81$ and $K_{33}/K_{22}=2.72$. Further, this composition was allowed to stand in a freezer at $-20°$ C. for 20 days, but no deposition of crystal was observed.

EXAMPLE 57 (Use example 4)

1-(4-Propylphenyl)-4-(trans-4-ethylcyclohexyl)-3E-buten-1-yne among the compounds of the present invention, having its preparation described in Example 4, was dissolved in a quantity of 15% by weight, in a liquid crystal composition ZLI-1132 made by Merck Co., Ltd., followed by measuring the physical properties of the resulting composition. As a result, Cp=69.8° C., $\Delta\epsilon=9.7$, $\Delta n=0.141$, $\eta_{20}=25.2$ cP, Vth=1.62, $K_{33}/K_{11}=1.74$ and $K_{33}/K_{22}=2.77$. Further, this composition was allowed to stand in a freezer at $-20°$ C. for 20 days, but no deposition of crystal was observed.

EXAMPLE 58 (Use example 5)

1-(4-Propylphenyl)-4-(trans-4-propylcyclohexyl)-3E-buten-1-yne among the compounds of the present invention, having its preparation described in Example 5, was dissolved in a quantity of 15% by weight, in a liquid crystal composition ZLI-1132 made by Merck Co., Ltd., followed by measuring the physical properties of the resulting composition. As a result, $Cp=75.0°$ C., $\Delta\epsilon=9.9$, $\Delta n=0.145$, $\eta_{20}=24.6$ cP, $Vth=1.71$, $K_{33}/K_{11}=1.84$ and $K_{33}/K_{22}=2.46$. Further, this composition was allowed to stand in a freezer at $-20°$ C. for 20 days, but no deposition of crystal was observed.

EXAMPLE 59 (Use example 6)

1-(4-Propylphenyl)-4-(trans-4-pentylcyclohexyl)-3E-buten-1-yne among the compounds of the present invention, having its preparation described in Example 6, was dissolved in a quantity of 15% by weight in a liquid crystal composition ZLI-1132 made by Merck Co., Ltd., followed by measuring the physical properties of the resulting composition. As a result, $Cp=74.8°$ C., $\Delta\epsilon=9.7$, $\Delta n=0.138$, $\eta_{20}=25.2$ cP, $Vth=1.72$, $K_{33}/K_{11}=1.77$ and $K_{33}/K_{22}=2.53$. Further, this composition was allowed to stand in a freezer at $-20°$ C. for 20 days, but no deposition of crystal was observed.

EXAMPLE 60 (Use example 7)

1-(4-Butylphenyl)-4-(trans-4-ethylcyclohexyl)-3E-buten-1-yne among the compounds of the present invention, having its preparation described in Example 7, was dissolved in a quantity of 15% by weight in a liquid crystal composition ZLI-1132 made by Merck Co., Ltd., followed by measuring the physical properties of the resulting composition. As a result, $Cp=65.8°$ C., $\Delta\epsilon=9.5$, $\Delta n=0.137$, $\eta_{20}=27.9$ cP, $Vth=1.54$, $K_{33}/K_{11}=1.76$ and $K_{33}/K_{22}=2.54$. Further, this composition was allowed to stand in a freezer at $-20°$ C. for 20 days, but no deposition of crystal was observed.

EXAMPLE 61 (Use example 8)

1-(4-Pentylphenyl)-4-(trans-4-ethylcyclohexyl)-3E-buten-1-yne among the compounds of the present invention, having its preparation described in Example 8, was dissolved in a quantity of 15% by weight in a liquid crystal composition ZLI-1132 made by Merck Co., Ltd., followed by measuring the physical properties of the resulting composition. As a result, $Cp=65.7°$ C., $\Delta\epsilon=9.5$, $\Delta n=0.136$, $\eta_{20}=25.8$ cP, $Vth=1.50$, $K_{33}/K_{11}=1.72$ and $K_{33}/K_{22}=2.51$. Further, this composition was allowed to stand in a freezer at $-20°$ C. for 20 days, but no deposition of crystal was observed.

EXAMPLE 62 (Use example 9)

1-(4-Pentylphenyl)-4-(trans-4-propylcyclohexyl)-3E-buten-1-yne among the compounds of the present invention, having its preparation described in Example 9, was dissolved in a quantity of 15% by weight in a liquid crystal composition ZLI-1132 made by Merck Co., Ltd., followed by measuring the physical properties of the resulting composition. As a result, $Cp=74.4°$ C., $\Delta\epsilon=9.8$, $\Delta n=0.144$, $\eta_{20}=24.6$ cP, $Vth=1.75$, $K_{33}/K_{11}=1.83$ and $K_{33}/K_{22}=2.31$. Further, this composition was allowed to stand in a freezer at $-20°$ C. for 20 days, but no deposition of crystal was observed.

EXAMPLE 63 (Use example 10)

1-(4-Pentylphenyl)-4-(trans-4-pentylcyclohexyl)-3E-buten-1-yne among the compounds of the present invention, having its preparation described in Example 10, was dissolved in a quantity of 15% by weight in a liquid crystal composition ZLI-1132 made by Merck Co., Ltd., followed by measuring the physical properties of the resulting composition As a result, $Cp=73.9°$ C., $\Delta\epsilon=9.5$, $\Delta n=0.142$, $\eta_{20}=24.7$ cP, $Vth=1.7$, $K_{33}/K_{11}=1.86$ and $K_{33}/K_{22}=2.71$. Further, this composition was allowed to stand in a freezer at $-20°$ C. for 20 days, but no deposition of crystal was observed.

EXAMPLE 64 (Use example 11)

1-(4-Methoxyphenyl)-4-(trans-4-ethylcyclohexyl)-3E-buten-1-yne among the compounds of the present invention, having its preparation described in Example 11, was dissolved in a quantity of 15% by weight in a liquid crystal composition ZLI-1132 made by Merck Co., Ltd., followed by measuring the physical properties of the resulting composition. As a result, $Cp=72.3°$ C., $\Delta\epsilon=10.1$, $\Delta n=0.144$, $\eta_{20}=28.1$ cP, $Vth=1.58$, $K_{33}/K_{11}=1.76$ and $K_{33}/K_{22}=2.32$. Further, this composition was allowed to stand in a freezer at $-20°$ C. for 20 days, but no deposition of crystal was observed.

EXAMPLE 65 (Use example 12)

1-(4-Methoxyphenyl)-4-(trans-4-propylcyclohexyl)-3E-buten-1-yne among the compounds of the present invention, having its preparation described in Example 12, was dissolved in a quantity of 15% by weight in a liquid crystal composition ZLI-1132 made by Merck Co., Ltd., followed by measuring the physical properties of the resulting composition As a result, $Cp=78.1°$ C., $\Delta\epsilon=10.2$, $\Delta n=0.149$, $\eta_{20}=26.4$ cP, $Vth=1.72$, $K_{33}/K_{11}=1.92$ and $K_{33}/K_{22}=2.31$. Further, this composition was allowed to stand in a freezer at $-20°$ C. for 20 days, but no deposition of crystal was observed.

EXAMPLE 66 (Use example 13)

1-(4-Methoxyphenyl)-4-(trans-4-pentylcyclohexyl)-3E-buten-1-yne among the compounds of the present invention, having its preparation described in Example 13, was dissolved in a quantity of 15% by weight in a liquid crystal composition ZLI-1132 made by Merck Co., Ltd., followed by measuring the physical properties of the resulting composition. As a result, $Cp=79.6°$ C., $\Delta\epsilon=10.2$, $\Delta n=0.148$, $\eta_{20}=28.0$ cP and $Vth=1.72$. Further, this composition was allowed to stand in a freezer at $-20°$ C. for 20 days, but no deposition of crystal was observed.

EXAMPLE 67 (Use example 14)

1-(4-Ethoxyphenyl)-4-(trans-4-ethylcyclohexyl)-3E-buten-1-yne among the compounds of the present invention, having its preparation described in Example 14, was dissolved in a quantity of 15% by weight in a liquid crystal composition ZLI-1132 made by Merck Co., Ltd., followed by measuring the physical properties of the resulting composition. As a result, $Cp=75.3°$ C., $\Delta\epsilon=10.0$, $\Delta n=0.148$, $\eta_{20}=27.6$ cP, $Vth=1.63$, $K_{33}/K_{11}=1.83$ and $K_{33}/K_{22}=2.77$. Further, this composition was allowed to stand in a freezer at $-20°$ C. for 20 days, but no deposition of crystal was observed.

EXAMPLE 68 (Use example 15)

1-(4-Ethoxyphenyl)-4-(trans-4-propylcyclohexyl)-3E-buten-1-yne among the compounds of the present invention, having its preparation described in Example 15, was dissolved in a quantity of 15% by weight in a liquid crystal composition ZLI-1132 made by Merck Co., Ltd., followed by measuring the physical properties of the resulting composition. As a result, $Cp=80.5°$ C., $\Delta\epsilon=10.1$, $\Delta n=0.15$, $\eta_{20}=26.4$ cP, $Vth=1.76$, $K_{33}/K_{11}=1.80$ and $K_{33}/K_{22}=3.05$. Further, this composition was allowed to stand in a freezer at $-20°$ C. for 20 days, but no deposition of crystal was observed.

EXAMPLE 69 (Use example 16)

1-(4-Ethoxyphenyl)-4-(trans-4-pentylcyclohexyl)-3E-buten-1-yne among the compounds of the present invention, having its preparation described in Example 16, was dissolved in a quantity of 15% by weight in a liquid crystal composition ZLI-1132 made by Merck Co., Ltd., followed by measuring the physical properties of the resulting composition. As a result, $Cp=81.0°$ C., $\Delta\epsilon=10.5$, $\Delta n=0.148$, $\eta_{20}=25.1$ cP, $Vth=1.77$, $K_{33}/K_{11}=1.99$ and $K_{33}/K_{22}=2.74$. Further, this composition was allowed to stand in a freezer at $-20°$ C. for 20 days, but no deposition of crystal was observed.

EXAMPLE 70 (Use example 17)

1-(4-Propoxyphenyl)-4-(trans-4-ethylcyclohexyl)-3E-buten-1-yne among the compounds of the present invention, having its preparation described in Example 17, was dissolved in a quantity of 15% by weight in a liquid crystal composition ZLI-1132 made by Merck Co., Ltd., followed by measuring the physical properties of the resulting composition As a result, $Cp=74.7°$ C., $\Delta\epsilon=10.0$, $\Delta n=0.147$, $\eta_{20}=28.5$ cP and $Vth=1.66$. Further, this composition was allowed to stand in a freezer at $-20°$ C. for 20 days, but no deposition of crystal was observed.

EXAMPLE 71 (Use example 18)

1-(4-Propoxyphenyl)-4-(trans-4-propylcyclohexyl)-3E-buten-1-yne among the compounds of the present invention, having its preparation described in Example 18, was dissolved in a quantity of 15% by weight in a liquid crystal composition ZLI-1132 made by Merck Co., Ltd., followed by measuring the physical properties of the resulting composition. As a result, $Cp=78.7°$ C., $\Delta\epsilon=10.0$, $\Delta n=0.149$, $\eta_{20}=26.7$ cP, $Vth=1.72$, $K_{33}/K_{11}=1.93$ and $K_{33}/K_{22}=2.21$. Further, this composition was allowed to stand in a freezer at $-20°$ C. for 20 days, but no deposition of crystal was observed.

EXAMPLE 72 (Use example 19)

1-(4-Propoxyphenyl)-4-(trans-4-pentylcyclohexyl)-3E-buten-1-yne among the compounds of the present invention, having its preparation described in Example 19, was dissolved in a quantity of 15% by weight in a liquid crystal composition ZLI-1132 made by Merck Co., Ltd., followed by measuring the physical properties of the resulting composition. As a result, $Cp=78.9°$ C., $\Delta\epsilon=10.0$, $\Delta n=0.145$, $\eta_{20}=27.3$ cP, $Vth=1.75$, $K_{33}/K_{11}=1.85$ and $K_{33}/K_{22}=2.80$. Further, this composition was allowed to stand in a freezer at $-20°$ C. for 20 days, but no deposition of crystal was observed.

EXAMPLE 73 (Use example 20)

1-(4-Butoxyphenyl)-4-(trans-4-ethylcyclohexyl)-3E-buten-1-yne among the compounds of the present invention, having its preparation described in Example 20, was dissolved in a quantity of 15% by weight in a liquid crystal composition ZLI-1132 made by Merck Co., Ltd., followed by measuring the physical properties of the resulting composition. As a result, $Cp=74.9°$ C., $\Delta\epsilon=9.9$, $\Delta n=0.144$, $\eta_{20}=27.6$ cP and $Vth=1.68$. Further, this composition was allowed to stand in a freezer at $-20°$ C. for 20 days, but no deposition of crystal was observed.

EXAMPLE 74 (Use example 21)

1-(4-Butoxyphenyl)-4-(trans-4-propylcyclohexyl)-3E-buten-1-yne among the compounds of the present invention, having its preparation described in Example 21, was dissolved in a quantity of 15% by weight in a liquid crystal composition ZLI-1132 made by Merck Co., Ltd., followed by measuring the physical properties of the resulting composition. As a result, $CP=78.9°$ C., $\Delta\epsilon=9.9$, $\Delta n=0.147$, $\eta_{20}=27.0$ cP, $Vth=1.72$, $K_{33}/K_{11}=1.89$ and $K_{33}/K_{22}=2.53$. Further, this composition was allowed to stand in a freezer at $-20°$ C. for 20 days, but no deposition of crystal was observed.

EXAMPLE 75 (Use example 22)

1-(4-Butoxyphenyl)-4-(trans-4-pentylcyclohexyl)-3E-buten-1-yne among the compounds of the present invention, having its preparation described in Example 22, was dissolved in a quantity of 15% by weight in a liquid crystal composition ZLI-1132 made by Merck Co., Ltd., followed by measuring the physical properties of the resulting composition. As a result, $CP=80.2°$ C., $\Delta\epsilon=9.9$, $\Delta n=0.144$, $\eta_{20}=27.0$ cP, $Vth=1.77$, $K_{33}/K_{11}=1.80$ and $K_{33}/K_{22}=2.59$. Further, this composition was allowed to stand in a freezer at $-20°$ C. for 20 days, but no deposition of crystal was observed.

EXAMPLE 76 (Use example 23)

1-(4-Ethylphenyl)-4-(trans-4-(trans-4-pentylcyclohexyl)cyclohexyl)- 3E-buten-1-yne among the compounds of the present invention, having its preparation described in Example 23, was dissolved in a quantity of 15% by weight in a liquid crystal composition ZLI-1083 made by Merck Co., Ltd., (a liquid crystal composition consisting of trans-4-propyl(4-cyanophenyl)cyclohexane (30 parts by weight), trans-4-pentyl-(4-cyanophenyl)cyclohexane (40 parts by weight) and trans-4-heptyl-(4-cyanophenyl)cyclohexane (30 parts by weight)), followed by measuring the physical properties of the resulting composition. As a result, $Cp=76.6°$ C., $\Delta\epsilon=9.9$, $\Delta n=0.132$, $\eta_{20}=23.7$ cP and $Vth=1.73$. Further, this composition was allowed to stand in a freezer at $-20°$ C. for 20 days, but no deposition of crystal was observed.

EXAMPLE 77 (Use example 24)

1-(4-Ethoxyphenyl)-4-(trans-4-(trans-4-pentylcyclohexyl)cyclohexyl)-3E-buten-1-yne among the compounds of the present invention, having its preparation described in Example 24, was dissolved in a quantity of 15% by weight in a liquid crystal composition ZLI-1083 made by Merck Co., Ltd., followed by measuring the physical properties of the resulting composition. As a result, $Cp=79.7°$ C., $\Delta\epsilon=10.2$, $\Delta n=0.135$, $\eta_{20}=24.1$ cP, $Vth=1.72$, $K_{33}/K_{11}=2.05$ and $K_{33}/K_{22}=2.96$. Further, this composition was allowed to stand in a freezer at −20° C. for 20 days, but no deposition of crystal was observed.

EXAMPLE 78 (Use example 25)

1-(4-Methoxyphenyl)-4-(trans-4-butoxycyclohexyl)-3E-buten-1-yne among the compounds of the present invention, having its preparation described in Example 25, was dissolved in a quantity of 15% by weight in a liquid crystal composition ZLI-1132 made by Merck Co., Ltd., followed by measuring the physical properties of the resulting composition. As a result, $Cp=73.3°$ C., $\Delta\epsilon=10.3$, $\Delta n=0.146$, $\eta_{20}=28.7$ cP and $Vth=1.59$. Further, this composition was allowed to stand in a freezer at −20° C. for 20 days, but no deposition of crystal was observed.

EXAMPLE 79 (Use example 26)

1-(4-Propylphenyl)-4-(trans-4-butoxycyclohexyl)-3E-buten-1-yne among the compounds of the present invention, having its preparation described in Example 26, was dissolved in a quantity of 15% by weight in a liquid crystal composition ZLI-1132 made by Merck Co., Ltd., followed by measuring the physical properties of the resulting composition As a result, $Cp=69.1°$ C., $\Delta\epsilon=9.8$, $\Delta n=0.140$, $\eta_{20}=26.9$ cP and $Vth=1.63$. Further, this composition was allowed to stand in a freezer at −20° C. for 20 days, but no deposition of crystal was observed.

EXAMPLE 80 (Use example 27)

1-(4-Fluorophenyl)-4-(trans-4-pentylcyclohexyl)-3E-buten-1-yne among the compounds of the present invention, having its preparation described in Example 34, was dissolved in a quantity of 15% by weight in a liquid crystal composition ZLI-1132 made by Merck Co., Ltd., followed by measuring the physical properties of the resulting composition. As a result, $Cp=71.2°$ C., $\Delta\epsilon=10.0$, $\Delta n=0.141$, $\eta_{20}=24.8$ cP and $Vth=1.68$. Further, this composition was allowed to stand in a freezer at −20° C. for 20 days, but no deposition of crystal was observed.

EXAMPLE 81 (Use example 28)

1-(3,4-Difluorophenyl)-4-(trans-4-pentylcyclohexyl)-3E-buten-1-yne among the compounds of the present invention, having its preparation described in Example 35, was dissolved in a quantity of 15% by weight in a liquid crystal composition ZLI-1132 made by Merck Co., Ltd., followed by measuring the physical properties of the resulting composition. As a result, $Cp=66.0°$ C., $\Delta\epsilon=10.3$, $\Delta n=0.137$, $\eta_{20}=27.8$ cP and $Vth=1.56$. Further, this composition was allowed to stand in a freezer at −20° C. for 20 days, but no deposition of crystal was observed.

EXAMPLE 82 (Use example 29)

1-(4-Chlorophenyl)-4-(trans-4-propylcyclohexyl)-3E-buten-1-yne among the compounds of the present invention, having its preparation described in Example 36, was dissolved in a quantity of 15% by weight in a liquid crystal composition ZLI-1132 made by Merck Co., Ltd., followed by measuring the physical properties of the resulting composition. As a result, $Cp=74.0°$ C., $\Delta\epsilon=10.3$, $\Delta n=0.150$, $\eta_{20}=24.8$ cP and $Vth=1.76$. Further, this composition was allowed to stand in a freezer at −20° C. for 20 days, but no deposition of crystal was observed.

EXAMPLE 83 (Use example 30)

1-(4-Trifluoromethylphenyl)-4-(trans-4-pentylcyclohexyl)-3E-buten-1-yne among the compounds of the present invention, having its preparation described in Example 37, was dissolved in a quantity of 15% by weight in a liquid crystal composition ZLI-1132 made by Merck Co., Ltd., followed by measuring the physical properties of the resulting composition As a result, $Cp=68.0°$ C., $\Delta\epsilon=10.5$, $\Delta n=0.140$, $\eta_{20}=27.0$ cP and $Vth=1.64$. Further, this composition was allowed to stand in a freezer at −20° C. for 20 days, but no deposition of crystal was observed.

EXAMPLE 84 (Use example 31)

1-(4-Cyanophenyl)-4-(trans-4-propylcyclohexyl)-3E-buten-1-yne among the compounds of the present invention, having its preparation described in Example 38, was dissolved in a quantity of 15% by weight in a liquid crystal composition ZLI-1132 made by Merck Co., Ltd., followed by measuring the physical properties of the resulting composition. As a result, $Cp=82.7°$ C., $\Delta\epsilon=11.0$, $\Delta n=0.159$, $\eta_{20}=29.6$ cP and $Vth=1.80$. Further, this composition was allowed to stand in a freezer at −20° C. for 20 days, but no deposition of crystal was observed.

EXAMPLE 85 (Use example 32)

1-(3-Fluoro-4-cyanophenyl)-4-(trans-4-propylcyclohexyl)-3E-buten-1-yne among the compounds of the present invention, having its preparation described in Example 39, was dissolved in a quantity of 15% by weight in a liquid crystal composition ZLI-1132 made by Merck Co., Ltd., followed by measuring the physical properties of the resulting composition. As a result, $Cp=75.7°$ C., $\Delta\epsilon=12.2$, $\delta n=0.155$, $\eta_{20}=29.9$ cP and $Vth=1.67$. Further, this composition was allowed to stand in a freezer at −20° C. for 20 days, but no deposition of crystal was observed.

EXAMPLE 86 (Use example 33)

The following liquid crystal composition was prepared and the physical properties thereof were measured.

| | |
|---|---|
| 1-(4-methoxyphenyl)-4-(trans-4-propylcyclohexyl)-3E-buten-1-yne | 2% by weight |
| 1-(4-ethoxyphenyl)-4-(trans-4-propylcyclohexyl)-3E-buten-1-yne | 2% by weight |
| 1-(4-propoxyphenyl)-4-(trans-4-propylcyclohexyl)-3E-buten-1-yne | 2% by weight |
| 4-(trans-4-propylcyclohexyl)benzonitrile | 15% by weight |
| 4-(trans-4-ethylcyclohexyl)benzonitrile | 9% by weight |
| 4-(trans-4-methoxymethylcyclohexyl)benzonitrile | 11% by weight |
| 3-fluoro-4-(trans-4-propylcyclohexyl)benzonitrile | 6% by weight |
| 4-(trans-4-propylcyclohexyl)ethoxybenzene | 9% by weight |
| 1,2-difluoro-4-(trans-4-(trans-4-ethylcyclohexyl)cyclohexyl)benzene | 5.6% by weight |
| 1,2-difluoro-4-(trans-4-(trans-4-propylcyclohexyl)cyclohexyl)benzene | 5.7% by weight |
| 1,2-difluoro-4-(trans-4-(trans-4-pentylcyclohexyl)cyclohexyl)benzene | 5.7% by weight |
| 4-(2-(4-(2-(trans-4-propylcyclohexyl)ethyl)phenyl)ethynile)ethylbenzene | 5% by weight |
| 4-(2-(4-(2-(trans-4-propylcyclohexyl)ethyl)phenyl)ethynile)propylbenzene | 5% by weight |
| 4-(2-(4-(2-(trans-4-propylcyclohexyl)ethyl)phenyl)ethynile)butylbenzene | 5% by weight |
| 4-(trans-4-(trans-4-propylcyclohexyl)cyclohexyl)toluene | 9% by weight |
| 4-(trans-4-(trans-4-propylcyclohexyl)- | 3% by weight | cyclohexyl)anisole

As a result, Cp=82.4° C., Δε=8.3, Δn=0.132, η20=20.5 cP, Vth=1.74 V.

EXAMPLE 87 (Use example 34)

The following liquid crystal composition was prepared and the physical properties thereof were measured.

| | |
|---|---|
| 1-(4-ethylphenyl)-4-(trans-4-pentylcyclohexyl)cyclohexyl-3E-buten-1-yne | 10% by weight |
| 4-(trans-4-propylcyclohexyl)-2-fluorobenzonitrile | 10% by weight |
| 4-(trans-4-ethylcyclohexyl)-2-fluorobenzonitrile | 10% by weight |
| 4-(5-propyl-1,3-primidin-2-yl)-1,2-difluorobenzene | 10% by weight |
| 4-(5-propyl-1,3-dioxan-2-yl)benzonitrile | 10% by weight |
| 4-(trans-4-(trans-4-ethylcyclohexyl)cyclohexyl)-1,2-difluorobenzene | 8% by weight |
| 4-(trans-4-(trans-4-propylcyclohexyl)cyclohexyl)-1,2-difluorobenzene | 8% by weight |
| 4-(trans-4-(trans-4-pentylcyclohexyl)cyclohexyl)-1,2-difluorobenzene | 4% by weight |
| 4-(trans-4-(trans-4-ethylcyclohexyl)cyclohexyl)-2-fluorobenzonitrile | 15% by weight |
| 4-(trans-4-(trans-4-propylcyclohexyl)cyclohexyl)-2-fluorobenzonitrile | 15% by weight |

As a result, Cp=87.2° C., Δε=14.7, Δn=0.119, η20=38.5 cP, Vth=1.21 V.

EXAMPLE 88 (Use example 35)

The following liquid crystal composition was prepared and the physical properties thereof were measured.

| | |
|---|---|
| 1-(4-methoxyphenyl)-4-(trans-4-ethylcyclohexyl)-3E-buten-1-yne | 5% by weight |
| 1-(4-ethoxyphenyl)-4-(trans-4-ethylcyclohexyl)-3E-buten-1-yne | 5% by weight |
| 1-(4-ethoxyphenyl)-4-(trans-4-propylcyclohexyl)-3E-buten-1-yne | 5% by weight |
| 4-(trans-4-propylcyclohexyl)-2-fluorobenzonitrile | 10% by weight |
| 4-(trans-4-ethylcyclohexyl)-2-fluorobenzonitrile | 15% by weight |
| 4-(5-propyl-1,3-pyrimidin-2-yl)-1,2-difluorobenzene | 10% by weight |
| 4-(trans-4-(trans-4-ethylcyclohexyl)cyclohexyl)-1,2-difluorobenzene | 10% by weight |
| 4-(trans-4-(trans-4-propylcyclohexyl)cyclohexyl)-1,2-difluorobenzene | 10% by weight |
| 4-(trans-4-(trans-4-pentylcyclohexyl)cyclohexyl)-1,2-difluorobenzene | 10% by weight |
| 4-(trans-4-(trans-4-ethylcyclohexyl)cyclohexyl)-2-fluorobenzonitrile | 10% by weight |
| 4-(trans-4-(trans-4-propylcyclohexyl)cyclohexyl)-2-fluorobenzonitrile | 10% by weight |

As a result, Cp=67.4° C., Δε=11.4, Δn=0.113, η20=32.5 cP, Vth=1.17 V.

EXAMPLE 89 (Use example 36)

The following liquid crystal composition was prepared and the physical properties thereof were measured.

| | |
|---|---|
| 1-(4-ethylphenyl)-4-(trans-4-ethylcyclohexyl)-3E-buten-1-yne | 10% by weight |
| 1-(4-pentylphenyl)-4-(trans-4-ethylcyclohexyl)-3E-buten-1-yne | 10% by weight |
| trans-4-(trans-4-methoxymethylcyclohexyl)propylcyclohexane | 5% by weight |
| 4-(trans-4-methoxymethylcyclohexyl)benzonitrile | 15% by weight |
| 4-(trans-4-(trans-4-ethylcyclohexyl)cyclohexyl)benzonitrile | 10% by weight |
| 4-(trans-4-(3-buten-1-yl)cyclohexyl)benzonitrile | 10% by weight |
| 4-(trans-4-propylcyclohexyl)benzonitrile | 10% by weight |
| 2-(4-(trans-4-propylcyclohexyl)phenyl)-5-ethyl-1,3-pyrimidine | 10% by weight |
| 2-(4-(trans-4-propylcyclohexyl)phenyl)-5-propyl-1,3-pyrimidine | 10% by weight |
| 2-(4-(trans-4-propylcyclohexyl)phenyl)-5-butyl-1,3-pyrimidine | 10% by weight |

As a result, Cp=97.7° C., Δε=8.3, Δn=0.151, η20=35.3 cP, Vth=1.81 V.

EXAMPLE 90 (Use example 37)

The following liquid crystal composition was prepared and the physical properties thereof were measured.

| | |
|---|---|
| 1-(4-methoxyphenyl)-4-(trans-4-pentylcyclohexyl)-3E-buten-1-yne | 9% by weight |
| 1-(4-ethoxyphenyl)-4-(trans-4-pentylcyclohexyl)-3E-buten-1-yne | 9% by weight |
| 1-(4-ethylphenyl)-2-(4-(2-(trans-4-propylcyclohexyl)-ethyl)phenyl)acetylene | 9% by weight |
| 1-(4-propylphenyl)-2-(4-(2-(trans-4-propylcyclohexyl)ethyl)phenyl)acetylene | 8% by weight |
| 2-(3,4-difluorophenyl)-5-propyl-1,3-pyrimidine | 12% by weight |
| 2-(4-ethylphenyl)-5-ethyl-1,3-pyrimidine | 5% by weight |
| 2-(4-propylphenyl)-5-ethyl-1,3-pyrimidine | 5% by weight |
| 1-(4-ethylphenyl)-2-tolylacetylene | 4% by weight |
| 1-(4-ethylphenyl)-2-(4-hexylphenyl)acetylene | 8% by weight |
| 1-tolyl-2-(4-hexylphenyl)acetylene | 5% by weight |
| 1,2-di(4-butylphenyl)acetylene | 5% by weight |
| 4-fluoro-4'-(5-ethyl-1,3-pyrimidin-2-yl)biphenyl | 7% by weight |
| 4-fluoro-4'-(5-propyl-1,3-pyrimidin-2-yl)biphenyl | 7% by weight |
| 4-fluoro-4'-(5-butyl-1,3-pyrimidin-2-yl)biphenyl | 7% by weight |

As a result, Cp=76.3° C., Δε=4.5, Δn=0.214, η20=22.0 cP, Vth=2.12 V.

EXAMPLE 91 (Use example 38)

The following liquid crystal composition was prepared and the physical properties thereof were measured.

| | |
|---|---|
| 1-(4-methoxyphenyl)-4-(trans-4-pentylcyclohexyl)cyclohexyl-3E-buten-1-yne | 9% by weight |
| 4-(trans-4-propylcyclohexyl)ethoxybenzene | 5% by weight |
| 5-(trans-4-(trans-4-ethylcyclohexyl)cyclohexyl)-1,2,3-trifluorobenzene | 10% by weight |
| 5-(trans-4-(trans-4-pentylcyclohexyl)cyclohexyl)-1,2,3-trifluorobenzene | 10% by weight |
| 5-(trans-4-(trans-4-propylcyclohexyl)cyclohexyl)-1,2,3-trifluorobenzene | 10% by weight |
| 4-(trans-4-heptylcyclohexyl)-1,2-difluorobenzene | 10% by weight |
| 4-(2-(trans-4-pentylcyclohexyl)ethyl)-1,2-difluorobenzene | 10% by weight |
| 4-(trans-4-(trans-4-ethylcyclohexyl)cyclohexyl)-1,2-difluorobenzene | 8% by weight |
| 4-(trans-4-(trans-4-propylcyclohexyl)cyclohexyl)-1,2-difluorobenzene | 8% by weight |
| 4-(trans-4-(trans-4-pentylcyclohexyl)cyclohexyl)-1,2-difluorobenzene | 8% by weight |
| 4-(trans-4-(trans-4-propylcyclohexyl)cyclohexyl)fluorobenzene | 5% by weight |
| 4-(trans-4-(trans-4-propylcyclohexyl)cyclohexyl)toluene | 6% by weight |
| 4-(trans-4-(trans-4-propylcyclohexyl)cylohexyl)propylbenzene | 6% by weight |

As a result, Cp=98.1° C., Δε=4.5, Δn=0.089, η20=21.2 cP, Vth=2.34 V.

EXAMPLE 92 (Use example 39)

The following liquid crystal composition was prepared and the physical properties thereof were measured.

| | |
|---|---|
| 1-(4-methoxyphenyl)-4-(trans-4-propylcyclohexyl)-3E-buten-1-yne | 2% by weight |
| 1-(4-ethoxyphenyl)-4-(trans-4-propylcyclohexyl)-3E-buten-1-yne | 2% by weight |
| 1-(4-pentyloxyphenyl)-4-(trans-4-propylcyclohexyl)-3E-buten-1-yne | 2% by weight |
| 1-(4-propoxyphenyl)-4-(trans-4-pentylcyclohexyl)-3E-buten-1-yne | 3% by weight |
| 4-(trans-4-propylcyclohexyl)benzonitrile | 15% by weight |
| 4-(trans-4-ethylcyclohexyl)benzonitrile | 9% by weight |
| 4-(trans-4-methoxymethylcyclohexyl)benzonitrile | 11% by weight |
| 3-fluoro-4-(trans-4-propylcyclohexyl)benzonitrile | 6% by weight |
| 4-(trans-4-propylcyclohexyl)ethoxybenzene | 6% by weight |
| 1,2-difluoro-4-(trans-4-(trans-4-ethylcyclohexyl)cyclohexyl)benzene | 5% by weight |
| 1,2-difluoro-4-(trans-4-(trans-4-propylcyclohexyl)cyclohexyl)benzene | 5% by weight |
| 1,2-difluoro-4-(trans-4-(trans-4-pentylcyclohexyl)cyclohexyl)benzene | 5% by weight |
| 4-(2-(4-(2-(trans-4-ethylcyclohexyl)ethyl)phenyl)ethynyl)propylbenzene | 4% by weight |
| 4-(2-(4-(2-(trans-4-ethylcyclohexyl)ethyl)phenyl)ethynyl)butylbenzene | 4% by weight |
| 4-(2-(4-(2-(trans-4-propylcyclohexyl)ethyl)phenyl)ethynyl)ethylbenzene | 5% by weight |
| 4-(2-(4-(2-(trans-4-propylcyclohexyl)ethyl)phenyl)ethynyl)propylbenzene | 5% by weight |
| 4-(2-(4-(2-(trans-4-propylcyclohexyl)ethyl)phenyl)ethynyl)butylbenzene | 5% by weight |
| 4-(trans-4-(trans-4-propylcyclohexyl)cyclohexyl)toluene | 6% by weight |

As a result, Cp=83.4° C., Δε=8.3, Δn=0.145, η20=21.8 cP, Vth=1.75 V.

EXAMPLE 93 (Use example 40)

The following liquid crystal composition was prepared and the physical properties thereof were measured.

| | |
|---|---|
| 1-(4-cyanophenyl)-4-(trans-4-propylcyclohexyl)-3E-buten-1-yne | 5% by weight |
| 1-(4-cyanophenyl)-4-(trans-4-pentylcyclohexyl)-3E-buten-1-yne | 15% by weight |
| 4-(trans-4-ethylcyclohexyl)benzonitrile | 10% by weight |
| 4-(trans-4-propylcyclohexyl)benzonitrile | 9% by weight |
| 1-(4-ethylphenyl)-2-(4-methoxyphenyl)acetylene | 7% by weight |
| 1-(4-propylphenyl)-2-(4-methoxyphenyl)acetylene | 7% by weight |
| 1-(4-butylphenyl)-2-(4-methoxyphenyl)acetylene | 7% by weight |
| 1-(4-butylphenyl)-2-(4-ethoxyphenyl)acetylene | 7% by weight |
| 1-(4-pentylphenyl)-2-(4-methoxyphenyl)acetylene | 7% by weight |
| 1-(4-(trans-4-propylcyclohexyl)-2-fluorophenyl)-2-(4-ethylphenyl)acetylene | 4% by weight |
| 1-(4-(trans-4-propylcyclohexyl)-2-fluorophenyl)-2-(4-propylphenyl)acetylene | 4% by weight |
| 1-(4-(trans-4-propylcyclohexyl)-2-fluorophenyl)-2-(4-butylphenyl)acetylene | 4% by weight |
| 4-fluoro-4'-(5-propyl-1,3-pyrimidin-2-yl)biphenyl | 7% by weight |
| 4-fluoro-4'-(5-butyl-1,3-pyrimidin-2-yl)biphenyl | 7% by weight |

As a result, Cp=90.5° C., Δε=7.7, Δn=0.237, η20=3.0 cP, Vth=1.79 V.

EXAMPLE 94 (Use example 41)

The following liquid crystal composition was prepared and the physical properties thereof were measured.

| | |
|---|---|
| 1-(4-fluorophenyl)-4-(trans-4-propylcyclohexyl)-3E-buten-1-yne | 20% by weight |
| 4-(trans-4-propylcyclohexyl)benzonitrile | 12% by weight |
| 1-(4-ethylphenyl)-2-(4-methoxyphenyl)acetylene | 1% by weight |
| 1-(4-propylphenyl)-2-(4-methoxyphenyl)acetylene | 1% by weight |
| 1-(4-butylphenyl)-2-(4-methoxyphenyl)acetylene | 1% by weight |
| 1-(4-butylphenyl)-2-(4-ethoxyphenyl)acetylene | 1% by weight |
| 1-(4-pentylphenyl)-2-(4-methoxyphenyl)acetylene | 1% by weight |
| 4-(trans-4-(trans-4-ethylcyclohexyl)cyclohexyl)-1,2-difluorobenzene | 8% by weight |
| 4-(trans-4-(trans-4-propylcyclohexyl)cyclohexyl)-1,2-difluorobenzene | 8% by weight |
| 4-(trans-4-(trans-4-pentylcyclohexyl)cyclohexyl)-1,2-difluorobenzene | 8% by weight |
| 4'-(trans-4-ethylcyclohexyl)-1,2-difluorobiphenyl | 6% by weight |
| 4'-(trans-4-propylcyclohexyl)-1,2-difluorobiphenyl | 6% by weight |
| 4'-(trans-4-pentylcyclohexyl)-1,2-difluorobiphenyl | 12% by weight |
| 1-(2-fluoro-4-(trans-4-propylcyclohexyl)phenyl-2-(4-ethylphenyl)acetylene | 5% by weight |
| 1-(2-fluoro-4-(trans-4-propylcyclohexyl)phenyl-2-(4-propylphenyl)acetylene | 5% by weight |
| 1-(2-fluoro-4-(trans-4-propylcyclohexyl)phenyl-2-(4-butylphenyl)acetylene | 5% by weight |

As a result, Cp=92.7° C., Δε=5.2, Δn=0.155, η20=25.0 cP, Vth=2.20 V.

EXAMPLE 95 (Use example 42)

The following liquid crystal composition was prepared and the physical properties thereof were measured.

| | |
|---|---|
| 1-(4-trifluoromethoxyphenyl)-4-(trans-4-propylcyclo-hexyl)-3E-buten-1-yne | 10% by weight |
| 1-(4-trifluoromethoxyphenyl)-4-(trans-4-pentylcyclohexyl)-3E-buten-1-yne | 10% by weight |
| 4-(trans-4-propylcyclohexyl)benzonitrile | 5% by weight |
| 4-(trans-4-pentylcyclohexyl)benzonitrile | 5% by weight |
| 4-(trans-4-methoxycyclohexyl)benzonitrile | 9% by weight |
| 4-(trans-4-ethoxycyclohexyl)benzonitrile | 8% by weight |
| trans-4-(trans-4-methoxymethylcyclohexyl)cyclohexyl-pentane | 6% by weight |
| 1-(4-ethylphenyl)-2-(4-methoxyphenyl)acetylene | 11% by weight |
| 4-(trans-4-(trans-4-propylcyclohexyl)cyclohexyl)fluorobenzene | 4% by weight |
| 4-(trans-4-(trans-4-propylcyclohexyl)cyclohexyl)toluene | 8% by weight |
| 4-(trans-4-(trans-4-propylcyclohexyl)cyclohexyl)propylbenzene | 13% by weight |
| 4-fluorophenyl-trans-4-(trans-4-propyl-cyclohexyl)cyclohexylcarboxylate | 4% by weight |
| 4-fluorophenyl-trans-4-(trans-4-pentylcyclohexyl)cyclohexylcarboxylate | 4% by weight |
| 1-(4-(trans-4-propylcyclohexyl)-2-fluorophenyl)-2-(4-ethylphenyl)acetylene | 3% by weight |

As a result, Cp=82.6° C., Δε=6.0, Δn=0.133, η20=13.7 cP, Vth=1.86 V.

EXAMPLE 96 (Use example 43)

The following liquid crystal composition was prepared and the physical properties thereof were measured.

| | |
|---|---|
| 1-(4-trifluoromethylphenyl)-4-(trans-4-propyl- | 20% by weight |

| | |
|---|---|
| cyclohexyl)-3E-buten-1-yne | |
| 4-(trans-4-heptylcyclohexyl)-1,2-difluoro-benzene | 5% by weight |
| 4-(trans-4-(trans-4-propylcyclohexyl)cyclohexyl)fluorobenzene | 5% by weight |
| 4-(trans-4-(trans-4-ethylcyclohexyl)-cyclohexyl)-1,2-fluorobenzene | 10% by weight |
| 4-(trans-4-(trans-4-propylcyclohexyl)-cyclohexyl)-1,2-fluorobenzene | 10% by weight |
| 4-(trans-4-(trans-4-pentylcyclohexyl)cyclohexyl)-1,2-fluorobenzene | 10% by weight |
| 4-(trans-4-(2-(trans-4-ethylcyclohexyl)-ethynyl)cyclohexyl)-1,2-difluorobenzene | 14% by weight |
| 4-(trans-4-(2-(trans-4-propylcyclohexyl)-ethynyl)cyclohexyl)-1,2-difluorobenzene | 7% by weight |
| 4-(trans-4-(2-(trans-4-pentylcyclohexyl)-ethynyl)cyclohexyl)-1,2-difluorobenzene | 14% by weight |
| 4'-(trans-4-ethylcyclohexyl)-3,4-difluorobiphenyl | 1.25% by weight |
| 4'-(trans-4-propylcyclohexyl)-3,4-difluorobiphenyl | 1.25% by weight |
| 4'-(trans-4-pentylcyclohexyl)-3,4-difluorobiphenyl | 2.5% by weight |

As a result, Cp=80.5° C., $\Delta\epsilon$=5.1, $\Delta n$=0.096, $\eta_{20}$=24.0 cP, Vth=2.04 V.

EXAMPLE 97 (Use example 44)

The following liquid crystal composition was prepared and the physical properties thereof were measured.

| | |
|---|---|
| 1-(3,4,5-trifluorophenyl)-4-(trans-4-propylcyclohexyl)-3E-buten-1-yne | 8% by weight |
| 1-(3,4,5-trifluorophenyl)-4-(trans-4-pentylcyclohexyl)-3E-buten-1-yne | 9% by weight |
| 4-(trans-4-(trans-4-ethylcyclohexyl)cyclohexyl)-1,2-difluorobenzene | 3% by weight |
| 4-(trans-4-(trans-4-propylcyclohexyl)cyclohexyl)-1,2-difluorobenzene | 3% by weight |
| 4-(trans-4-(trans-4-pentylcyclohexyl)cyclohexyl)-1,2-difluorobenzene | 3% by weight |
| 1-(trans-4-(2-(trans-4-propylcyclohexyl)-ethynyl)cyclohexyl)-3,4,5-trifluorobenzene | 8% by weight |
| 1-(trans-4-(2-(trans-4-butylcyclohexyl)-ethynyl)cyclohexyl)-3,4,5-trifluorobenzene | 8% by weight |
| 1-(trans-4-(2-(trans-4-pentylcyclohexyl)-ethynyl)cyclohexyl)-3,4,5-trifluorobenzene | 8% by weight |
| 1-(trans-4-(trans-4-propylcyclohexyl)cyclohexyl)-3,4,5-trifluorobenzene | 7% by weight |
| 1-(trans-4-(trans-4-pentylcyclohexyl)cyclohexyl)-3,4,5-trifluorobenzene | 3% by weight |
| 1-(2-(trans-4-(trans-4-propylcyclohexyl)cyclohexyl)ethynyl)-3,4,5-trifluorobenzene | 10% by weight |
| 1-(2-(trans-4-(trans-4-pentylcyclohexyl)cyclohexyl)ethynyl)-3,4,5-trifluorobenzene | 10% by weight |
| 4'-(trans-4-propylcyclohexyl)-3,4,5-trifluorobiphenyl | 10% by weight |
| 4'-(trans-4-pentylcyclohexyl)-3,4,5-trifluorobiphenyl | 10% by weight |

As a result, Cp=64.3° C., $\Delta\epsilon$=7.9, $\Delta n$=0.095, $\eta_{20}$=29.0 cP, Vth=1.28 V.

What we claim is:

1. A conjugated enyne derivative expressed by the formula (I)

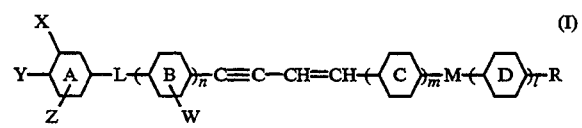

wherein A represents 1,4-phenylene group or 1,4-cyclohexylene group; B, C and D each represent 1,4-phenylene group, 1,4-cyclohexylene group, or a heterocyclic ring group selected from the group consisting of 1,3-dioxane-2,5-diyl group, pyridine-2,5-diyl group and 1,3-pyrimidine-2,5-diyl group, with the proviso that two or three of B, C and D are not simultaneously heterocyclic ring groups; L and M each represent a covalent bond, 1,2-ethylene group, oxycarbonyl group, carbonyloxy group, 1,2-ethenylene group, 1,2-ethynylene group, oxymethylene group or methyleneoxy group; n, m and l each represent 0 or 1; X and Z each independently represent hydrogen atom or fluorine atom; R represents fluoroalkyl group of 1 to 10 carbon atoms, alkyl group of 1 to 10 carbon atoms, alkoxy group of 1 to 10 carbon atoms, alkoxyalkyl group of 1 to 10 carbon atoms or alkenyl group of 1 to 10 carbon atoms; Y represents alkyl group of 1 to 10 carbon atoms, alkoxy group of 1 to 10 carbon atoms, cyano group, halogen atom, cyanate group, alkyl group of 1 to 10 carbon atoms having at least one hydrogen atom replaced by halogen atom(s) or alkoxy group of 1 to 10 carbon atoms having at least one hydrogen atom replaced by halogen atom(s); when B represents 1,4-phenylene group, W represents fluorine atom or hydrogen atom; when B represents a group other than 1,4-phenylene group, W represents hydrogen atom; when n represents 0, L represents a covalent bond; when m or n represents 0, M represents a covalent bond; and m and l each are not simultaneously 0.

2. A conjugated enyne derivative according to claim 1, wherein B, C and D each represent 1,4-phenylene group or 1,4-cyclohexylene group; L and M each represent a covalent bond, 1,2-ethylene group, 1,2-ethenylene group, 1,2-ethynylene group, oxymethylene group or methyleneoxy group; R represents said alkyl group, alkoxy group or alkenyl group; and Y represents said alkyl group, alkoxy group, cyano group, halogen atom, cyanate group, trifluoromethyl group, difluoromethyl group, difluoromethoxy group or trifluoromethoxy group.

3. A conjugated enyne derivative according to claim 2, wherein L and M each represent a covalent bond, 1,2-ethylene group, 1,2-ethenylene group or 1,2-ethynylene group.

4. A conjugated enyne derivative according to claim 3, wherein L and M each represent a covalent bond or 1,2-ethylene group.

5. A conjugated enyne derivative according to claim 1, wherein A represents 1,4-phenylene group; B, C and D each represent 1,4-phenylene group or 1,4-cyclohexylene group; L and M each represent a covalent bond or 1,2-ethylene group; R represents said alkyl group, alkoxy group or alkenyl group; and Y represents said alkyl group, alkoxy group, cyano group, halogen atom, cyanate group, trifluoromethyl group, difluoromethyl group, difluoromethoxy group or trifluoromethoxy group.

6. A conjugated enyne derivative according to claim 5, wherein C represents 1,4-cyclohexylene group; m represents 1; and Y represents said alkyl group, alkoxy group, cyano group, halogen atom, cyanate group, trifluoromethyl group, difluorormethyl group, difluoromethoxy group or trifluoromethoxy group.

7. A conjugated enyne derivative according to claim 6, wherein n represents 0; and m and l each represent 1.

8. A conjugated enyne derivative according to claim 6, wherein n represents 1 and l represents 0.

9. A conjugated enyne derivative according to claim 6, wherein n and l each represent 0; and Y represents cyano group, halogen atom, cyanate group, trifluoromethyl group, difluoromethyl group, difluoromethoxy group or trifluoromethoxy group.

10. A conjugated enyne derivative according to claim 6, wherein n and l each represent 0; X and Z each represent hydrogen atom; and Y represents said alkyl group, alkoxy group, trifluoromethyl group, difluoromethyl group, difluoromethoxy group or trifluoromethoxy group.

11. A conjugated enyne derivative according to claim 10, wherein Y represents said alkyl group or alkoxy group.

12. A conjugated enyne derivative according to claim 10, wherein R represents said alkyl group or alkoxy group; and Y represents said alkyl group or alkoxy group.

13. A conjugated enyne derivative according to claim 1, wherein A represents 1,4-phenylene group; B and D each represent 1,4-phenylene group or 1,4-cyclohexylene group; C represents 1,4-phenylene group; L represents a covalent bond or 1,2-ethylene group; m represents 1; n and l each represent 0 or 1; R represents said alkyl group, alkoxy group or alkenyl group; and Y represents said alkyl group, alkoxy group, cyano group, halogen atom, cyanate group, trifluoromethyl group, difluoromethyl group, difluoromethoxy group or trifluoromethoxy group.

14. A conjugated enyne derivative according to claim 1, wherein A represents 1,4-cyclohexylene group; B, C and D each represent 1,4-phenylene group or 1,4-cyclohexylene group; L and M each represent a covalent bond or 1,2-ethylene group; R represents said alkyl group, alkoxy group, or alkenyl group; and Y represents said alkyl group, alkoxy group, cyano group, halogen atom, cyanate group, trifluoromethyl group, difluoromethyl group, difluoromethoxy group or trifluoromethoxy group.

15. A conjugated enyne derivative according to claim 14, wherein n and m each represent 1; l represents 0; and X and Z each represent hydrogen atom.

16. A conjugated enyne derivative according to claim 14, wherein B represents 1,4-phenylene group; n and m each represent 1; l represents 0; and X and Z each represent hydrogen atom.

17. A conjugated enyne derivative according to claim 14, wherein C represents 1,4-cyclohexylene group; n represents 0; m and l each represent 1; and X and z each represent hydrogen atom.

18. A conjugated enyne derivative according to claim 14, wherein C represents 1,4-cyclohexylene group; n and l each represent 0; and X and Z each represent hydrogen atom.

19. A conjugated enyne derivative according to claim 1, wherein B represents 1,4-phenylene group; C and D each represent 1,4-phenylene group or 1,4-cyclohexylene group, L and M each represent a covalent bond, 1,2-ethylene group, 1,2-ethenylene group, 1,2-ethynylene group, oxymethylene group or methyleneoxy group; R represents said alkyl group, alkoxy group or alkenyl group; Y represents said alkyl group, alkoxy group, cyano group, halogen atom, cyanate group, trifluoromethyl group, difluoromethyl group, difluoromethoxy group or trifluoromethoxy group; and W represents hydrogen atom.

20. A liquid crystal composition containing the enyne derivative according to claim 1.

* * * * *